United States Patent
Dennelly et al.

(10) Patent No.: US 10,592,987 B2
(45) Date of Patent: Mar. 17, 2020

(54) SECTOR-BASED PORTFOLIO CONSTRUCTION PLATFORM APPARATUSES, METHODS AND SYSTEMS

(71) Applicant: FMR, LLC, Boston, MA (US)

(72) Inventors: Keith E. Dennelly, Hingham, MA (US); Mihir S. Shah, Burlington, MA (US); Madhusudana R. Chalamani, South Grafton, MA (US); Vineet Vasant Nene, Hopkinton, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/032,140

(22) Filed: Sep. 19, 2013

(65) Prior Publication Data
US 2014/0365399 A1     Dec. 11, 2014

Related U.S. Application Data

(60) Provisional application No. 61/833,425, filed on Jun. 10, 2013.

(51) Int. Cl.
*G06Q 40/06*     (2012.01)

(52) U.S. Cl.
CPC ................... *G06Q 40/06* (2013.01)

(58) Field of Classification Search
CPC ......... G06Q 40/04; G06Q 40/06; G06Q 40/00
USPC ...................................................... 705/36 R
See application file for complete search history.

(56) References Cited

U.S. PATENT DOCUMENTS

| | | | |
|---|---|---|---|
| 6,799,167 B1 | 9/2004 | Gullen | |
| 7,668,773 B1* | 2/2010 | Pruitt | 705/36 T |
| 7,870,051 B1* | 1/2011 | En et al. | 705/36 R |
| 2005/0010516 A1* | 1/2005 | Ivanov | G06Q 40/06 705/36 R |
| 2005/0049952 A1 | 3/2005 | Carter | |
| 2005/0187851 A1* | 8/2005 | Sant | G06Q 40/06 705/36 R |
| 2005/0273422 A1 | 12/2005 | Villacorta | |
| 2007/0208643 A1* | 9/2007 | Gauthereon et al. | 705/36 R |
| 2007/0244788 A1* | 10/2007 | Ferris | 705/36 R |
| 2009/0018966 A1* | 1/2009 | Clark et al. | 705/36 R |
| 2009/0271332 A1* | 10/2009 | Lo et al. | 705/36 R |
| 2010/0293107 A1* | 11/2010 | Sudjianto et al. | 705/36 R |
| 2011/0178951 A1 | 7/2011 | Desai et al. | |
| 2012/0179692 A1* | 7/2012 | Hsiao et al. | 707/748 |

(Continued)

FOREIGN PATENT DOCUMENTS

JP     2010-501934     1/2010

OTHER PUBLICATIONS

Internatinoal Search Report and Written Opinion issued for Application No. PCT/US2014/041512, dated Oct. 13, 2014.

*Primary Examiner* — Hao Fu
(74) *Attorney, Agent, or Firm* — Hanchuk Kheit LLP; Walter G. Hanchuk

(57) ABSTRACT

The SECTOR-BASED PORTFOLIO CONSTRUCTION PLATFORM APPARATUSES, METHODS AND SYSTEMS ("SPC") transform user data request via SPC components into sector-based portfolio investment transaction records. In one implementation, the SPC may provide an electronic user interface (UI) (e.g., web-based, mobile, etc.) for a user to construct a sector-based investment portfolio, to obtain performance prediction for the portfolio's allocation strategies by performance back-testing of selected sector funds and indices.

37 Claims, 48 Drawing Sheets

Example SPC UI: Portfolio Monitor

(56) References Cited

U.S. PATENT DOCUMENTS

2013/0275337 A1* 10/2013 Gershon ................ G06Q 40/00
                                                    705/36 R
2013/0290216 A1* 10/2013 Scheffler ................ G06Q 40/04
                                                    705/36 R

* cited by examiner

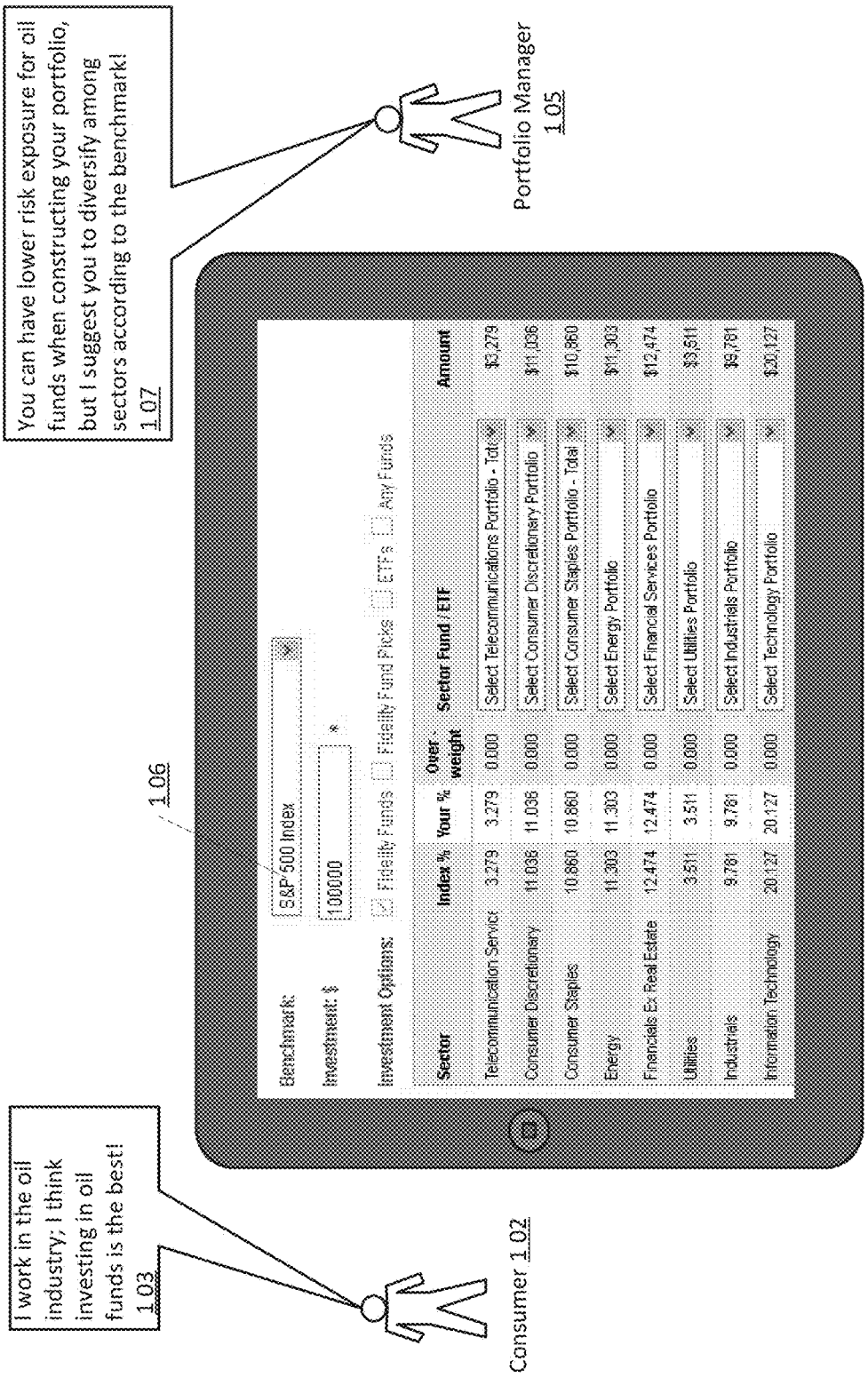
FIGURE 1A — SPC Example: SPC Sector-Based Portfolio Construction

SPC Data Flow: Sector-based Portfolio Construction

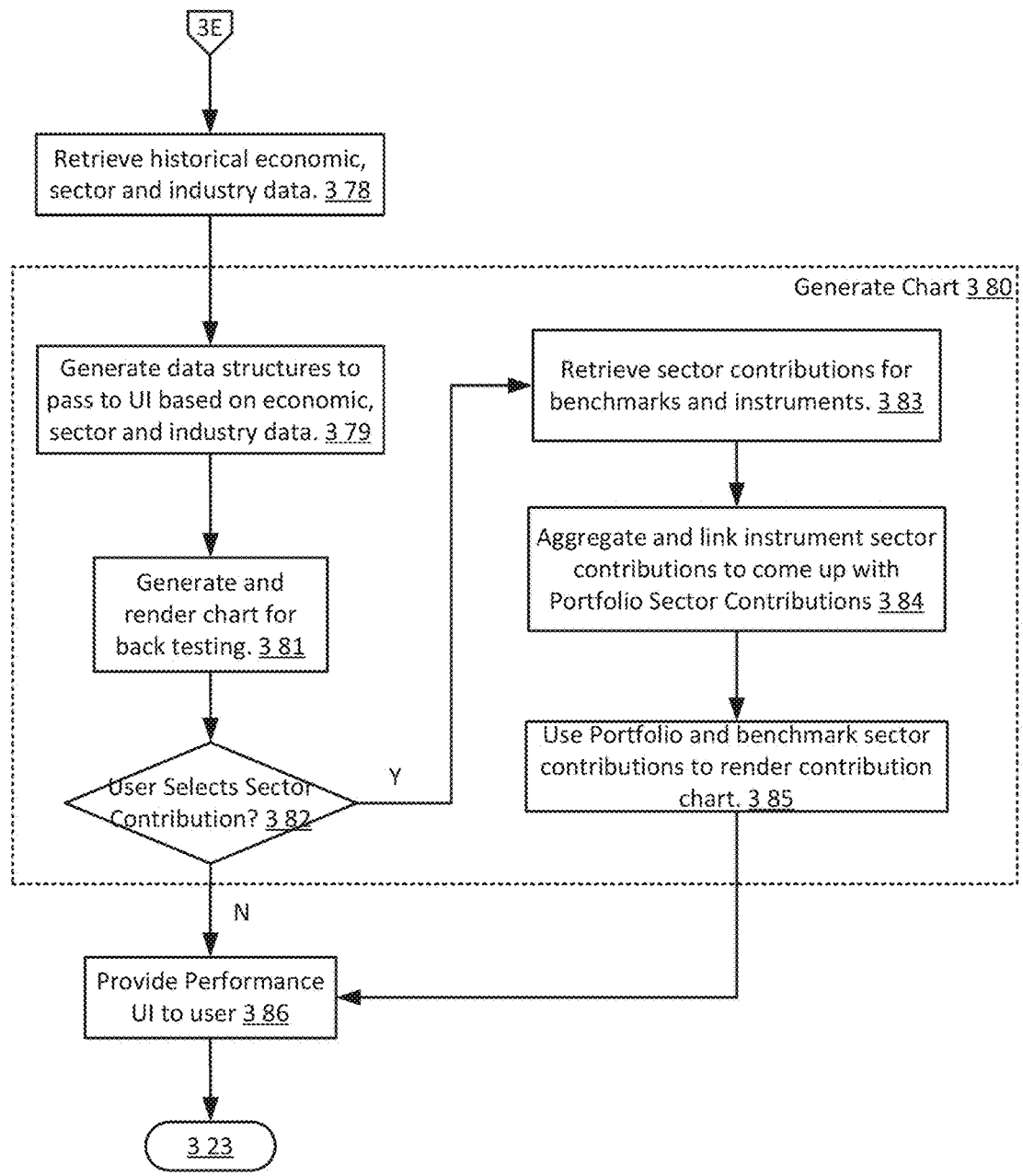
FIGURE 3F  SPC Logic Flow: Back Testing 322a

Example SPC Flow: Create a portfolio 4 00a

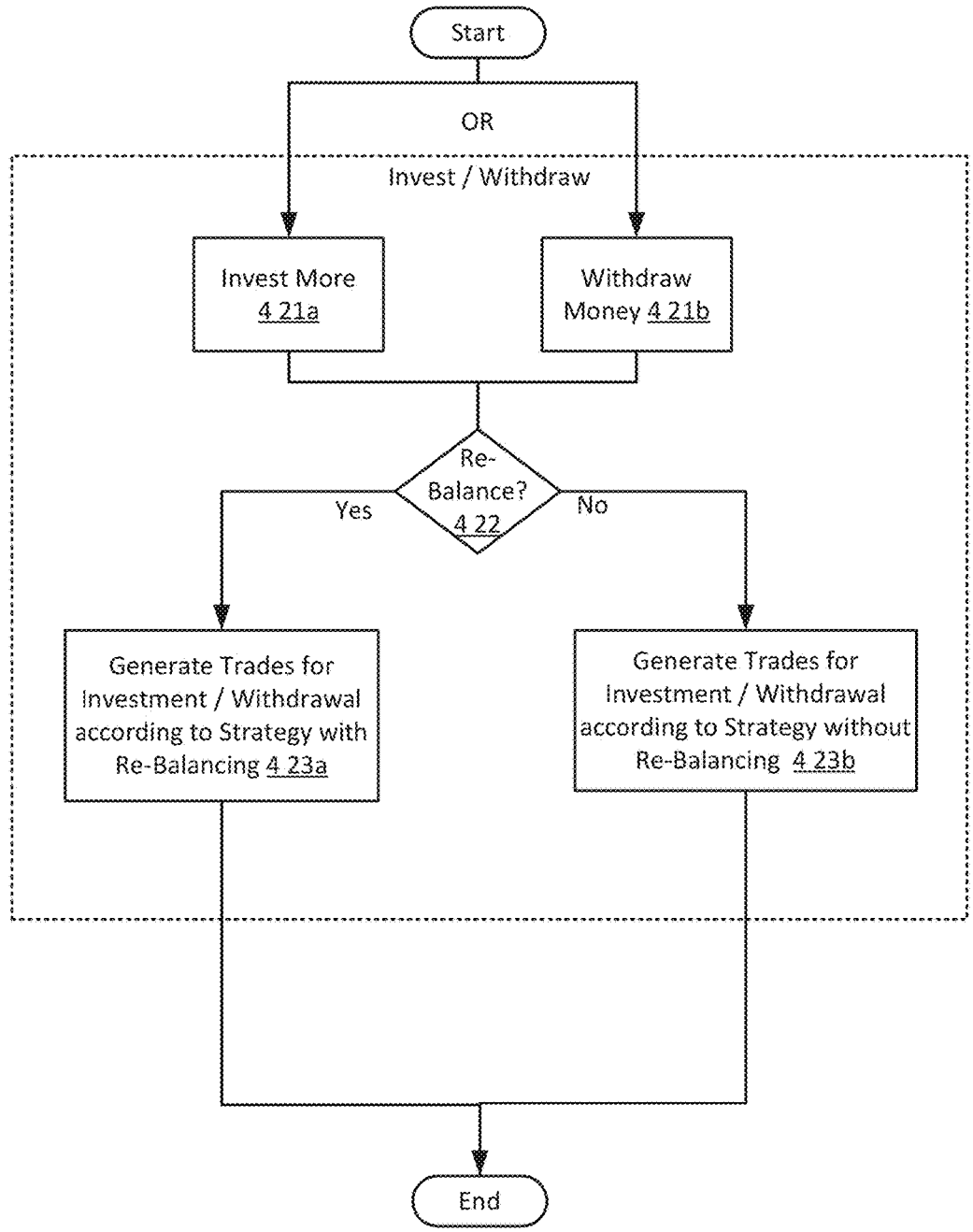
FIGURE 4B — Example SPC Flow: Edit a Portfolio 4 00b

Example SPC Flow: Rebalance 400d

Create Portfolio: Step 1 of 2

Portfolio Name: CustomPortfolio *

Start with:
- ◉ Benchmark — 5.01a
- ○ Pre-defined Model — 5.01b

Back-test Parameters:

| | Month | Year |
|---|---|---|
| Start Date: | 01 ▾ | 2014 ▾ |
| End Date: | 12 ▾ | 2015 ▾ |

Rebalance every: 3 ▾ Months

[Cancel] [Next »]

* Enter required values

Example SPC UI: Portfolio Creation

FIGURE 5A

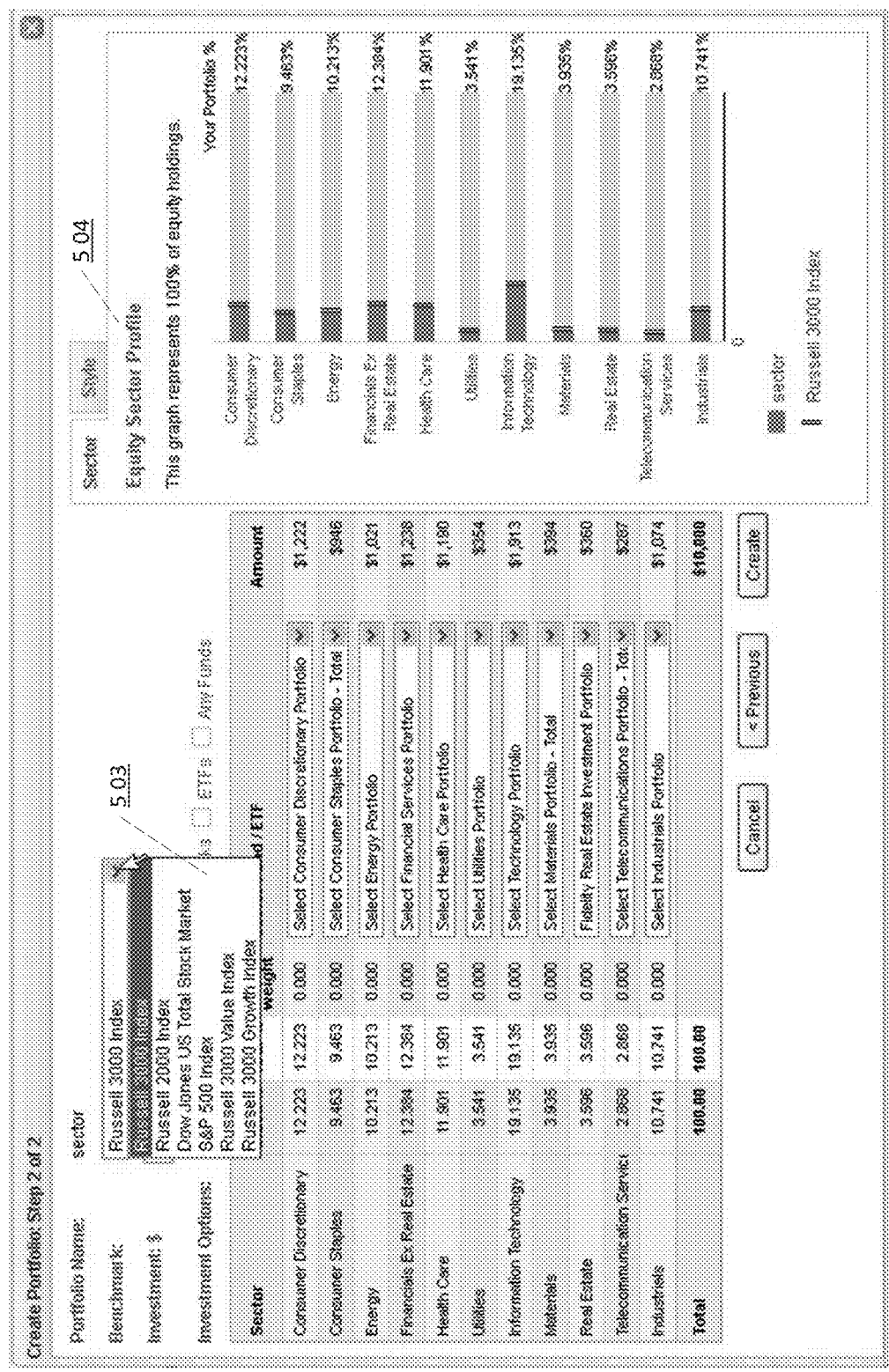
FIGURE 5B — Example SPC UI: Portfolio Creation

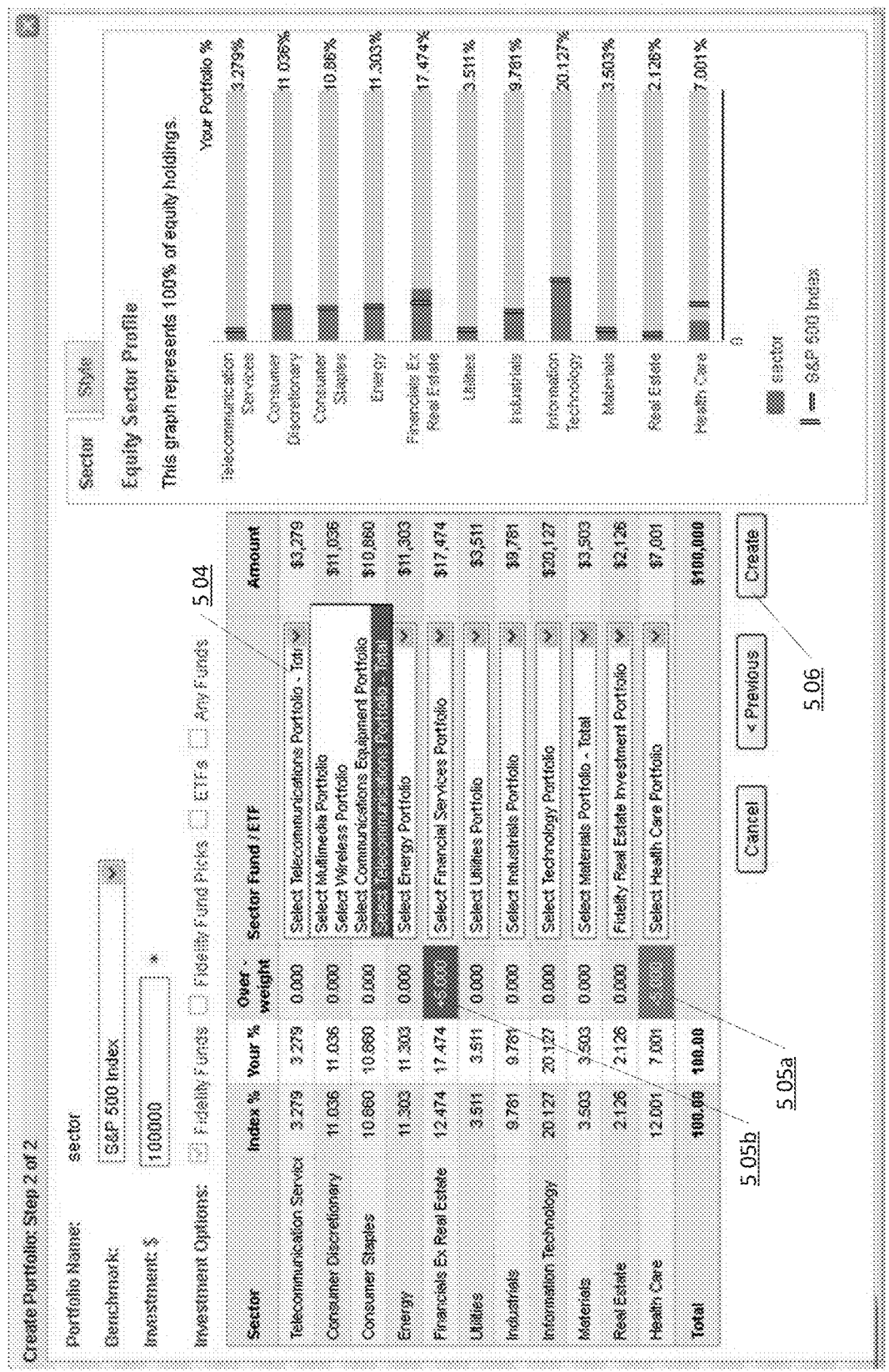
FIGURE 5C — Example SPC UI: Portfolio Creation

FIGURE 5E

Example SPC UI: Portfolio Creation

Create Portfolio: Step 1 of 2

Portfolio Name: [midcycle] *

Start with:
- ○ Benchmark
- ⊙ Pre-defined Model —— 5.01b

Back-test Parameters:

|  | Month | Year |
|---|---|---|
| Start Date: | 01 ▾ | 2014 ▾ |
| End Date: | 12 ▾ | 2015 ▾ |

Rebalance every: 3 ▾ Months

[Cancel] [Next >]

* Enter required values

FIGURE 5F        Example SPC UI: Portfolio Creation

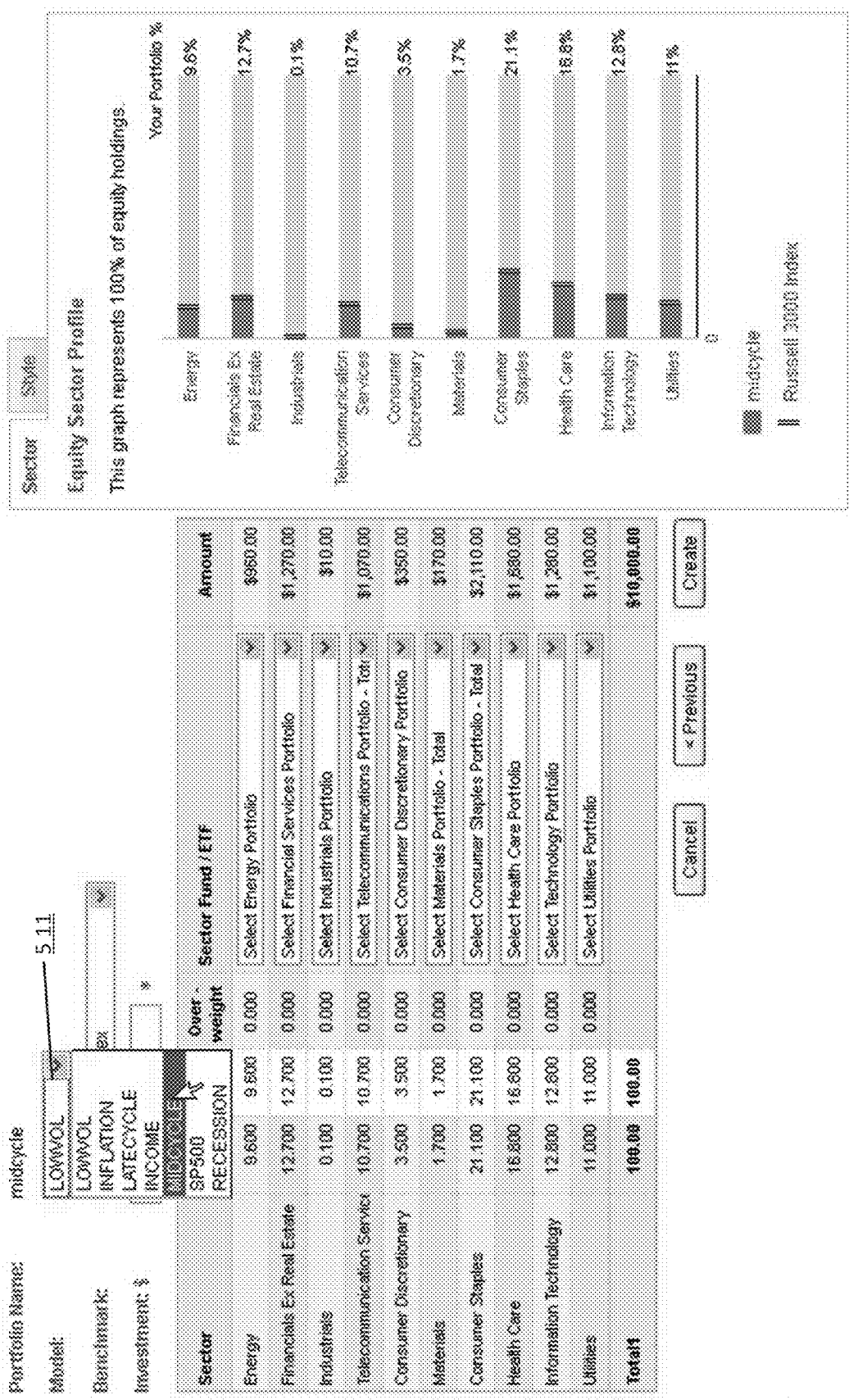
FIGURE 5G — Example SPC UI: Portfolio Creation

Example SPC UI: Portfolio Performance

Example SPC UI: Portfolio Performance

Example SPC UI: Portfolio Performance

Example SPC UI: Portfolio Performance

Example SPC UI: Portfolio Monitor

Example SPC UI: Portfolio vs. Sector Performance

Example SPC UI: Performance Attribution Heatmap

FIGURE 8A — Example SPC UI: Portfolio Management Dashboard

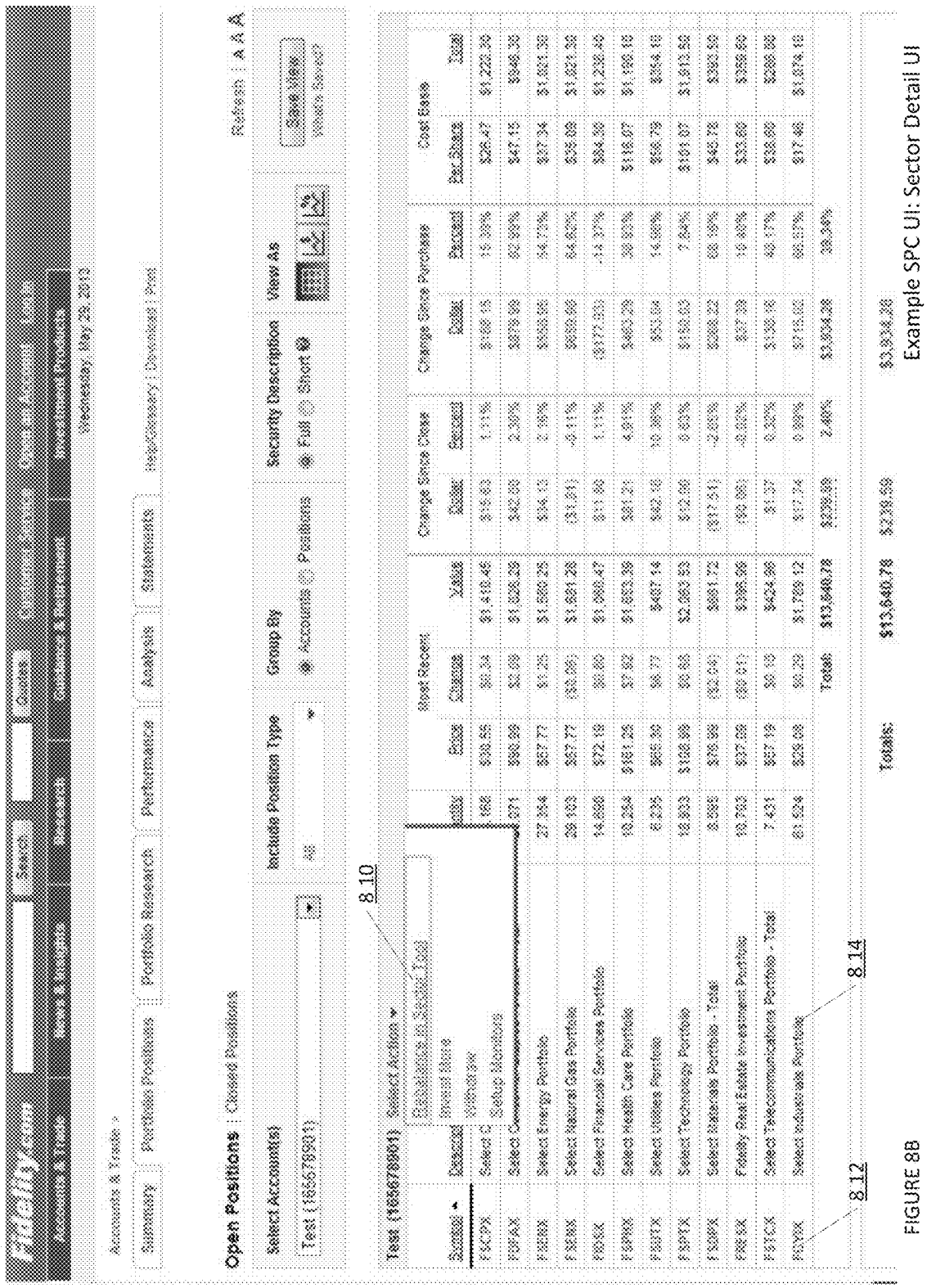
FIGURE 8B — Example SPC UI: Sector Detail UI

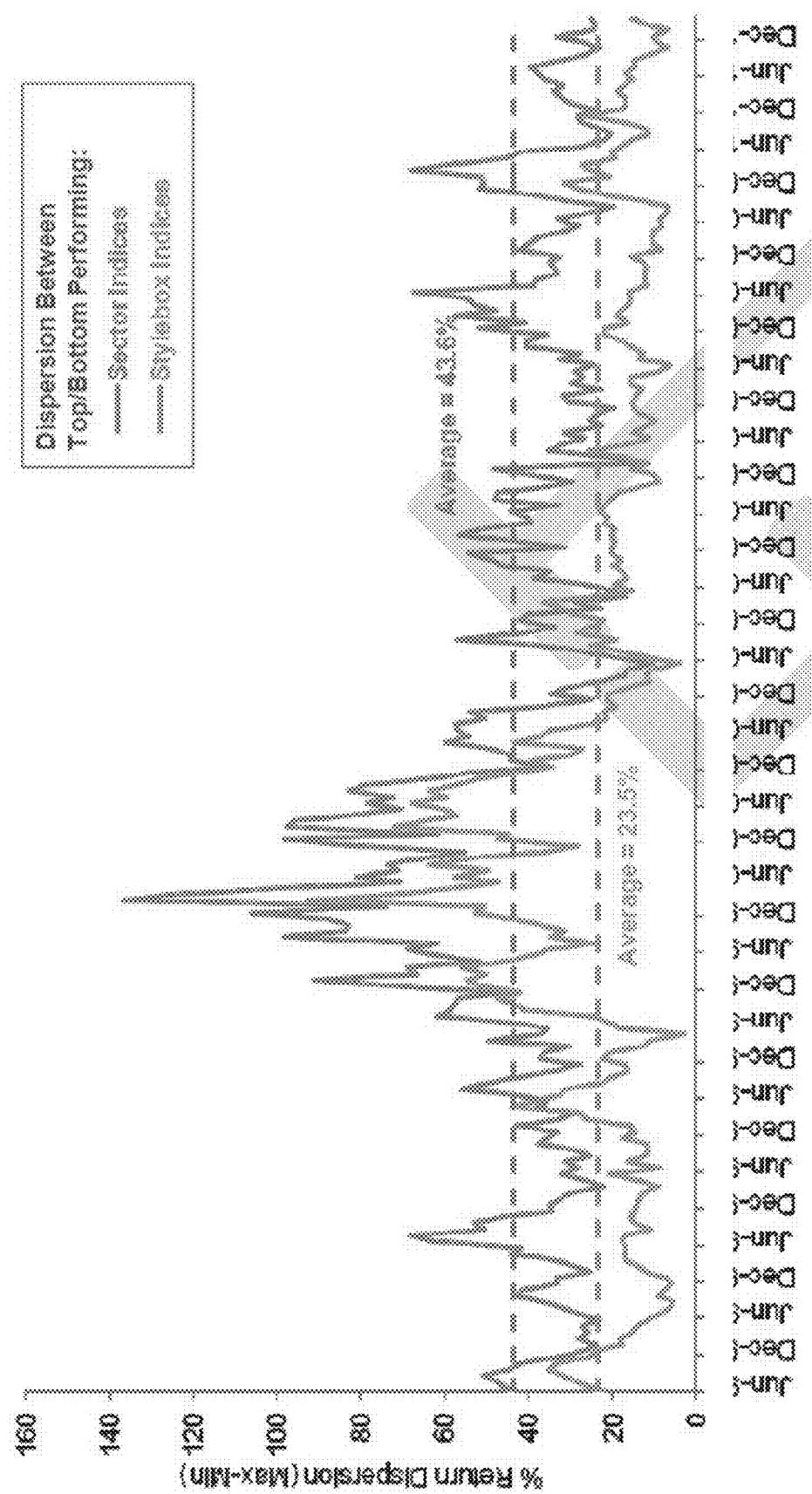
FIGURE 9C          Example SPC UI: Data Analytics

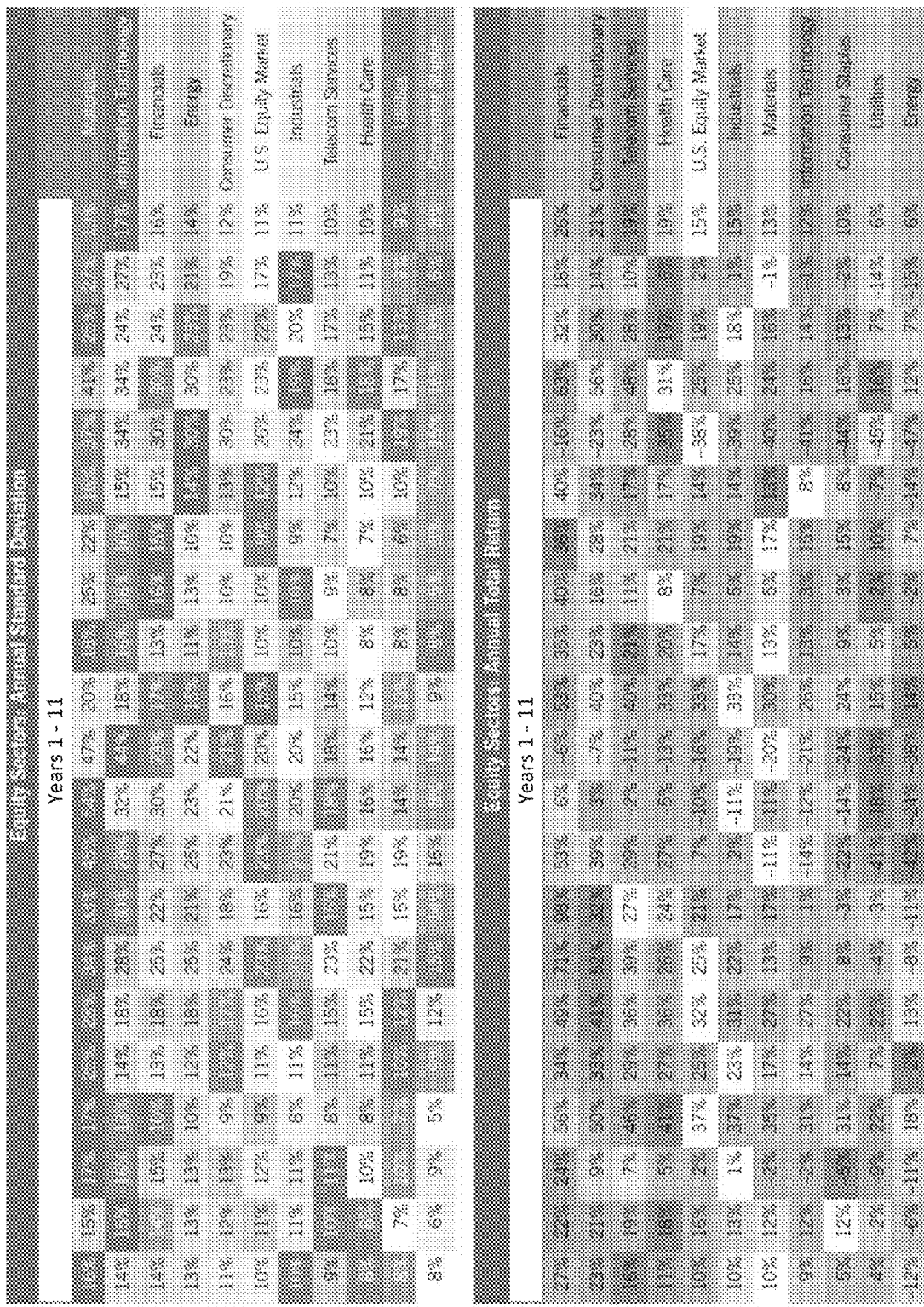
FIGURE 9D       Example SPC UI: Data Analytics

|  | Consumer Discretionary | Consumer Staples | Energy | Financials | Health Care | Industrials | Materials | Technology | Telecom | Utilities |
|---|---|---|---|---|---|---|---|---|---|---|
| Consumer Discretionary | 1.00 | 0.62 | 0.44 | 0.78 | 0.50 | 0.87 | 0.71 | 0.76 | 0.64 | 0.57 |
| Consumer Staples | 0.62 | 1.00 | 0.38 | 0.63 | 0.54 | 0.60 | 0.57 | 0.46 | 0.46 | 0.64 |
| Energy | 0.44 | 0.38 | 1.00 | 0.44 | 0.35 | 0.56 | 0.69 | 0.35 | 0.38 | 0.48 |
| Financials | 0.78 | 0.63 | 0.44 | 1.00 | 0.51 | 0.80 | 0.63 | 0.47 | 0.47 | 0.47 |
| Health Care | 0.50 | 0.54 | 0.35 | 0.51 | 1.00 | 0.55 | 0.44 | 0.46 | 0.40 | 0.47 |
| Industrials | 0.87 | 0.60 | 0.56 | 0.80 | 0.55 | 1.00 | 0.77 | 0.50 | 0.55 | 0.47 |
| Materials | 0.71 | 0.57 | 0.69 | 0.63 | 0.44 | 0.77 | 1.00 | 0.50 | 0.46 | 0.46 |
| Technology | 0.76 | 0.46 | 0.35 | 0.47 | 0.46 | 0.50 | 0.50 | 1.00 | 0.68 | 0.51 |
| Telecom Services | 0.64 | 0.46 | 0.38 | 0.47 | 0.40 | 0.55 | 0.46 | 0.68 | 1.00 | 0.51 |
| Utilities | 0.57 | 0.64 | 0.48 | 0.48 | 0.47 | 0.47 | 0.46 | 0.51 | 0.51 | 1.00 |

|  | Small Cap Growth | Small Cap Value | Mid Cap Growth | Mid Cap Value | Large Cap Growth | Large Cap Value |
|---|---|---|---|---|---|---|
| Small Cap Growth | 1.00 | 0.81 | 0.95 | 0.67 | 0.78 | 0.57 |
| Small Cap Value | 0.81 | 1.00 | 0.73 | 0.90 | 0.63 | 0.76 |
| Mid Cap Growth | 0.95 | 0.73 | 1.00 | 0.68 | 0.87 | 0.62 |
| Mid Cap Value | 0.67 | 0.90 | 0.68 | 1.00 | 0.70 | 0.90 |
| Large Cap Growth | 0.78 | 0.63 | 0.87 | 0.70 | 1.00 | 0.75 |
| Large Cap Value | 0.57 | 0.76 | 0.62 | 0.90 | 0.75 | 1.00 |

Example SPC UI: Data Analytics

FIGURE 9E

SECTOR-BASED PORTFOLIO CONSTRUCTION PLATFORM APPARATUSES, METHODS AND SYSTEMS

PRIORITY CLAIM

This application is a non-provisional of and claims priority under 35 U.S.C. § 119 to U.S. provisional application Ser. No. 61/833,425, filed Jun. 10, 2013, entitled "Sector-Based Portfolio Construction Platform Apparatuses, Methods And Systems", which is herein expressly incorporated by reference.

This application for letters patent discloses and describes various novel innovations and inventive aspects of SECTOR-BASED PORTFOLIO CONSTRUCTION PLATFORM technology (hereinafter "SPC") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for investment portfolio management, and more particularly, include SECTOR-BASED PORTFOLIO CONSTRUCTION PLATFORM APPARATUSES, METHODS AND SYSTEMS ("SPC").

BACKGROUND

Consumers invest in financial instruments to pursue an economic profit. Consumers buy publicly traded financial instruments from a public trading exchange platform (i.e., an outcry bidding system). Common publicly traded financial instruments are stocks, bonds, future contracts, and options. Consumers can buy or sell one or more types of financial instruments to form an investment portfolio. In order to manage the performance of the investment portfolio, consumers need to closely track the pricing index of each financial instrument in the portfolio on a daily basis.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIG. 1A provides an example diagram illustrating aspects of sector-based portfolio construction within embodiments of the SPC;

FIGS. 3D-3F provide example logic flow diagrams illustrating aspects of portfolio performance back testing component 322a within embodiments of the SPC;

FIG. 4B provide an example logic flow diagram illustrating component 400b for editing a portfolio within embodiments of the SPC;

Figure 5E:
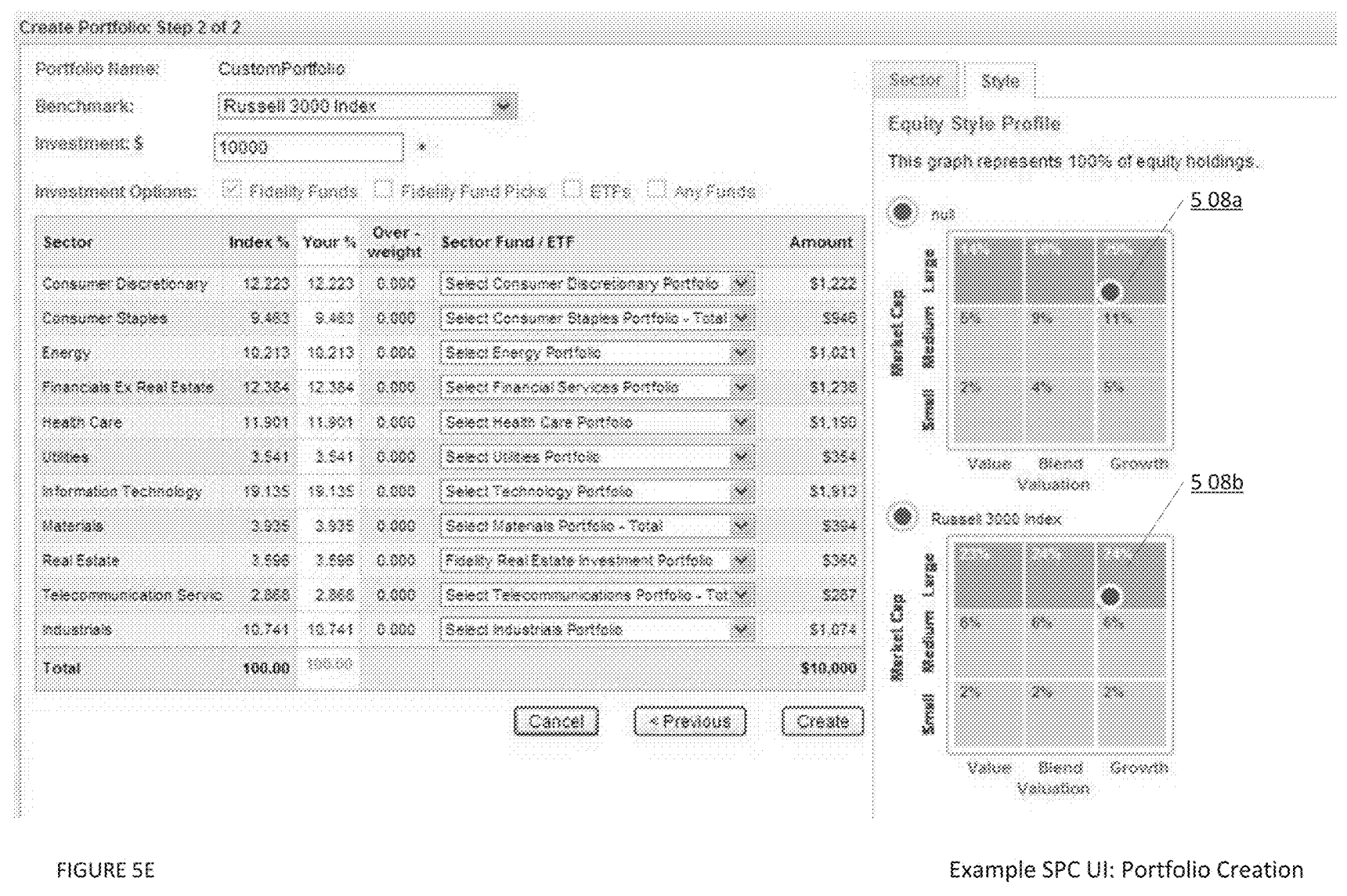

FIGS. 5A-5G provide example user interface (UI) diagrams illustrating aspects of portfolio creation within embodiments of the SPC;

FIGS. 8A-8B provide example UI diagrams illustrating aspects of brokerage portfolio management within embodiments of the SPC;

FIGS. 9A-9G provide example data plots illustrating aspects of market data analytics within embodiments of the SPC.

Figure 1B:
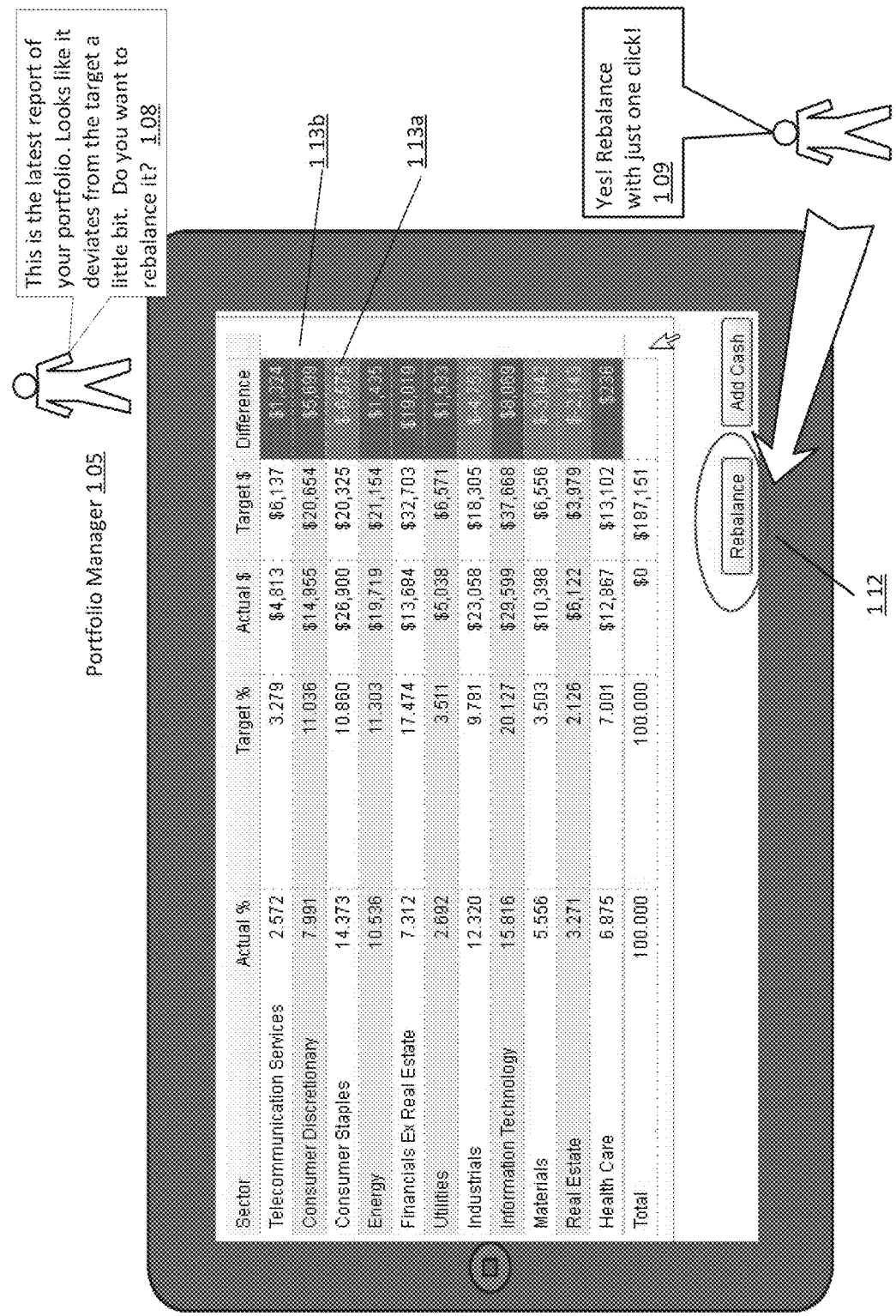
FIG. 1B provides an example diagram illustrating aspects of portfolio performance monitoring, reporting and rebalancing via one-click within embodiments of the SPC.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The SECTOR-BASED PORTFOLIO CONSTRUCTION PLATFORM technology (hereinafter "SPC") provides an investment analytics and management tool facilitating a user (e.g., investors, consumers, portfolio managers, traders, etc.) to research, build and maintain an investment strategy for a customized portfolio that is made of sector funds and/or Exchange-Traded Funds (ETFs) as constituents. In one embodiment, the SPC may provide an electronic user interface (UI) (e.g., web-based, mobile, etc.) for a user to construct a sector-based investment portfolio, to obtain performance prediction for the portfolio's allocation strategies by performance back-testing of selected sector funds and indices. In one embodiment, the SPC may provide an UI for the user to track the sector allocation portfolio and to periodically re-balance the portfolio by a "one-click" button provided on the UI. In another embodiment, the SPC may provide an UI for the user to maintain the portfolio allocation through additional investments and/or withdrawals.

In one implementation, the SPC may apply a sector-based framework to equity portfolio construction, which may help investors achieve a variety of alpha-seeking investment objectives and control in managing portfolio risk. Example equity sectors may have a variety of attributes, including stable classification, consistent earnings drivers, high return differentiation, clear volatility patterns, and low correlations, and/or the like, which can help investors generate efficient portfolios. In one implementation, sectors may be used as portfolio construction building blocks through a variety of investment strategies, including sector allocation, portfolio overlays, portfolio completion, risk management, and/or the like, and to diversify wealth beyond human capital exposures.

Sector-Based Portfolio Construction Platform (SPC)

FIG. 1A provides an example diagram illustrating aspects of sector-based portfolio construction within embodiments of the SPC. In one implementation, the SPC may provide utilization of sectors to construct portfolio accounting for human capital. Individual investors may have significant risk exposures in their human capital to the industry in which they work. Individuals may better diversify this exposure within their financial portfolio (stocks and bonds) by allocating to sectors with fewer risk exposures related to the sector in which they work.

For example, as shown in FIG. 1A, consumers/investors 102 who may not be seasoned in investment/market strategies may turn to concentrate their investment on a single or a few limited industry sectors, e.g., a consumer 102 may tend to focus on an industry he/she is familiar with, etc. For example, if the consumer 102 is employed in an oil company, he/she may tend to focus on investing in the oil industry funds for low risk exposure 103. In one embodiment, the SPC (e.g., operated by a portfolio manager 105, and/or the consumer 102, etc.) may facilitate the consumer to diversify the investment portfolio by constructing a sector portfolio construction leveraging the precise risk/return exposures of sectors and industries to fine tune equity risk exposures of a portfolio 107 (e.g., by reducing the portion of investment in the portfolio in the industry the user is employed at, etc.).

For example, as shown at 104, the SPC may provide a UI for an investor (e.g., the consumer 102 and/or the portfolio manager 105, etc.) to allocate investment amount/percentage of their portfolio across different industrial sectors, such as, but not limited to telecommunication services, consumer discretionary, consumer staples, energy, financials and real estates, utilities, industrials, information technology, and/or the like; and to select funds/ETFs under different sector. In one implementation, the SPC may pull an industrial standardized index (e.g., S&P 500 Index, etc.) 106 as a target allocation strategy, e.g., see further illustration in FIGS. 5A-5F.

FIG. 1B provides an example diagram illustrating aspects of portfolio performance monitoring, reporting and rebalancing via one-click within embodiments of the SPC. In one embodiment, the SPC may track the performance of the portfolio (e.g., as constructed via the UI 104 in FIG. 1A, etc.), including its current return rate, allocation weight of each sector, and/or the like. In one implementation, the portfolio manager 105 (and/or the consumer 102 themselves) may access a SPC UI to obtain a latest report of the portfolio performance 108, which may show a list of the actual allocations of the instant date, and the target allocation weights (e.g., according to a selected benchmark/model, etc.). In one implementation, the SPC UI may point out the difference between the actual allocation weight and the target allocation weight of each sector, e.g., an orange block 113a showing underweighting (e.g., actual weight less than target weight), a green block 113b showing overweighting (e.g., actual weight greater than target weight), etc.

In one implementation, a consumer 102 and/or a portfolio manager 105 may submit a rebalance request to adjust the actual allocation weights by one click, e.g., 112. Further implementations of SPC rebalance are discussed in FIGS. 2C, 3C and 14D.

Figure 2A:
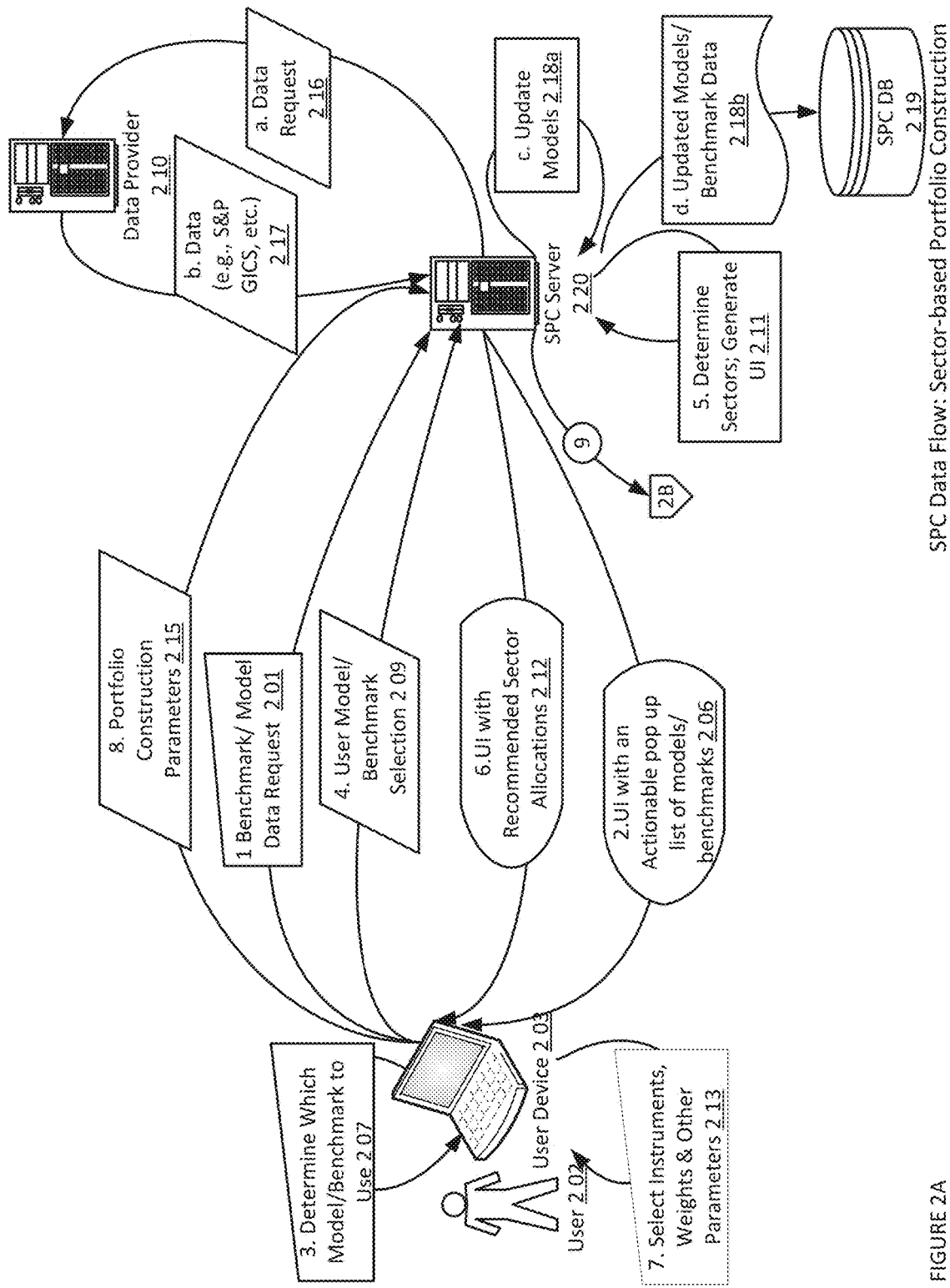
FIGS. 2A-2C provide example datagraph diagrams illustrating aspects of interactive data flows between the SPC server and its affiliated entities for sector-based portfolio construction, portfolio performance back testing and rebalancing within embodiments of the SPC.
Figure 2B:
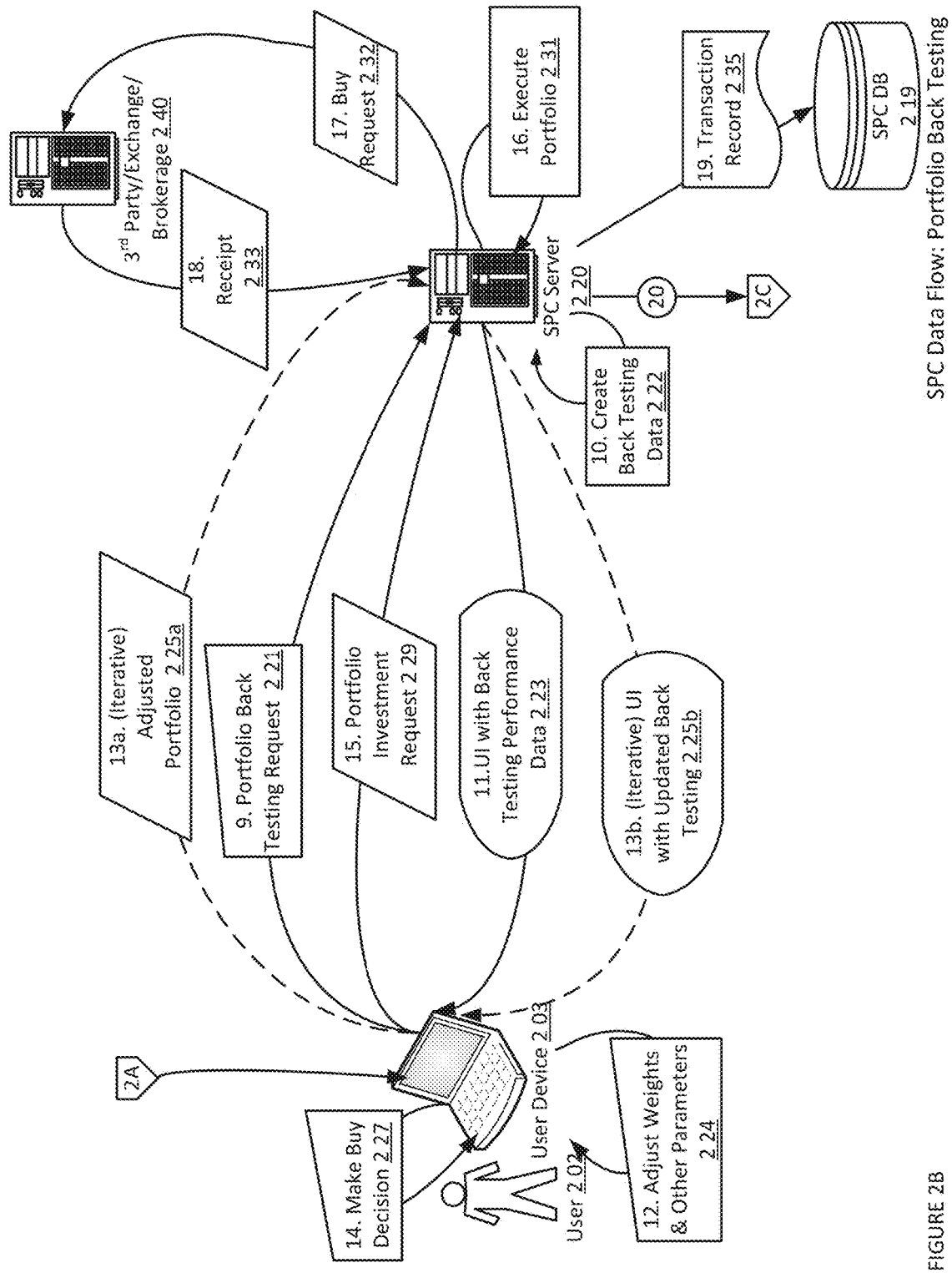
Figure 2C:
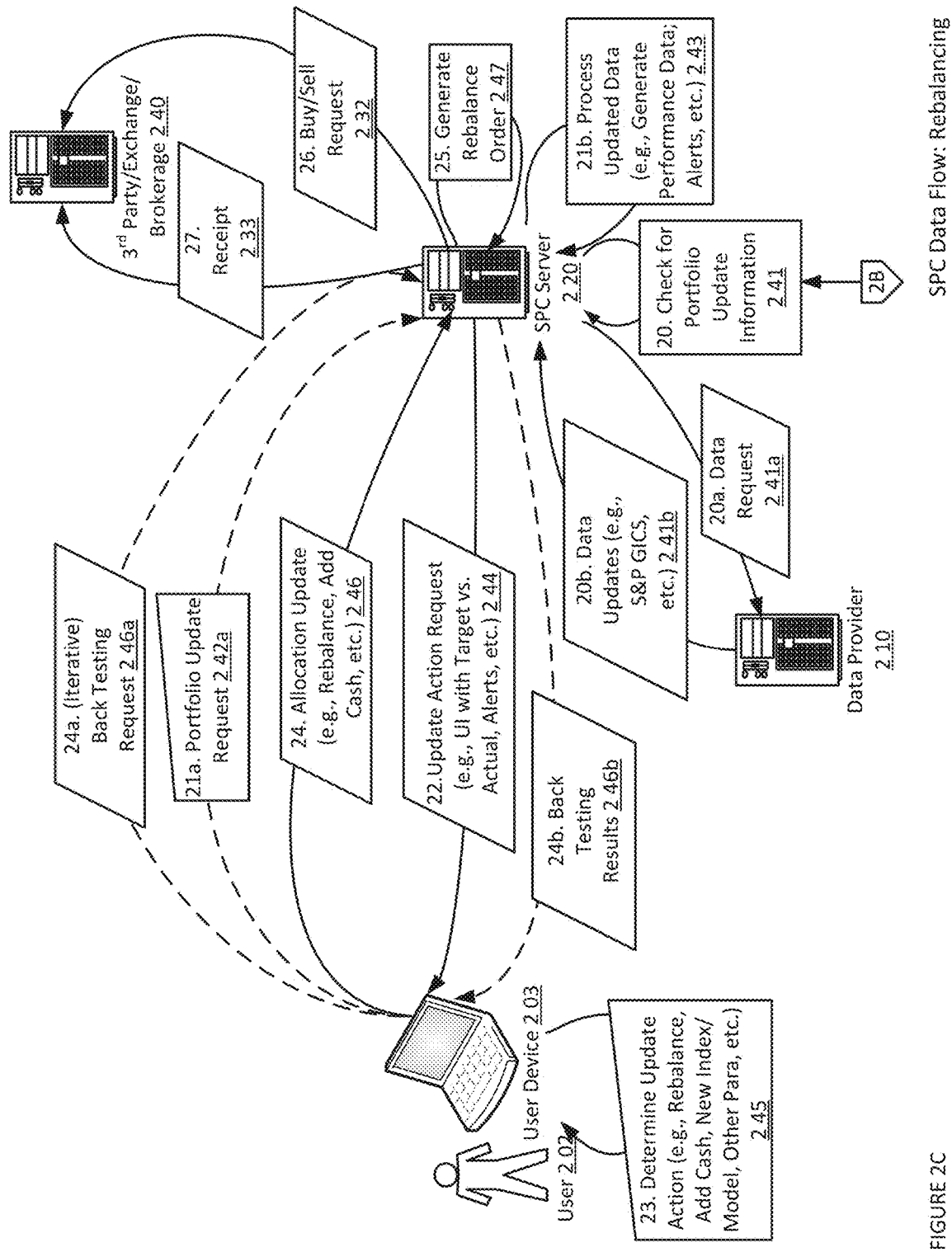

FIGS. 2A-2C provide example datagraph diagrams illustrating aspects of interactive data flows between the SPC server and its affiliated entities for sector-based portfolio construction, portfolio performance back testing and rebalancing within embodiments of the SPC. Within embodiments, a SPC server 220, a user 202 (e.g., a consumer, an individual investor, a portfolio manager, a broker, etc.), a user device 203, a data provider 210 (e.g., stock exchange, standard index listing publishers, etc.), a third party/exchange/brokerage 240, a SPC database 219, and/or the like, may interact and exchange data messages via a communication network with regard to sector-based portfolio construction, monitoring, rebalancing and execution within embodiments of the SPC.

In one embodiment, a user 202 may operate a user device 203, which may include any of a desktop computer, a laptop computer, a tablet computer, a Smartphone (e.g., a BlackBerry, an Apple iPhone, a Google Android, a HTC, a Samsung Galaxy, etc.), and/or the like. In one implementation, the user device 203 may send a benchmark/model data request 201 (e.g., see 501a/b in FIG. 5A) to the SPC server 220, wherein the benchmark/model may comprise a sector investment strategy (e.g., allocation weights across different sectors, etc.). For example, the user device 203 may generate a (Secure) Hypertext Transfer Protocol ("HTTP(S)") message including a benchmark/model data request 201 in the form of data formatted according to the eXtensible Markup Language (XML). An example listing of a benchmark/model request 201, substantially in the form of a HTTP(S) message including XML-formatted data, is provided below:

```
POST /benchmark_request.php HTTP/1.1
Host: 192.168.23.126
Content-Type: Application/XML
Content-Length: 867
<?XML version = "1.0" encoding = "UTF-8"?>
<benchmark_request>
    <session_id> HUUUSDWE </session_id>
    <timestamp> 2014-02-22 15:22:43</timestamp>
    <user_id> JS001 </user_id>
    <client_details>
        <client_IP>192.168.23.126</client_IP>
        <client_type>smartphone</client_type>
        <client_model>HTC Hero</client_model>
        <device_id> HTC_JS_001 </device_id>
    ...
    <client_details>
    ...
    <request> benchmark </request>
    ...
<benchmark_request>
```

In one implementation, the SPC server 220 may return a UI with an actionable pop-up list of pre-defined models and/or benchmarks 206, e.g., see FIG. 5B. In one implementation, the benchmarks may include, but not limited to (e.g., Russell 3000 index, Russell 2000 index, Dow ones US Total Stock Market, S&P 500 Index, Russell 300 Value Index, Russell 3000 Growth Index, S&P GICS, and/or the like. In another implementation, the pre-defined models may be developed based on different economic cycles and/or different objectives, e.g., models defined for low volatility, inflation, late economic cycle, mid economic cycle, recession, S&P 500, etc. Each model may include a set of allocation weights for investment across different sectors. For example, in one implementation, the pre-defined model may include an optimization structure with an objective to optimize for low volatility, inflation, late economic cycle, mid economic cycle, and/or the like and the portfolio parameters (e.g., investment amount, sector funds selected, etc), with the set of allocation weights as optimization variables. In one implementation, when the user has entered the portfolio amount and selected sector funds, the SPC may instantiate the optimization structure to obtain a set of allocation weights as the target allocation weights.

An example listing of the models/benchmarks UI 206, substantially in the form of a HTTP(S) POST message including XML-formatted data, is provided below:

```
POST /benchmark_request.php HTTP/1.1
Host: www.spc.com
Content-Type: Application/XML
Content-Length: 867
<?XML version = "1.0" encoding = "UTF-8"?>
<benchmark_UI>
    <session_id> HUUUSDWE </session_id>
    <timestamp> 2014-02-22 15:22:43</timestamp>
    <user_id> JS001 </user_id>
    ...
    <portfolio_name> sector </portfolio_name>
    <benchmark>
      <type> drop-down </type>
      <option_1> S&P 500 </option_1>
```

-continued

```
      <option_2> Russell 2000</option_2>
      <option_3> Russell 3000 </option_3>
      ...
    </benchmark>
    <investment_amount> 1,000 </investment_amount>
    <investment_option>
       <option_1> sector </option_1>
       <option_2> ETF </option_2>
       ...
    </investment_option>
    <portfolio>
       <sector1>
         <name> consumer discretionary </name>
         <target_w> 12.223% </target_w>
         <actual_w> 12.233% </actual_w>
         <amount> 1,222 </amount>
         <funds>
           <action> drop-down </action>
           <option_1> select consumer discretionary portfolio
    </option-1>
           <option_2> select sector fund </option_2>
           ...
         </funds>
    ...
  <benchmark_UI>
```

In another implementation, the SPC server 220 may generate the UI 206 by populating the following data:

```
[{"ticker":null,"indexCode":"RU3000","indexName":"Russell 3000
  Index","sectorAllocations":[{"indexCode":"RU3000","indexName":"Russell 3000
  Index","quarterlyReturns":null,"pdpAllocation":12,"sectorName":"Consumer
  Discretionary","allocation":12,"allocationDouble":12.223329},{"indexCode":"R
  U3000","indexName":"Russell 3000
  Index","quarterlyReturns":null,"pdpAllocation":9,"sectorName":"Consumer
  Staples","allocation":9,"allocationDouble":9.462689},{"indexCode":"RU3000","
  indexName":"Russell 3000
  Index","quarterlyReturns":null,"pdpAllocation":10,"sectorName":"Energy","all
  ocation":10,"allocationDouble":10.21315},{"indexCode":"RU3000","indexName":"
  Russell 3000
  Index","quarterlyReturns":null,"pdpAllocation":12,"sectorName":"Financials
  Ex Real
  Estate","allocation":12,"allocationDouble":12.384243},{"indexCode":"RU3000",
  "indexName":"Russell 3000
  Index","quarterlyReturns":null,"pdpAllocation":11,"sectorName":"Health
  Care","allocation":11,"allocationDouble":11.900503},{"indexCode":"RU3000","i
  ndexName":"Russell 3000
  Index","quarterlyReturns":null,"pdpAllocation":3,"sectorName":"Utilities","a
  llocation":3,"allocationDouble":3.541392},{"indexCode":"RU3000","indexName":
  "Russell 3000
  Index","quarterlyReturns":null,"pdpAllocation":19,"sectorName":"Information
  Technology","allocation":19,"allocationDouble":19.134748},{"indexCode":"RU30
  00","indexName":"Russell 3000
  Index","quarterlyReturns":null,"pdpAllocation":3,"sectorName":"Materials","a
  llocation":3,"allocationDouble":3.935424},{"indexCode":"RU3000","indexName":
  "Russell 3000
  Index","quarterlyReturns":null,"pdpAllocation":3,"sectorName":"Real
  Estate","allocation":3,"allocationDouble":3.596173},{"indexCode":"RU3000","i
  ndexName":"Russell 3000
  Index","quarterlyReturns":null,"pdpAllocation":2,"sectorName":"Telecommunica
  tion
  Services","allocation":2,"allocationDouble":2.867763},{"indexCode":"RU3000",
  "indexName":"Russell 3000
  Index","quarterlyReturns":null,"pdpAllocation":10,"sectorName":"Industrials"
  ,"allocation":10,"allocationDouble":10.740574}]},{"ticker":null,"indexCode":
  "RU2000","indexName":"Russell 2000
  Index","sectorAllocations":[{"indexCode":"RU2000","indexName":"Russell 2000
  Index","quarterlyReturns":null,"pdpAllocation":13,"sectorName":"Consumer
  Discretionary","allocation":13,"allocationDouble":13.936883},{"indexCode":"R
  U2000","indexName":"Russell 2000
  Index","quarterlyReturns":null,"pdpAllocation":3,"sectorName":"Consumer
  Staples","allocation":3,"allocationDouble":3.603211},{"indexCode":"RU2000","
  indexName":"Russell 2000
  Index","quarterlyReturns":null,"pdpAllocation":6,"sectorName":"Energy","allo
  cation":6,"allocationDouble":6.115144},{"indexCode":"RU2000","indexName":"Ru
  ssell 2000
```

-continued

Index","quarterlyReturns":null,"pdpAllocation":13,"sectorName":"Financials Ex Real Estate","allocation":13,"allocationDouble":13.805073},{"indexCode":"RU2000", "indexName":"Russell 2000 Index","quarterlyReturns":null,"pdpAllocation":13,"sectorName":"Health Care","allocation":13,"allocationDouble":13.43455},{"indexCode":"RU2000","in dexName":"Russell 2000 Index","quarterlyReturns":null,"pdpAllocation":14,"sectorName":"Industrials" ,"allocation":14,"allocationDouble":14.688345},{"indexCode":"RU2000","indexN ame":"Russell 2000 Index","quarterlyReturns":null,"pdpAllocation":17,"sectorName":"Information Technology","allocation":17,"allocationDouble":17.07536},{"indexCode":"RU200 0","indexName":"Russell 2000 Index","quarterlyReturns":null,"pdpAllocation":5,"sectorName":"Materials","a llocation":5,"allocationDouble":5.017133},{"indexCode":"RU2000","indexName": "Russell 2000 Index","quarterlyReturns":null,"pdpAllocation":7,"sectorName":"Real Estate","allocation":7,"allocationDouble":7.921459},{"indexCode":"RU2000","i ndexName":"Russell 2000 Index","quarterlyReturns":null,"pdpAllocation":0,"sectorName":"Telecommunica tion Services","allocation":0,"allocationDouble":0.756848},{"indexCode":"RU2000", "indexName":"Russell 2000 Index","quarterlyReturns":null,"pdpAllocation":3,"sectorName":"Utilities","a llocation":3,"allocationDouble":3.645968}]},{"ticker":null,"indexCode":"DW50 0F","indexName":"Dow Jones US Total Stock Market","sectorAllocations":[{"indexCode":"DW500F","indexName":"Dow Jones US Total Stock Market","quarterlyReturns":null,"pdpAllocation":12,"sectorName":"Consumer Discretionary","allocation":12,"allocationDouble":12.029038},{"indexCode":"D W500F","indexName":"Dow Jones US Total Stock Market","quarterlyReturns":null,"pdpAllocation":9,"sectorName":"Consumer Staples","allocation":9,"allocationDouble":9.481112},{"indexCode":"DW500F"," indexName":"Dow Jones US Total Stock Market","quarterlyReturns":null,"pdpAllocation":10,"sectorName":"Energy","al location":10,"allocationDouble":10.433153},{"indexCode":"DW500F","indexName" :"Dow Jones US Total Stock Market","quarterlyReturns":null,"pdpAllocation":12,"sectorName":"Financials Ex Real Estate","allocation":12,"allocationDouble":12.380647},{"indexCode":"DW500F", "indexName":"Dow Jones US Total Stock Market","quarterlyReturns":null,"pdpAllocation":11,"sectorName":"Health Care","allocation":11,"allocationDouble":11.846767},{"indexCode":"DW500F","i ndexName":"Dow Jones US Total Stock Market","quarterlyReturns":null,"pdpAllocation":3,"sectorName":"Utilities"," allocation":3,"allocationDouble":3.554747},{"indexCode":"DW500F","indexName" :"Dow Jones US Total Stock Market","quarterlyReturns":null,"pdpAllocation":19,"sectorName":"Information Technology","allocation":19,"allocationDouble":19.253981},{"indexCode":"DW50 0F","indexName":"Dow Jones US Total Stock Market","quarterlyReturns":null,"pdpAllocation":3,"sectorName":"Materials"," allocation":3,"allocationDouble":3.889624},{"indexCode":"DW500F","indexName" :"Dow Jones US Total Stock Market","quarterlyReturns":null,"pdpAllocation":3,"sectorName":"Real Estate","allocation":3,"allocationDouble":3.623726},{"indexCode":"DW500F","i ndexName":"Dow Jones US Total Stock Market","quarterlyReturns":null,"pdpAllocation":2,"sectorName":"Telecommunic ation Services","allocation":2,"allocationDouble":2.863741},{"indexCode":"DW500F", "indexName":"Dow Jones US Total Stock Market","quarterlyReturns":null,"pdpAllocation":10,"sectorName":"Industrials ","allocation":10,"allocationDouble":10.643473}]},{"ticker":null,"indexCode" :"SP500","indexName":"S&P 500 Index","sectorAllocations":[{"indexCode":"SP500","indexName":"S&P 500 Index","quarterlyReturns":null,"pdpAllocation":3,"sectorName":"Utilities","a llocation":3,"allocationDouble":3.510983},{"indexCode":"SP500","indexName":" S&P 500 Index","quarterlyReturns":null,"pdpAllocation":3,"sectorName":"Telecommunica tion Services","allocation":3,"allocationDouble":3.278895},{"indexCode":"SP500"," indexName":"S&P 500 Index","quarterlyReturns":null,"pdpAllocation":2,"sectorName":"Real Estate","allocation":2,"allocationDouble":2.125997},{"indexCode":"SP500","in dexName":"S&P 500 Index","quarterlyReturns":null,"pdpAllocation":3,"sectorName":"Materials","a llocation":3,"allocationDouble":3.503259},{"indexCode":"SP500","indexName":" S&P 500

Index","quarterlyReturns":null,"pdpAllocation":20,"sectorName":"Information Technology","allocation":20,"allocationDouble":20.126579},{"indexCode":"SP500","indexName":"S&P 500 Index","quarterlyReturns":null,"pdpAllocation":9,"sectorName":"Industrials","allocation":9,"allocationDouble":9.780891},{"indexCode":"SP500","indexName":"S&P 500 Index","quarterlyReturns":null,"pdpAllocation":12,"sectorName":"Health Care","allocation":12,"allocationDouble":12.001442},{"indexCode":"SP500","indexName":"S&P 500 Index","quarterlyReturns":null,"pdpAllocation":12,"sectorName":"Financials Ex Real Estate","allocation":12,"allocationDouble":12.473605},{"indexCode":"SP500","indexName":"S&P 500 Index","quarterlyReturns":null,"pdpAllocation":11,"sectorName":"Energy","allocation":11,"allocationDouble":11.302598},{"indexCode":"SP500","indexName":"S&P 500 Index","quarterlyReturns":null,"pdpAllocation":11,"sectorName":"Consumer Discretionary","allocation":11,"allocationDouble":11.036097},{"indexCode":"SP500","indexName":"S&P 500 Index","quarterlyReturns":null,"pdpAllocation":10,"sectorName":"Consumer Staples","allocation":10,"allocationDouble":10.859658}]},{"ticker":null,"indexCode":"RU3000V","indexName":"Russell 3000 Value Index","sectorAllocations":[{"indexCode":"RU3000V","indexName":"Russell 3000 Value Index","quarterlyReturns":null,"pdpAllocation":8,"sectorName":"Consumer Discretionary","allocation":8,"allocationDouble":8.172064},{"indexCode":"RU3000V","indexName":"Russell 3000 Value Index","quarterlyReturns":null,"pdpAllocation":6,"sectorName":"Consumer Staples","allocation":6,"allocationDouble":6.905894},{"indexCode":"RU3000V","indexName":"Russell 3000 Value Index","quarterlyReturns":null,"pdpAllocation":16,"sectorName":"Energy","allocation":16,"allocationDouble":16.080112},{"indexCode":"RU3000V","indexName":"Russell 3000 Value Index", "quarterlyReturns":null,"pdpAllocation":22,"sectorName":"Financials Ex Real Estate","allocation":22,"allocationDouble":22.284724},{"indexCode":"RU3000V","indexName":"Russell 3000 Value Index","quarterlyReturns":null,"pdpAllocation":11,"sectorName":"Health Care","allocation":11,"allocationDouble":11.181976},{"indexCode":"RU3000V","indexName":"Russell 3000 Value Index","quarterlyReturns":null,"pdpAllocation":6,"sectorName":"Utilities","allocation":6,"allocationDouble":6.77937},{"indexCode":"RU3000V","indexName":"Russell 3000 Value Index","quarterlyReturns":null,"pdpAllocation":6,"sectorName":"Information Technology","allocation":6,"allocationDouble":6.793844},{"indexCode":"RU3000V","indexName":"Russell 3000 Value Index","quarterlyReturns":null,"pdpAllocation":4,"sectorName":"Materials","allocation":4,"allocationDouble":4.024653},{"indexCode":"RU3000V","indexName":"Russell 3000 Value Index","quarterlyReturns":null,"pdpAllocation":4,"sectorName":"Real Estate","allocation":4,"allocationDouble":4.864541},{"indexCode":"RU3000V","indexName":"Russell 3000 Value Index","quarterlyReturns":null,"pdpAllocation":3,"sectorName":"Telecommunication Services","allocation":3,"allocationDouble":3.538388},{"indexCode":"RU3000V","indexName":"Russell 3000 Value Index","quarterlyReturns":null,"pdpAllocation":9,"sectorName":"Industrials","allocation":9,"allocationDouble":9.374431}]},{"ticker":null,"indexCode":"RU3000G","indexName":"Russell 3000 Growth Index","sectorAllocations":[{"indexCode":"RU3000G","indexName":"Russell 3000 Growth Index","quarterlyReturns":null,"pdpAllocation":0,"sectorName":"Utilities","allocation":0,"allocationDouble":0.218451},{"indexCode":"RU3000G","indexName":"Russell 3000 Growth Index","quarterlyReturns":null,"pdpAllocation":2,"sectorName":"Telecommunication Services","allocation":2,"allocationDouble":2.179539},{"indexCode":"RU3000G","indexName":"Russell 3000 Growth Index","quarterlyReturns":null,"pdpAllocation":2,"sectorName":"Real Estate","allocation":2,"allocationDouble":2.294512},{"indexCode":"RU3000G","indexName":"Russell 3000 Growth Index","quarterlyReturns":null,"pdpAllocation":3,"sectorName":"Materials","allocation":3,"allocationDouble":3.843861},{"indexCode":"RU3000G","indexName":"Russell 3000 Growth Index","quarterlyReturns":null,"pdpAllocation":31,"sectorName":"Information Technology","allocation":31,"allocationDouble":31.799508},{"indexCode":"RU3000G","indexName":"Russell 3000 Growth

```
Index","quarterlyReturns":null,"pdpAllocation":12,"sectorName":"Industrials"
,"allocation":12,"allocationDouble":12.142557},{"indexCode":"RU3000G","index
Name":"Russell 3000 Growth
Index","quarterlyReturns":null,"pdpAllocation":12,"sectorName":"Health
Care","allocation":12,"allocationDouble":12.637882},{"indexCode":"RU3000G","
indexName":"Russell 3000 Growth
Index","quarterlyReturns":null,"pdpAllocation":2,"sectorName":"Financials Ex
Real
Estate","allocation":2,"allocationDouble":2.223965},{"indexCode":"RU3000G","
indexName":"Russell 3000 Growth
Index","quarterlyReturns":null,"pdpAllocation":4,"sectorName":"Energy","allo
cation":4,"allocationDouble":4.192229},{"indexCode":"RU3000G","indexName":"R
ussell 3000 Growth
Index","quarterlyReturns":null,"pdpAllocation":16,"sectorName":"Consumer
Discretionary","allocation":16,"allocationDouble":16.380915},{"indexCode":"R
U3000G","indexName":"Russell 3000 Growth
Index","quarterlyReturns":null,"pdpAllocation":12,"sectorName":"Consumer
Staples","allocation":12,"allocationDouble":12.086575}]}]
```

In one implementation, the user device 203 may determine which model/benchmark to use 207 and submit the selection 209 (e.g., see 503 in FIG. 5B), based on which the SPC server 220 may retrieve the obtained benchmark/model data and determine sectors and/or generate a UI with regard to the selected benchmark/model 211 (e.g., see FIG. 5C). For example, in one implementation, an example listing of a benchmark/model selection 209, substantially in the form of a HTTP(S) POST message including XML-formatted data, is provided below:

```
POST /benchmark_selection.php HTTP/1.1
Host: 192.168.23.126
Content-Type: Application/XML
Content-Length: 867
<?XML version = "1.0" encoding = "UTF-8"?>
<benchmark_request>
   <session_id> HUUUSDWE </session_id>
   <timestamp> 2014-02-22 15:22:43</timestamp>
<user_id> JS001 </user_id>
<client_details>
   <client_IP>192.168.23.126</client_IP>
   <client_type>smartphone</client_type>
```

-continued

```
   <client_model>HTC Hero</client_model>
   <device_id> HTC_JS_001 </device_id>
   ...
<client_details>
...
<benchmark> S&P 500 </benchmark>
...
<benchmark_selection>
```

In one implementation, the user device 203 may be presented with a UI with recommended/selected sector allocations 212 (e.g., see FIG. 5B-5C), so that the user may select instruments, weights and other parameters for the portfolio 213, and submit the portfolio construction parameters 215 to the SPC server. In one implementation, the user model/benchmark selection message 209, portfolio parameters message 215 (e.g., portfolio with sector allocations, selected funds and their allocations), and/or the like, may include the following example data listing:

```
{"isUpdate":false,"isModel":false,"isForChart":false,"startDate":"2000-01-
01T05:00:00.000Z","endDate":"2011-12-
31T05:00:00.000Z","frequency":3,"allocations":[{"sectorName":"Consumer
Discretionary","weight":0,"allocation":12.223,"pdpAllocation":"12.223","pdpP
osition":"Select Consumer Discretionary Portfolio","symbol":"FSCPX
","positionId":"517","fundAmount":"100.000","amountInvested":"1222"},{"secto
rName":"Consumer
Staples","weight":0,"allocation":9.463,"pdpAllocation":"9.463","pdpPosition"
:"Select Consumer Staples Portfolio -
Total","symbol":"FDFAX","positionId":"9","fundAmount":"100.000","amountInves
ted":"946"},{"sectorName":"Energy","weight":0,"allocation":10.213,"pdpAlloca
tion":"10.213","pdpPosition":"Select Energy Portfolio","symbol":"FSENX
","positionId":"60","fundAmount":"100.000","amountInvested":"1021"},{"sector
Name":"Financials Ex Real
Estate","weight":0,"allocation":12.384,"pdpAllocation":"12.384","pdpPosition
":"Select Financial Services Portfolio","symbol":"FIDSX
","positionId":"66","fundAmount":"100.000","amountInvested":"1238"},{"sector
Name":"Health
Care","weight":0,"allocation":11.901,"pdpAllocation":"11.901","pdpPosition":
"Select Health Care Portfolio","symbol":"FSPHX
","positionId":"63","fundAmount":"100.000","amountInvested":"1190"},{"sector
Name":"Utilities","weight":0,"allocation":3.541,"pdpAllocation":"3.541","pdp
Position":"Select Utilities
Portfolio","symbol":"FSUTX","positionId":"65","fundAmount":"100.000","amount
Invested":"354"},{"sectorName":"Information
Technology","weight":0,"allocation":19.135,"pdpAllocation":"19.135","pdpPosi
tion":"Select Technology
Portfolio","symbol":"FSPTX","positionId":"64","fundAmount":"100.000","amount
```

```
Invested":"1913"},{"sectorName":"Materials","weight":0,"allocation":3.935,"p
dpAllocation":"3.935","pdpPosition":"Select Materials Portfolio -
Total","symbol":"FSDPX","positionId":"509","fundAmount":"100.000","amountInv
ested":"394"},{"sectorName":"Real
Estate","weight":0,"allocation":3.596,"pdpAllocation":"3.596","pdpPosition":
"Fidelity Real Estate Investment
Portfolio","symbol":"FRESX","positionId":"303","fundAmount":"100.000","amoun
tInvested":"360"},{"sectorName":"Telecommunication
Services","weight":0,"allocation":2.868,"pdpAllocation":"2.868","pdpPosition
":"Select Telecommunications Portfolio -
Total","symbol":"FSTCX","positionId":"96","fundAmount":"100.000","amountInve
sted":"287"},{"sectorName":"Industrials","weight":0,"allocation":10.741,"pdp
Allocation":"10.741","pdpPosition":"Select Industrials
Portfolio","symbol":"FCYIX","positionId":"515","fundAmount":"100.000","amoun
tInvested":"1074"}],"name":"sector","model":{"ModelId":"","ModelName":""},"i
ndex":{"IndexName":"Russell 3000
Index","Ticker":"RU3000"},"amountInvested":"10000","id":"portfolio-25"}
```

In another implementation, the SPC server 220 may constantly, intermittently, periodically, and/or on an on-demand basis, requesting data from a data provider 210. For example, the SPC server 220 may send a data request 216 to the Data provider 210, and obtain the data listing 217 (e.g., S&P GICS, etc.). For example, in one implementation, an example listing of a data request 216, substantially in the form of a HTTP(S) POST message including XML-formatted data, is provided below:

```
POST /data_request.php HTTP/1.1
Host: www.spc.com
Content-Type: Application/XML
Content-Length: 867
<?XML version = "1.0" encoding = "UTF-8"?>
<data_request>
    <timestamp> 2014-02-22 15:22:43</timestamp>
    ...
```

-continued

```
    <data_type> S&P GICS </data_type>
    <format> csv </format>
    ...
</data_request>
```

In one implementation, the returned data 217 may include a variety of different data formats, including, but not limited to xml, csv, excel, txt, and/or the like.

In one implementation, upon obtaining the updated data, the SPC server may update the models/benchmarks 218a, and store the updated data 218b in the SPC database 219.

Continuing on with FIG. 2B, in one implementation, the user device 203 may send a portfolio back testing request 221 to the SPC serer 220, which may in turn create back testing data 222. For example, the back testing data 222 may include the following example data listing:

[0040] {"benchmark":null,"portfolio":{"startDate":946702800000,"endDate":1325307600000,"frequency":3,"portfolioStyles":null,"indexStyles":null,"amountInvested":100000.0,"allocations":[{"amountInvested":12223.0,"positionId":517,"pdpPosition":"Select Consumer Discretionary Portfolio","allocationAmount":15705.787943557918,"quarterlyReturns":{"timeSeries":{"2009830":{"gain":1630.26,"allocation":8997.0,"performance":18.12,"allocationPct":12.22,"contributionPercent":1.77},"2007231":{"gain":569.08,"allocation":14629.23,"performance":3.89,"allocationPct":12.22,"contributionPercent":0.45},"20081131":{"gain":-2235.09,"allocation":9911.72,"performance":-22.55,"allocationPct":12.22,"contributionPercent":-2.08},"20011131":{"gain":791.67,"allocation":7972.46,"performance":9.93,"allocationPct nPct":10.21,"contributionPercent":0.33},"1049086790000":{"gain":-
7.63,"allocation":4016.83,"performance":-
0.19,"allocationPct":10.21,"contributionPercent":-
0.01},"1128052790000":{"gain":1974.88,"allocation":8187.72,"performance":24.12,"allocationPct":10.21,"contributionPercent":1.94},"1285819190000":{"gain":1426.07,"allocation":11012.14,"performance":12.95,"allocationPct":10.21,"contributionPercent":1.3}},"name":null,"id":60},"pdpAllocation":10.213,"sectorName":"Energy","fundAmount":100.0,"indexReturns":{"timeSeries":{"2009830":{"gain":11.87,"allocation":0.0,"performance":11.87,"allocationPct":10.96,"contributionPercent":0.61},"2007231":{"gain":2.56,"allocation":0.0,"performance":2.56,"allocationPct":8.79,"contributionPercent":0.48},"20081131":{"gain":-23.82,"allocation":0.0,"performance":-
23.82,"allocationPct":12.16,"contributionPercent":-
0.53},"20011131":{"gain":6.99,"allocation":0.0,"performance":6.99,"allocationPct":5.58,"contributionPercent":0.31},"2008830":{"gain":-27.16,"allocation":0.0,"performance":-
27.16,"allocationPct":12.38,"contributionPercent":-1.78},"2001231":{"gain":-
3.68,"allocation":0.0,"performance":-3.68,"allocationPct":6.21,"contributionPercent":-
0.04},"2008231":{"gain":-6.36,"allocation":0.0,"performance":-
6.36,"allocationPct":12.71,"contributionPercent":-
0.31},"20041131":{"gain":5.04,"allocation":0.0,"performance":5.04,"allocationPct":6.7,"contributionPercent":-
0.17},"2004530":{"gain":8.72,"allocation":0.0,"performance":8.72,"allocationPct":6.18,"contributionPercent":0.33},"2010530":{"gain":-12.69,"allocation":0.0,"performance":-
12.69,"allocationPct":10.06,"contributionPercent":-0.59},"2002530"

Figure 6A:
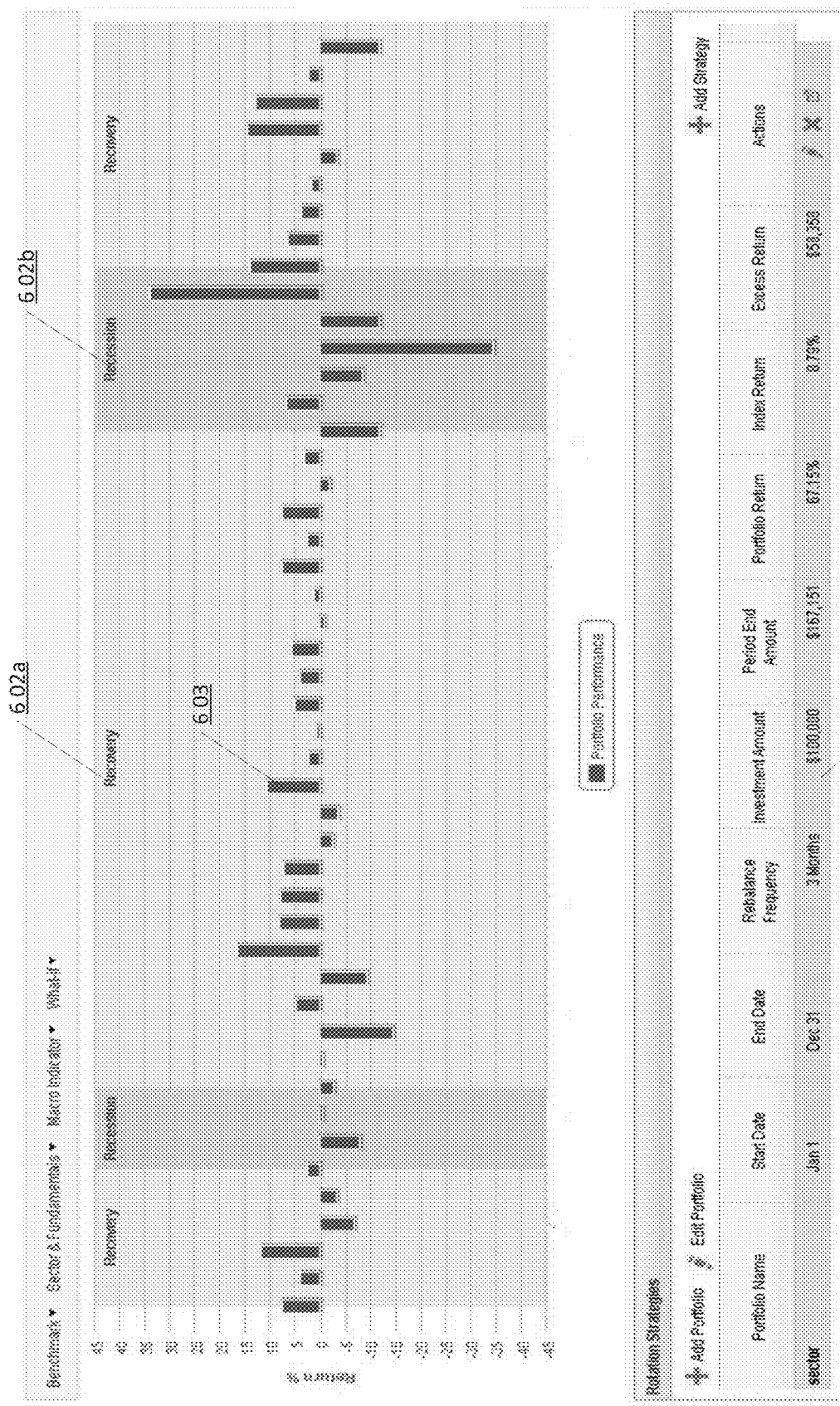
FIGS. 6A-6J provide example UI diagrams illustrating aspects of portfolio performance data analytics within embodiments of the SPC.

In one implementation, the created back testing data 222 may be populated to a UI 223 and presented to the user, e.g., see FIG. 6A, etc. In one implementation, the user may elect to adjust the weights and/or other parameters 224 and submit the adjusted portfolio 225a (e.g., which may take a similar data structure as 215 in FIG. 2A) to the SPC server 220. In one implementation, the user may optionally initiate a back testing and obtain back testing results 225b for the adjusted portfolio in an iterative manner.

In one implementation, upon user approval of the portfolio and decision to buy 227, the user device 203 may send a portfolio investment request 229 to the SPC server, which may in turn execute the portfolio 231, and send a buy request 232 to a third party/exchange/brokerage 240 for a buying receipt 233. In one implementation, the portfolio investment request 229, and/or the buy request 232, may take a form similar to the following:

provider with a data request 241a and obtain updated data 241b (e.g., which may take a similar form as 216/217, respectively). In one implementation, the SPC server may process the updated data to generate performance data, determine whether an alert shall be sent etc. 243, e.g., see more details in FIGS. 4C-4D.

In further implementation, the SPC may provide an APT for any third party/exchange/brokerage 240 to access a user portfolio, if the third party/brokerage provides a valid user credential. In one implementation, the SPC may load pre-defined models from a third party via API. In this way, the SPC may create an open-brokerage platform.

In one implementation, the SPC server 220 may send an update action request UI (e.g., with target vs. actual comparison, alerts, etc.) 244 to the user device, e.g., see FIG. 5C. In one implementation, the UI data structure 244 may take a similar form as that of the UI 212 in FIG. 2A. In one

```
["action":"BUY","tradeBasket": [{"pdpPosition":"Select Consumer Discretionary
Portfolio","symbol":"FSCPX","amountInvested":"1222"},{"pdpPosition":"Select Consumer
Staples Portfolio -
Total","symbol":"FDFAX","amountInvested":"946"},{"pdpPosition":"Select Energy
Portfolio","symbol":"FSENX","amountInvested":"1021"},{"pdpPosition":"Select Financial
Services Portfolio","symbol":"FIDSX","amountInvested":"1238"},{"pdpPosition":"Select
Health Care
Portfolio","symbol":"FSPHX","amountInvested":"1190"},{"pdpPosition":"Select Utilities
Portfolio","symbol":"FSUTX","amountInvested":"354"},{"sectorName":"Information
Technology","pdpPosition":"Select Technology
Portfolio","symbol":"FSPTX","amountInvested":"1913"},{"pdpPosition":"Select Materials
Portfolio - Total","symbol":"FSDPX","amountInvested":"394"},{"pdpPosition":"Fidelity
Real Estate Investment
Portfolio","symbol":"FRESX","amountInvested":"360"},{"pdpPosition":"Select
Telecommunications Portfolio -
Total","symbol":"FSTCX","amountInvested":"287"},{"pdpPosition":"Select Industrials
Portfolio","symbol":"FCYIX","amountInvested":"1074"}]
```

In one implementation, the SPC server 220 may generate a transaction record 235 and store it to the SPC database 219. An exemplary listing, written substantially in the form of PHP/SQL commands, to store the transaction record data 235 to the SPC database, is provided below:

implementation, the user may determine an update action (e.g., rebalance, add cash, new index/model, other parameters, etc.) 245, and submit the action 246 to the SPC server. In one implementation, the allocation update message 246 may comprise a "one-click" rebalance request. An example

```
<?PHP
header('Content-Type: text/plain');
...
// store input data in a database
mysql_connect("201.408.185.132",$SPC_server,$password); // access database
    server
mysql_select("SPC_DB.SQL"); // select database to append
mysql_query("INSERT INTO TradingLogTable (timestamp, purchase_summary_list,
    instrument_id, instrument_type, instrument_price, instrument_fund_sector,
    instrument_name, instrument_ETF, instrument_account, instrument_user,
    instrument_weight, instrument_target_rate, instrument_rebalance_history,
    instrument_summary, account_params_list, account_name, account_type,
    account_num, billing_addres, zipcode, phone, sign, merchant_params_list,
    merchant_id, merchant_name, merchant_auth_key)
VALUES ($timestamp, $purchase_summary_list, $instrument_id, $instrument_type,
    $instrument_price, $instrument_fund_sector, $instrument_name,
    $instrument_ETF, $instrument_account, $instrument_user, $instrument_weight,
    $instrument_target_rate, $instrument_rebalance_history, $instrument_summary,
    $account_params_list, $account_name, $account_type, $account_num,
    $billing_addres, $zipcode, $phone, $sign, $merchant_params_list,
    $merchant_id, $merchant_name, $merchant_authkey); // add data to
    TRadingLogTable table in a CLIENT database
mysql_close("SPCDB.SQL"); // close connection to database
?>
```

Continuing on with FIG. 2C, the SPC server 220 may check for portfolio update information 241. In one implementation, the SPC server 220 may update with the data listing of a action (e.g., rebalance) request 246, substantially in the form of a HTTP(S) POST message including XML-formatted data, is provided below:

```
POST /action_request.php HTTP/1.1
Host: 192.168.23.126
Content-Type: Application/XML
Content-Length: 867
<?XML version = "1.0" encoding = "UTF-8"?>
<benchmark_request>
   <session_id> HUUUSDWE </session_id>
   <timestamp> 2014-02-22 15:22:43</timestamp>
   <user_id> JS001 </user_id>
   <client_details>
      <client_IP>192.168.23.126</client_IP>
      <client_type>smartphone</client_type>
      <client_model>HTC Hero</client_model>
      <device_id> HTC_JS_001 </device_id>
      ...
   <client_details>
   ...
   <request>
      <action> click </action>
      <type> rebalance </type>
      ...
   </request>
   ...
</action_request>
```

In one implementation, upon the user determining update action (e.g., to rebalance, etc.) 245, the user may optionally request back testing 246*a* and view the back testing results 246*b* until the user approves the action. In one implementation, the SPC server 220 may generate a rebalance order 247 for a buy/sell request 232 to a third party/exchange/brokerage 240, and obtain a buy/sell receipt 233.

Figure 3A:
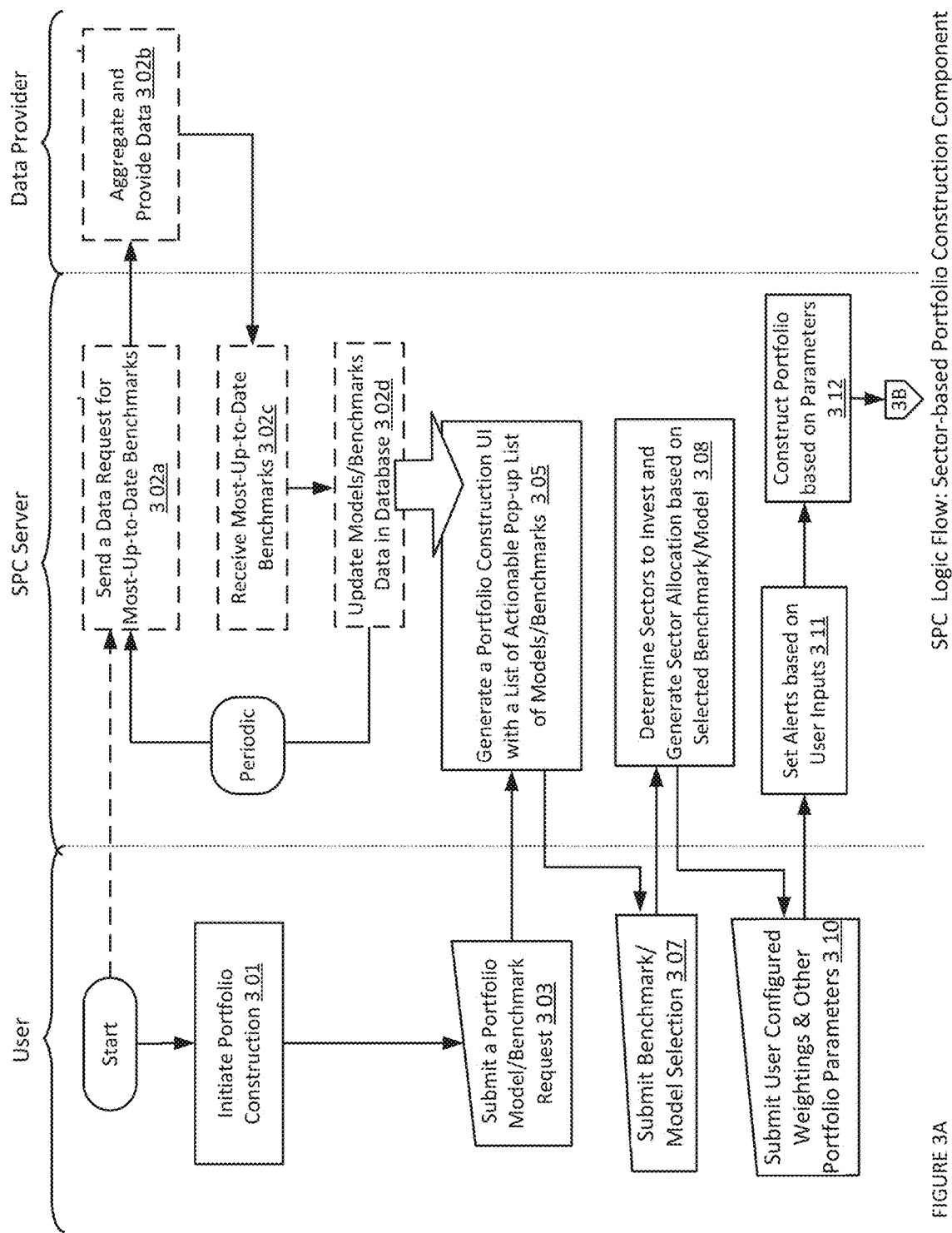
FIGS. 3A-3C provide example logic flow diagrams illustrating aspects of work flows for sector-based portfolio construction, portfolio performance back testing and rebalancing within embodiments of the SPC.
Figure 3B:
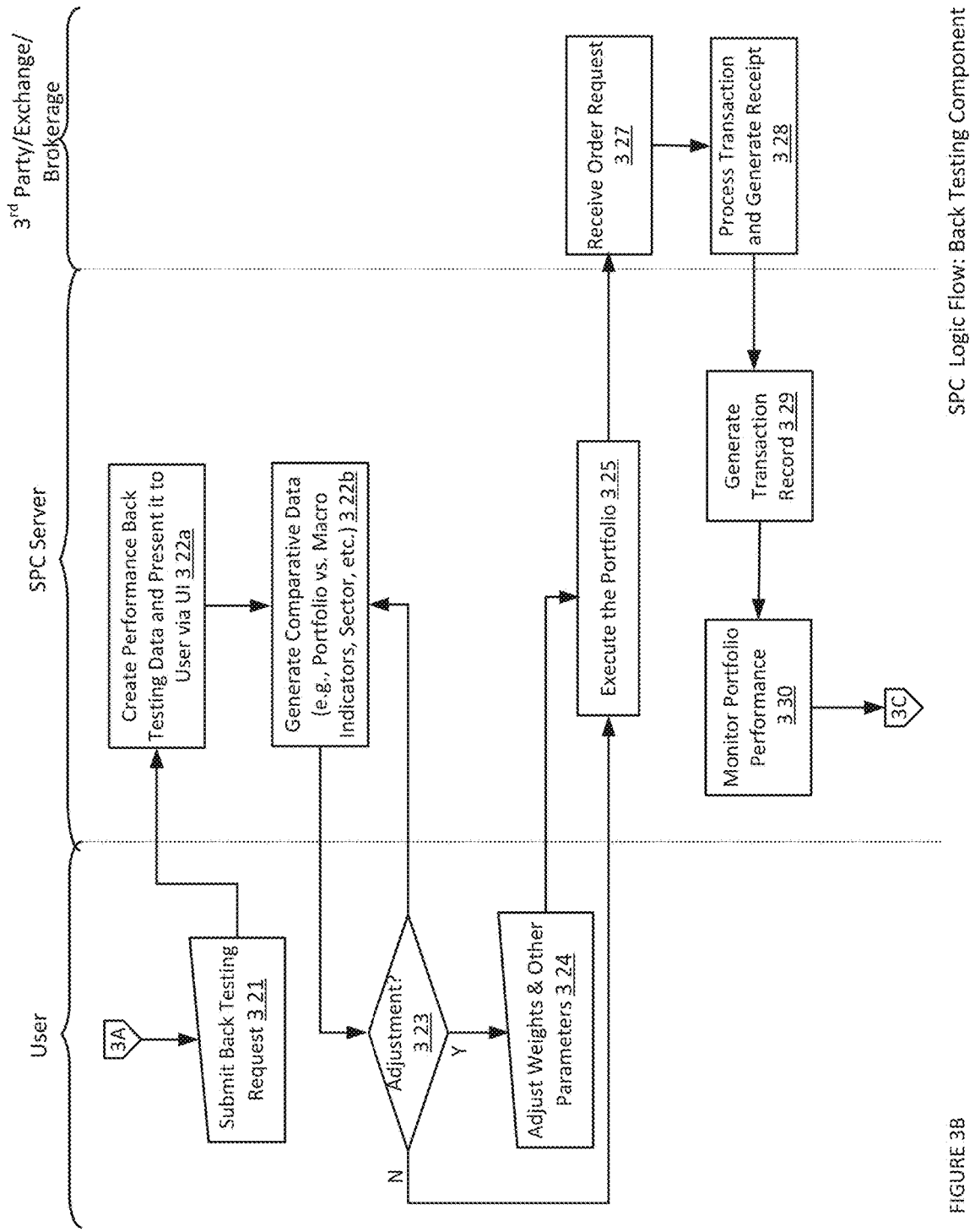
Figure 3C:
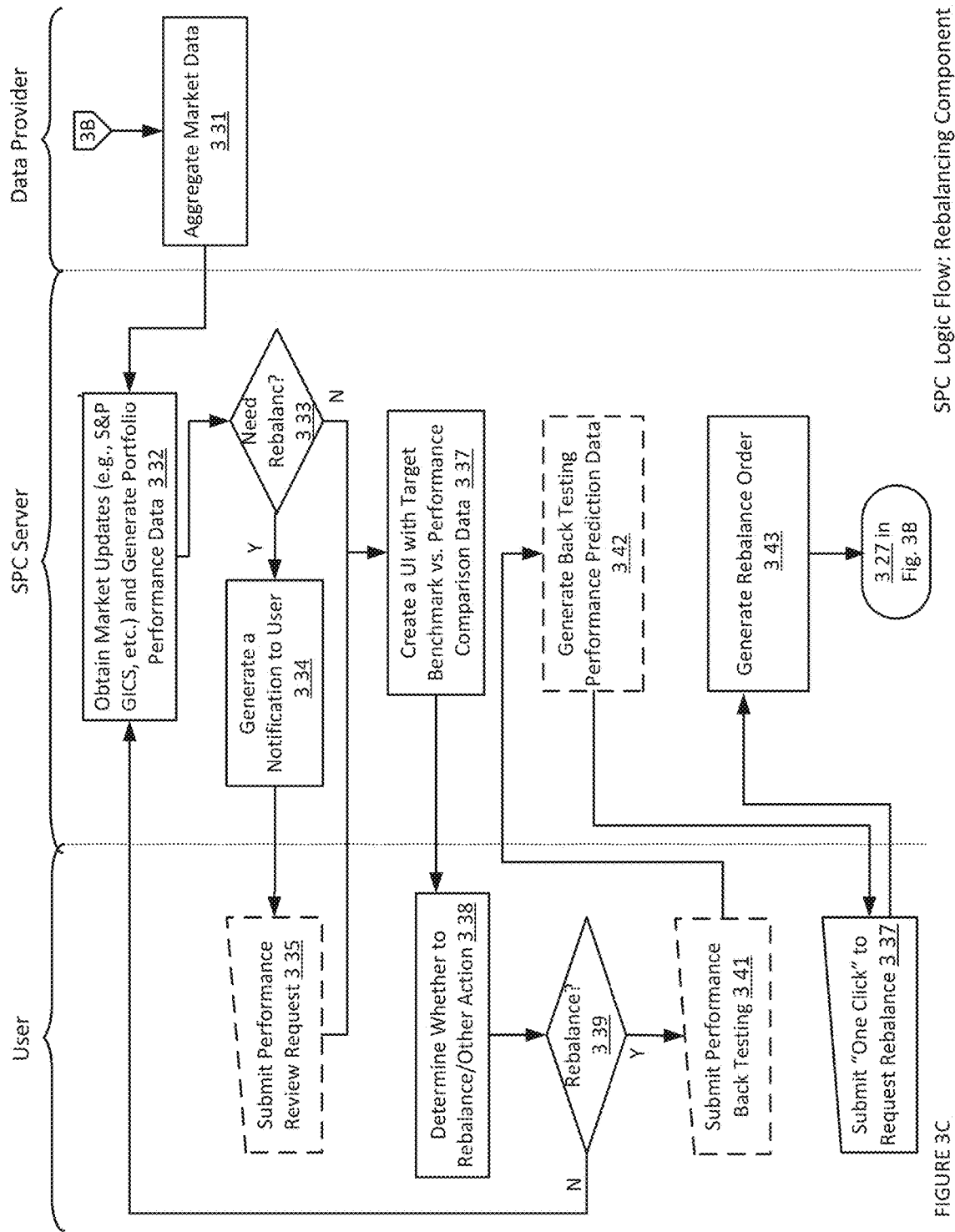

FIGS. 3A-3C provide example logic flow diagrams illustrating aspects of work flows for sector-based portfolio construction, portfolio performance back testing and rebalancing within embodiments of the SPC. With reference to FIG. 3A, the SPC server may obtain data from a data provider constantly, periodically, intermittently, and/or on demand. For example, in one implementation, the SPC server may send a data request for the most-up-to-date benchmarks (e.g., Russell 3000 index, Russell 2000 index, Dow ones US Total Stock Market, S&P 500 Index, Russell 300 Value Index, Russell 3000 Growth Index, S&P GICS, etc.) 302*a* from a data provider (e.g., McGraw-Hill, Russell Investment, Standard & Poor's, Chicago Board of Exchange, New York Stock Exchange, etc.), which may aggregate and provide such index data 302*b*. Upon receiving the most-up-to-date benchmark data 302*c*, the SPC may update the stored models/benchmarks data in the database 302*d*.

Within implementations, a user (e.g., an investor, a portfolio manager, a broker, a consumer, etc.) may initiate a portfolio construction 301, e.g., by accessing a SPC web-based and/or mobile UI for portfolio construction, and submit a portfolio model/benchmark request (e.g., see data message 201 in FIG. 2A). An exemplary UI for portfolio creation request is provided in FIG. 5A.

In one implementation, the SPC server may generate a portfolio construction UI with a list of actionable pop-up list of models/benchmarks for the user 305. For example, in one implementation, a user may select benchmark (e.g., see 501*a* in FIG. 5A) or pre-defined models (e.g., see 501*b* in FIG. 5B). If benchmark is selected, the SPC server may aggregate the most-up-to-date benchmark data obtained from the data provider and provide a drop-down menu (e.g., see 503 in FIG. 5B) for the user to select; each benchmark index may include a set of allocation weights for investment across different sectors. In another implementation, if "pre-defined model" is selected, the SPC server may retrieve a list of sector investment models (e.g., see 511 in FIG. 5F), e.g., models defined for low volatility, inflation, late economic cycle, mid economic cycle, recession, S&P 500, etc. Each model may include a set of allocation weights for investment across different sectors.

In one implementation, the user may submit a selection of benchmark/model 307, e.g., from the drop-down menu 503 or 511. Upon the user selection, the SPC server may determine sectors to invest and generate sector allocation base on the selected benchmark/model 308. For example, if the user has selected S&P 500 as the benchmark, the SPC server may retrieve the allocation weights provided by the S&P 500 index as the initial investment allocation among sectors.

In one implementation, the user may optionally submit user configured weights for one or more sectors, and/or other portfolio parameters 310. For example, a user may select a fund/ETF under each sector (e.g., see 504 in FIG. 5C); the user may adjust the allocation weights provided by a selected model/benchmark, e.g., see 507 in FIG. 5D, a user may increase the investment amount under a sector. As another example, the user may set alerts/notifications, e.g., when the actual investment allocation weight of one sector deviates the target allocation weight for a certain degree, etc. For example, the user may set the deviation threshold of the telecommunication sector be ±5.23%; and then, when the actual allocation weight is more than ±5.23% different from the target allocation weight, the SPC server may send an alert/notification to the user. In one implementation, the user may configure the actual vs. target comparison to be based on the initially selected benchmark/model target allocation. In another implementation, the user may configure the target allocation to be dynamically updated based on the most-up-to-date market index data (e.g., obtained at 302*c* and updated at 302*d*), and may monitor the actual allocation with the most-up-to-date target benchmarks. Within implementations, the monitor and update may occur constantly, intermittently, periodically and/or on demand per user requests. In further implementations, the monitor may take place following a triggering event. For example, when a news event that may have an impact on the financial market (e.g., announcement of initial public offering of a major market player, bankruptcy of a company, major policy change in security regulations, natural catastrophe, etc.), the SPC may monitor the subsequent change in the allocation weights fluctuation. As another example, the SPC may set up a monitor and/or update schedule following a holiday and/or major events calendar, e.g., super bowl, thanksgiving sale, and/or the like. In one implementation, a user may manually configure a monitoring period (e.g., 6 months, 12 months, etc.) so that the portfolio may be updated with new benchmarks periodically at the end of a time period.

In one implementation, the SPC server may set alerts based on the user configured parameters 311, and construct the portfolio based on the parameters 312. Such parameters may include a deviation level (e.g., how much the actual allocation may deviate from the target allocation weight), time period/rebalance schedule, etc.

With reference to FIG. 3B, upon constructing a portfolio (e.g., setting the alerts, selecting funds/ETFs, etc.), the user may submit a back testing request 321. The SPC server may create performance back testing data and present it to the user via a UI 322*a*. For example, in one implementation, the SPC server may build a simulation engine based on historical market dynamics analysis (e.g., a regression model, etc.); in one implementation, the user configured parameters such as, but not limited to allocation weights, rebalancing/alert thresholds, and/or the like, may be input to the regression model, and generate an output such as, but not limited to the actual price, actual allocation weights, actual return, and/or the like.

In one implementation, the SOC server may generate various comparative data to illustrate portfolio performance 322b. For example, a user may select to view a comparison of overall portfolio performance and one or more sector's price-earnings (e.g., see FIGS. 6E-6F), portfolio performance vs. a benchmark index (e.g., see FIG. 6B), portfolio performance vs. various macro indicators such as GDP, unemployment rate, inflation, etc. (e.g., see FIGS. 6G-6J), and/or the like.

In one implementation, if the user indicates an adjustment is needed 323, the user may adjust the allocation weights and/or other parameters 324. Upon the user adjustment/approval, the SPC server may execute the portfolio 325. For example, the SPC server may automatically execute trades with a third party/exchange/brokerage, which may receive an order request 327, and process the transaction and generate transaction receipts for the order 328. In one implementation, the SPC server may generate a transaction record 329, and keep monitoring the portfolio performance 330.

With reference to FIG. 3C, the data provider may aggregate market data 331 for the SPC server to constantly, intermittently, and/or periodically obtain market updates (e.g., the S&P GICS, etc.) and generate portfolio performance data 332. For example, the portfolio performance data may include current returns, current sector allocation weights, etc. In one implementation, the SPC server may evaluate whether a rebalance may be needed 333. For example, the SPC server may retrieve the user configured target vs. actual weights deviation thresholds, and determine that for each sector, whether the actual weight deviates from the target weights more than a threshold percentage (e.g., if the user has configured for telecommunication sector, the actual weight shall not exceed ±5% of the target weight; when the actual weight is more than 5% different from the target, the SPC may send an alert).

If a rebalance may be required, the SPC may generate a notification/alert to the user 334 notifying the sector name, the current deviation, and/or the actual/target weights. In one implementation, the user may optionally access a SPC UI to submit a performance review request 335. In one implementation, the SPC server may create a UI with target benchmark weighting vs. actual weighting of the portfolio data 337, e.g., see FIG. 7B. The user may then determine whether to rebalance the portfolio and/or other actions (e.g., add cash to the portfolio, re-allocate weights, select new model/index, etc.) 338. If rebalance is desired, the user may optionally submit performance back testing 341 so that the SPC may generate updated back-testing performance prediction for the rebalanced portfolio 342. The user may then submit "one click" of a button (e.g., see 707 in FIG. 7B) to request rebalance 337. In one implementation, the SPC may generate a rebalance order 343, and proceed with 327 in FIG. 3B to execute a transaction with a third party/exchange/brokerage.

Figure 3D:
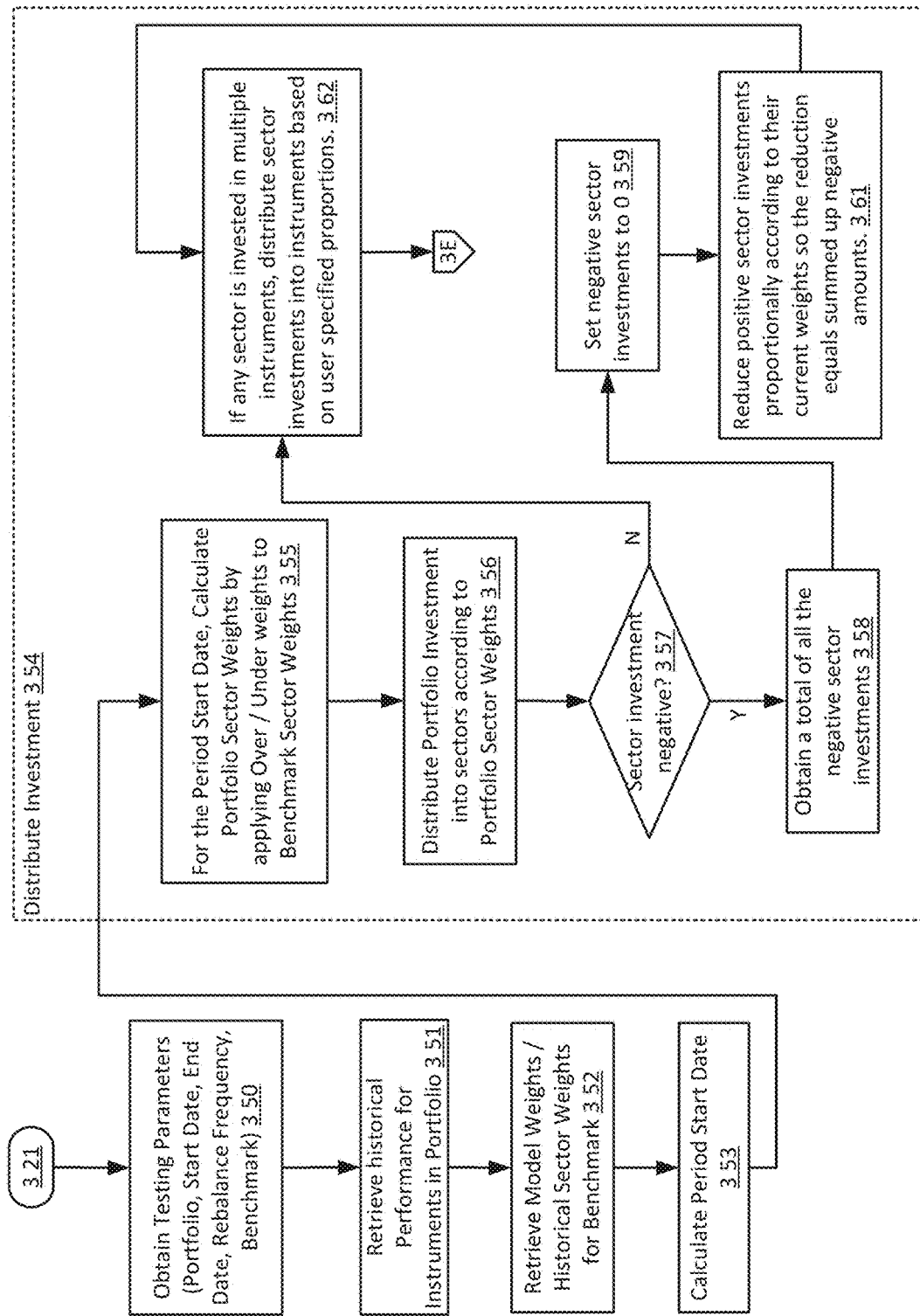
Figure 3E:
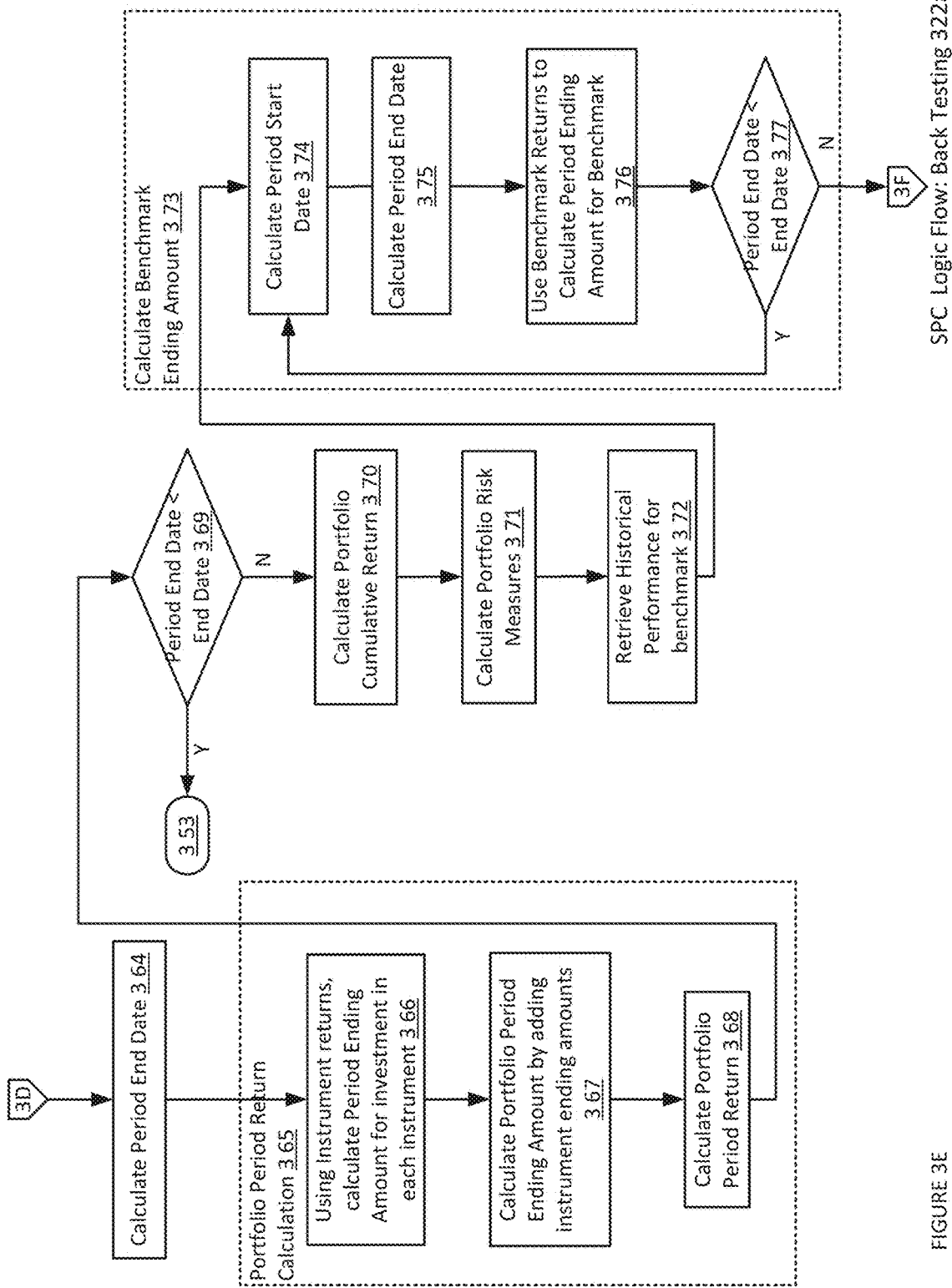

FIGS. 3D-3F provide example logic flow diagrams illustrating aspects of portfolio performance back testing component 322a and the underlying algorithms within embodiments of the SPC. In one implementation, starting with receiving a user performance back testing request 321, the SPC may obtain user configured testing parameters (e.g., portfolio name, portfolio composition, start date, end date, rebalance frequency, benchmarks, etc) 350. For example, such parameters may be configured by a user via the exemplary UIs in FIGS. 5A-5G. In one implementation, the user may set a period start date, and a period end date based on a user configured trading period, e.g., every quarter, every 6 months, and/or the like. In one implementation, the SPC may retrieve historical performance for the instruments selected in the portfolio 351, and retrieve model weights and/or the historical sector weights for the benchmark 352. For example, in one implementation, In one implementation, the SPC may start from a period start date 353 to distribute investment 354 for back testing. For the period start date, the SPC may determine portfolio sector weights by applying weights that are over and/or under the benchmark sector weights 355, e.g., within a certain range. For example, if the benchmark weight for the energy sector portfolio is 10.213%, the SPC may choose an initial weight for the energy sector portfolio as 10.213±1%, and/or other values.

In one implementation, the SPC may distribute portfolio investment into sectors according to the portfolio sector weights determined for the period start date 356. If any sector investment is negative (e.g., when the point in time sector weight of the benchmark is low enough so that the portfolio sector weight goes negative due to the underweight percentage specified, etc.) 357, the SPC may obtain a total of all the negative sector investments 358, and set the negative sector investment to zero 359 as a start. The SPC may then proportionally reduce the other sectors with a positive sector weight according to their sector weights determined at 355 so that the total reduction amount compensates for the total amount of the negative sector investments 361.

In one implementation, if there is no negative investment 357, the SPC may proceed to distribute sector investments calculated at 356 into instruments based on user specified proportions 362. For example, the instruments may comprise user selected sector funds, e.g., see 504 in FIG. 5C.

Continuing on with FIG. 3E, the SPC may then calculate a period end date 364, and proceed to portfolio period return calculation 365. In one implementation, the SPC may use instrument returns (e.g., historical returns, etc.) to calculate a period ending amount for investment for each instrument 366. Another example of calculating period ending amount may include a predictive regression structure, e.g., by regressing the historical inputs (e.g., sector investment allocation weights, market condition, period start date, period end date, investment amount, etc.) with the output (e.g., the period ending amounts for each sector instrument, return for each instrument/portfolio, etc.). The SPC may then calculate portfolio period ending amount by adding the instrument ending amounts within the portfolio 367.

In one implementation, the SPC may calculate portfolio period return 368 (e.g., by taking a difference between the ending amount and the initial starting amount, etc.), and determine whether the period end date is the end date of the overall investment portfolio 369. If the period end date is less than (e.g., has not reached the end date) the end date 369, the SPC may proceed with 353, e.g., by restart with a subsequent portfolio start date and perform the back testing for the portfolio. Otherwise, the SPC may calculate a portfolio cumulative returns 370 (e.g., by summing up the returns, either positive or negative, for all the periods evaluated prior to the final end date, etc.), and calculate portfolio risk measures 371 (e.g., the standard deviation, etc.).

In one implementation, the SPC may retrieve historical performance for the benchmarks 372 (e.g., the benchmark values may evolve and update along the period of time, etc.), and proceed to calculate benchmark ending amount 373 at the period ending date. For example, in one implementation, the SPC may employ a historical average as an approximation for the benchmarks at the period ending date.

In another implementation, the SPC may proceed to calculating benchmark ending amount 373. For example, the SPC may determine the period start date 374 and the period end date 375, and use benchmark returns to calculate period ending amount for the benchmarks 376. In one implementation, if the period end date is prior to the end date 377, the SPC may repeat the benchmark ending amount calculation start at 374. Otherwise, the SPC may set the current period ending amount as the benchmark value at the end date.

Continuing on with FIG. 3F, the SPC may retrieve historical economic sector and industry data 378 to generate comparative view of portfolio performance 380 (e.g., exemplary comparative performance data within economic indicators and/or other industrial index are shown in FIGS. 6B-6J, etc.) In one implementation, the SPC may generate data structures to pass to UI based on economic sector and industry data 379, such as a .csv, .xls data file including the performance data, etc. Exemplary data structures of the portfolio back testing performance data may be provided at 222 in FIG. 2A. In one implementation, the SPC may generate and render data chart/plot for back testing performance presentation 381.

Figure 6B:
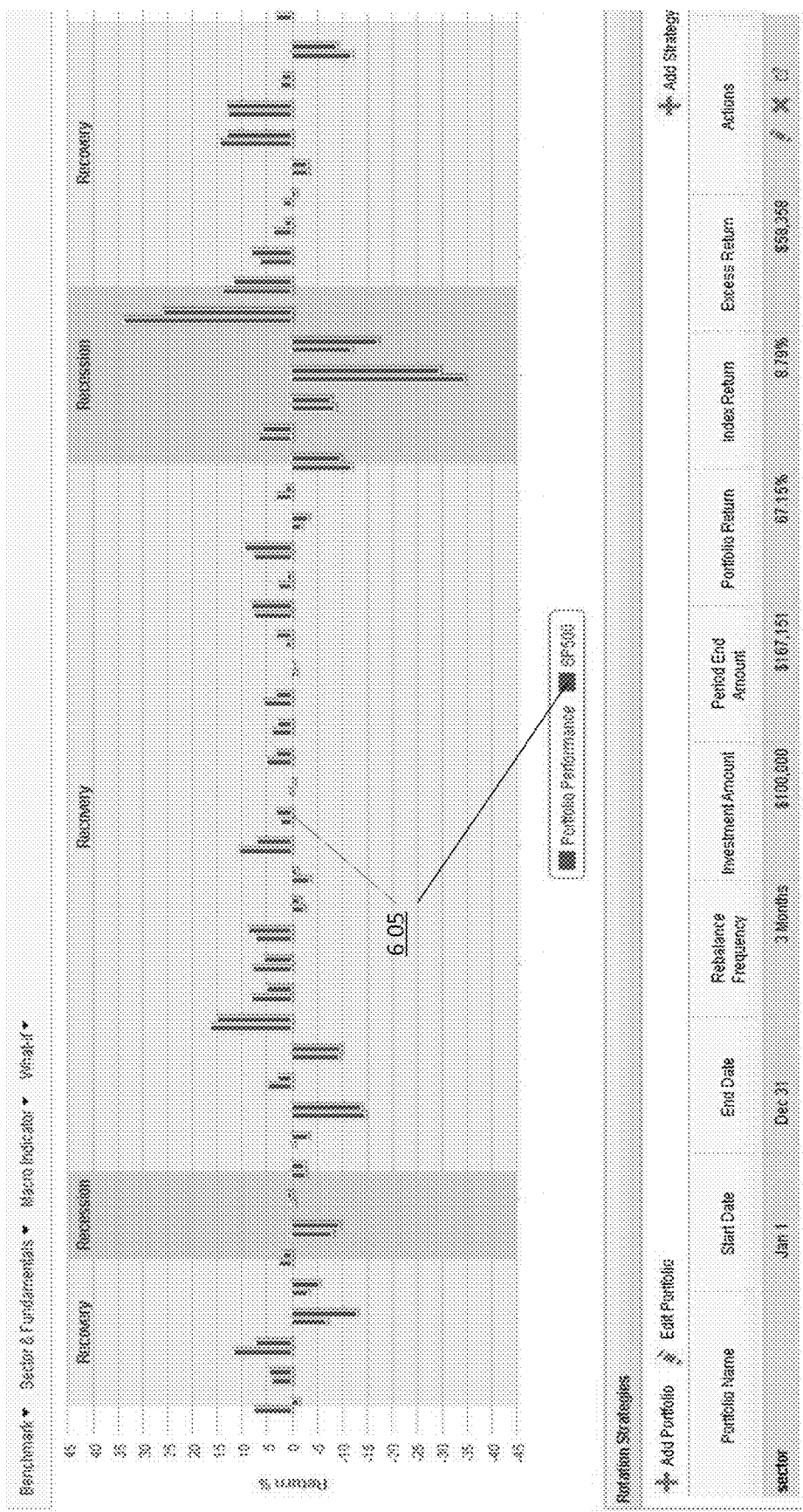
Figure 6C:
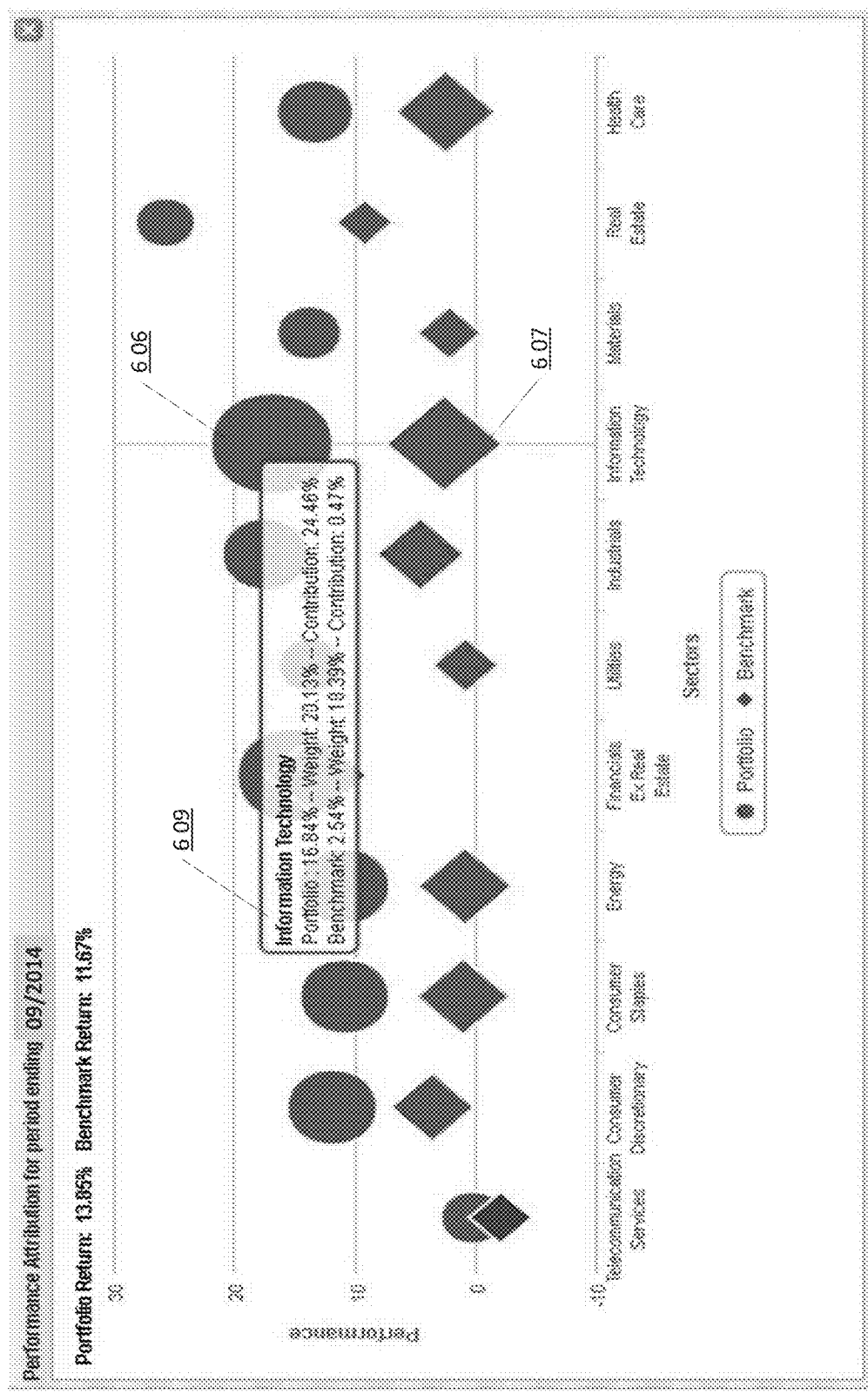

In one implementation, if a user selects sector contribution/attribution 382 (e.g., when the user elects to view sector performance, e.g., see FIG. 6C), the SPC may retrieve sector contributions for benchmarks and the instruments under the sector 383. The SPC may then aggregate and link the instrument sector contributions to come up with portfolio sector contribution 384. In one implementation, the SPC may use the portfolio and benchmark sector contributions to produce a contribution chart 385, e.g., see FIG. 6C. In one implementation, the SPC may provide performance UIs to the user 386, and proceed with user adjustments at 323.

Figure 4A:
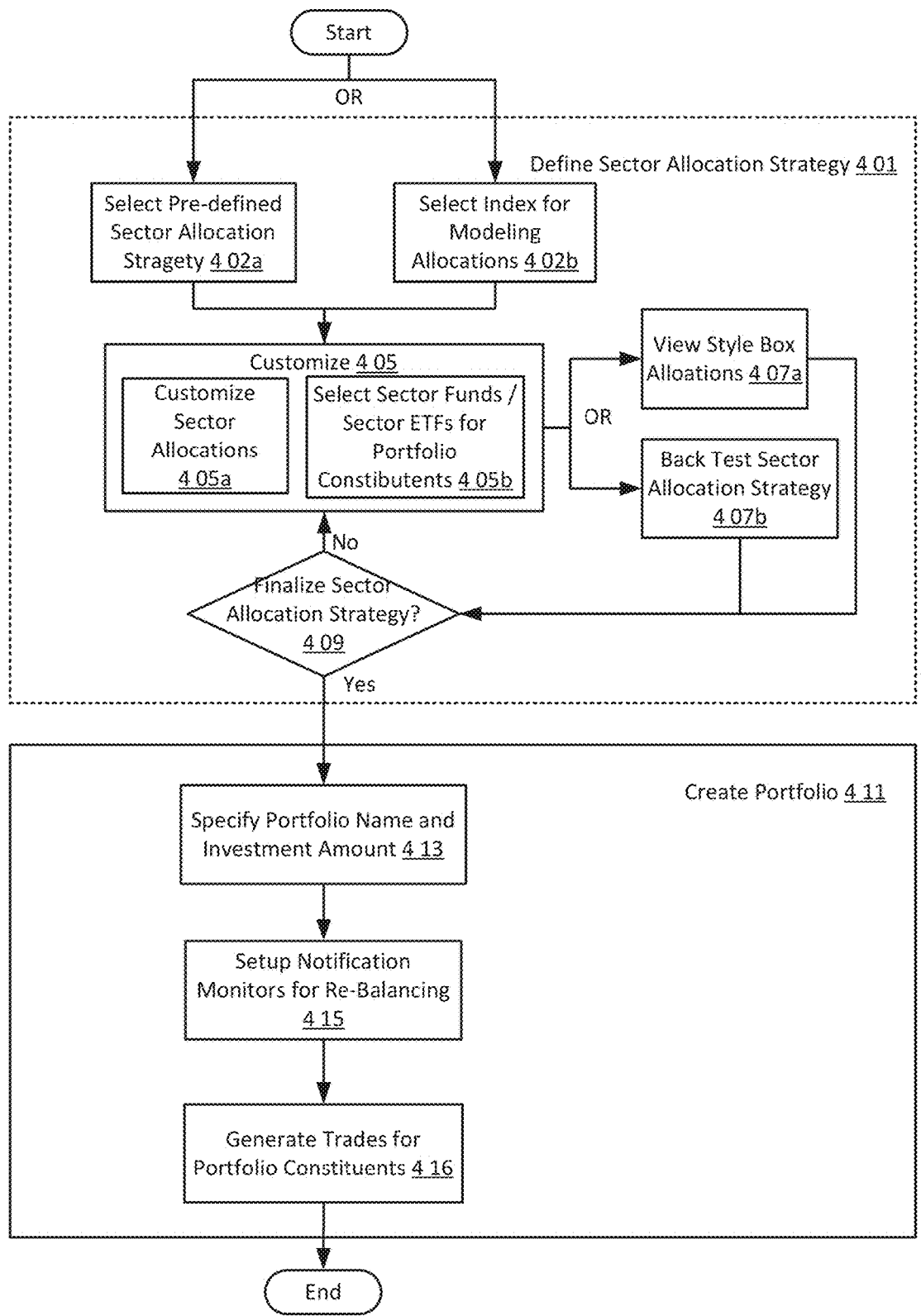
FIG. 4A provide an example logic flow diagram illustrating component 400a for creating a portfolio within embodiments of the SPC.

FIG. 4A provide an example logic flow diagram illustrating component 400a for creating a portfolio within embodiments of the SPC; and FIGS. 5A-5G provide example user interface (UI) diagrams illustrating aspects of portfolio creation within embodiments of the SPC. In one implementation, investors will be able to build and maintain an investment strategy using sector funds/ETFs as building blocks. Investors may model allocation across sectors by either customizing the allocation offered by an index, or by choosing a model strategy allocation and optionally customizing it. For a strategy based on index allocation, the customization can be done for overweighting/underweighting the allocation in relative/absolute terms. Once allocation is chosen, sector funds/ETFs may be chosen for individual sector investment.

In one implementation, advanced analytics may be available to back test the strategy over a period of time, against the backdrop of economic cycles and indicators. Using this analytics capability, the investor can compare the performance and risk of the custom portfolio with indices, sectors and other model strategies against the backdrop of economic cycles and sector fundamentals. Investors can also get an insight into which sectors contributed were deterrents for the overall performance. Once money is invested into a sector allocation portfolio, it may be viewed as a single unit in investor's holdings, with an ability to drill down into constituents. Customers may set monitors to track deviations from the target allocation strategy and can receive notifications in case of deviations. Customers may then choose to re-balance the portfolio with a single click of a button. In one implementation, more money may be added/withdrawn from the custom portfolio, while maintaining the target allocation strategy.

Within implementations, the SPC may start with defining sector allocation strategy 401. For example, a user may select a pre-defined sector allocation strategy 402a (e.g., see 501b in FIG. 5A), or alternatively select an index for modeling allocations 402b (e.g., see 501a in FIG. 5A). In one implementation, the user may set customization parameters 405, e.g., the user may customized sector allocations 405a (e.g., 507 in FIG. 5D), select sector funds/sector ETFs for the portfolio constituents 405b (e.g., 504 in FIG. 5C).

In one implementation, the user may select to view a style box allocation 407a presentation (e.g., see 508a-b in FIG. 5E), or alternatively initiate back-testing sector allocation strategy 407b (e.g., see FIGS. 6A-6J). In one implementation, upon user viewing the portfolio performance, if the user has finalized sector allocation strategy, the SPC may start portfolio creation 411. In one implementation, the user may specify portfolio name and investment amount 413, and set up notification monitors for rebalancing 415. In one implementation, the SPC may generate trades for portfolio constituents 416.

FIG. 4B provide an example logic flow diagram illustrating component 400b for editing a portfolio within embodiments of the SPC. In one implementation, the SPC may select to invest more 421a, and/or withdraw money 421b. In one implementation, the SPC may determine whether rebalance is required 422 (e.g., whether the user has elected to re-balance), and to generate trades for investment/withdrawal according to the strategy with or without rebalancing 423a or 423b.

Figure 4C:
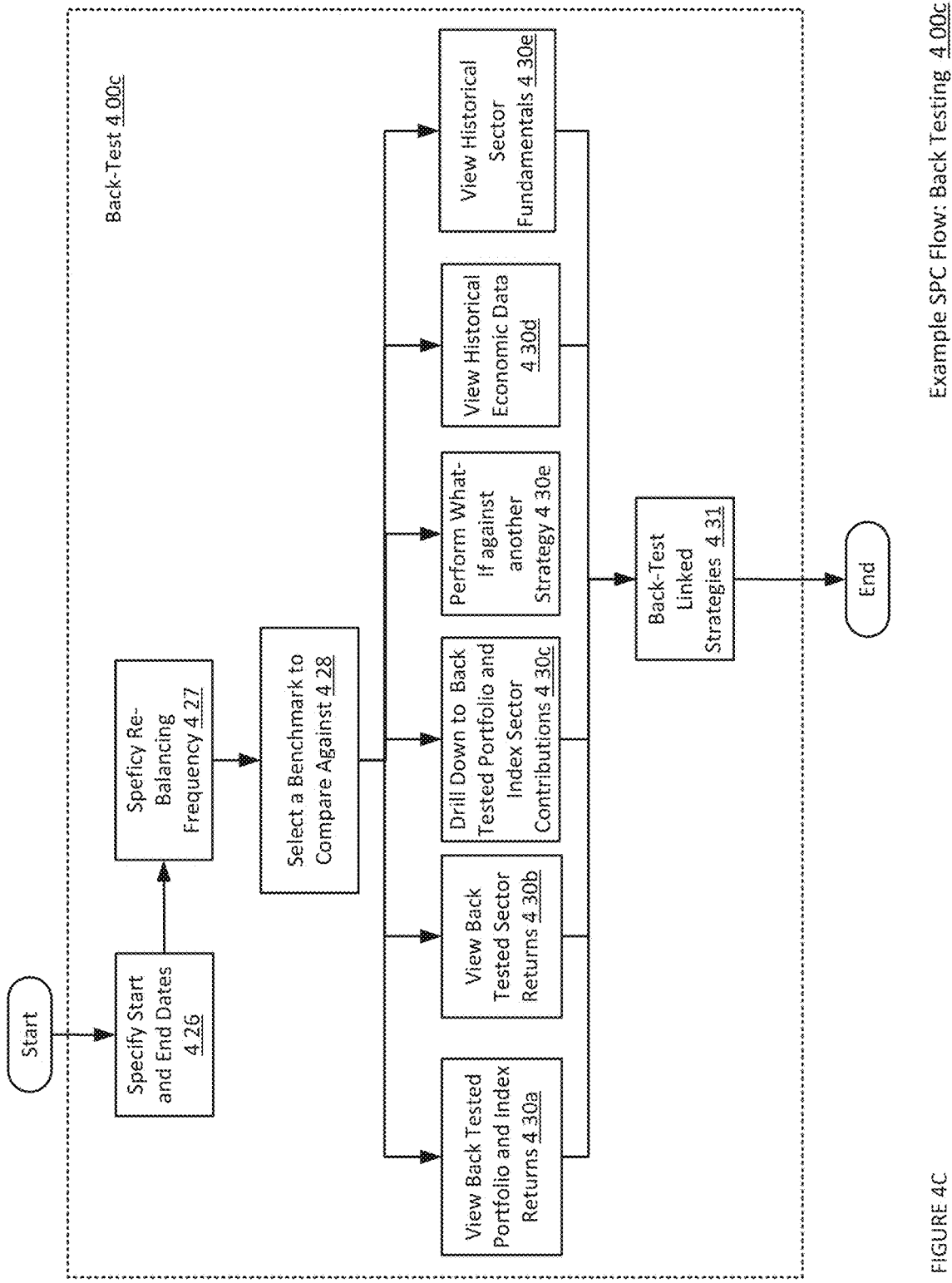
FIG. 4C provide an example logic flow diagram illustrating component 400c for back-testing a portfolio within embodiments of the SPC.

FIG. 4C provide an example logic flow diagram illustrating component 400c for back-testing a portfolio within embodiments of the SPC; and FIGS. 6A-6J provide example UI diagrams illustrating aspects of portfolio performance data analytics within embodiments of the SPC. In one implementation, the user may specify a start date, and an end date of the portfolio 426, and specify a rebalance frequency 427. For example, in one implementation, the user may select a benchmark to compare against 428, e.g., see 605 in FIG. 6B.

In one implementation, the user may view the back tested performance data in various different formats. For example, as shown in FIG. 6A, the SPC may show a plot of the return rate 603 of the portfolio during a period of time within different stages of an economic cycle, such as recovery 602a, recession 602b, and/or the like. The SPC may further show the details of the portfolio 604, including the start date, end date, investment amount, portfolio return, and/or the like.

For another example, the user may view a comparison of the back tested portfolio and index returns 430a, e.g., as shown in FIG. 6B, the portfolio return, as illustrated by the blue bars, may be compared against S&P 500 index returns, as illustrated by the red bars 605.

For another example, the user may view the back tested sector returns 430b. As shown in FIG. 6C, the user may view the comparison of each sector return (e.g., see 606) and the index sector contributions (e.g., see 607) 430c, wherein the size of the disk 606 and the diamond 607 represents the relative percentage of investment allocation of each sector. In one implementation, the user may place the mouse over a disk/diamond, and view a pop-up box 609 which provides details of the selected sector.

Figure 6D:
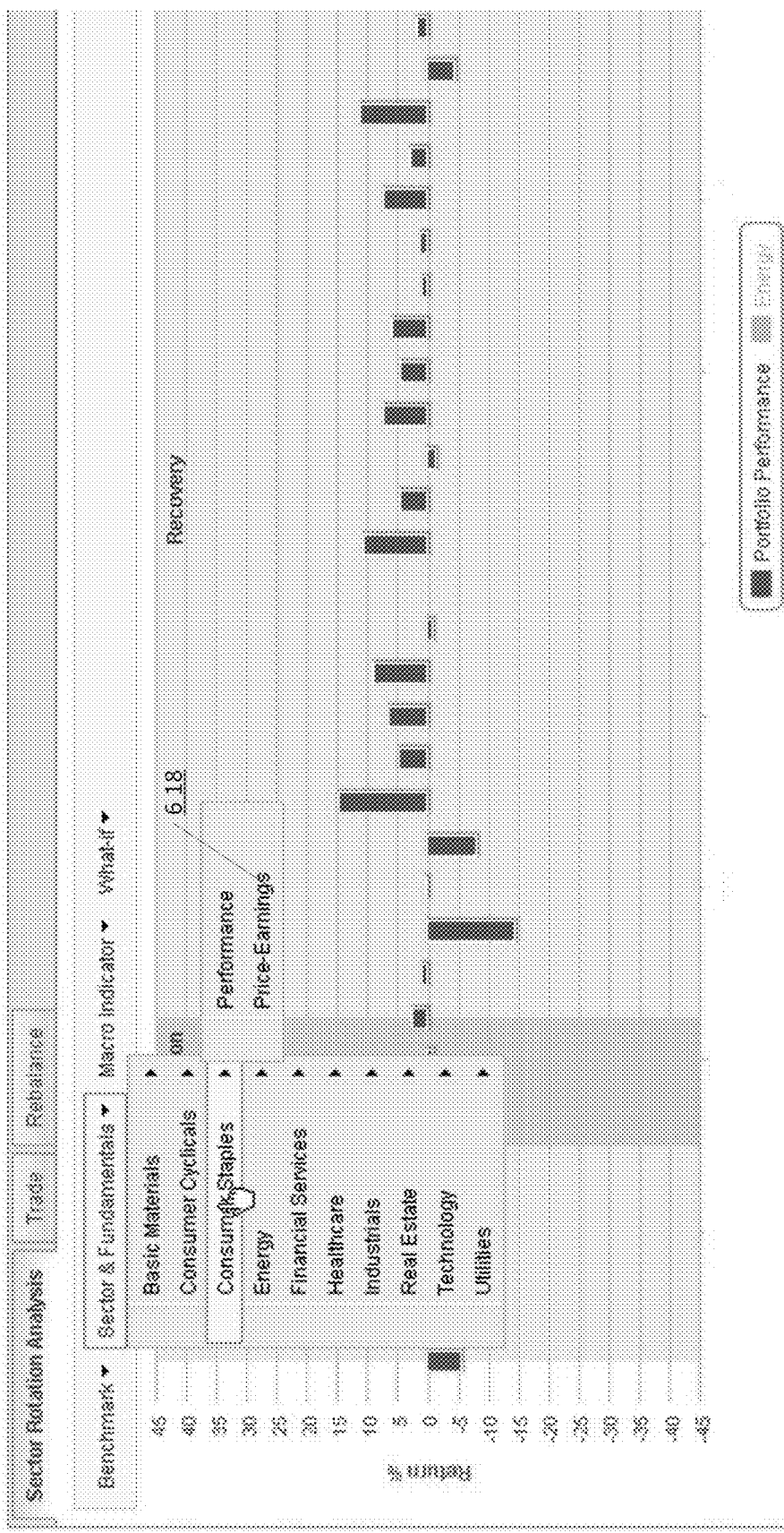
Figure 6E:
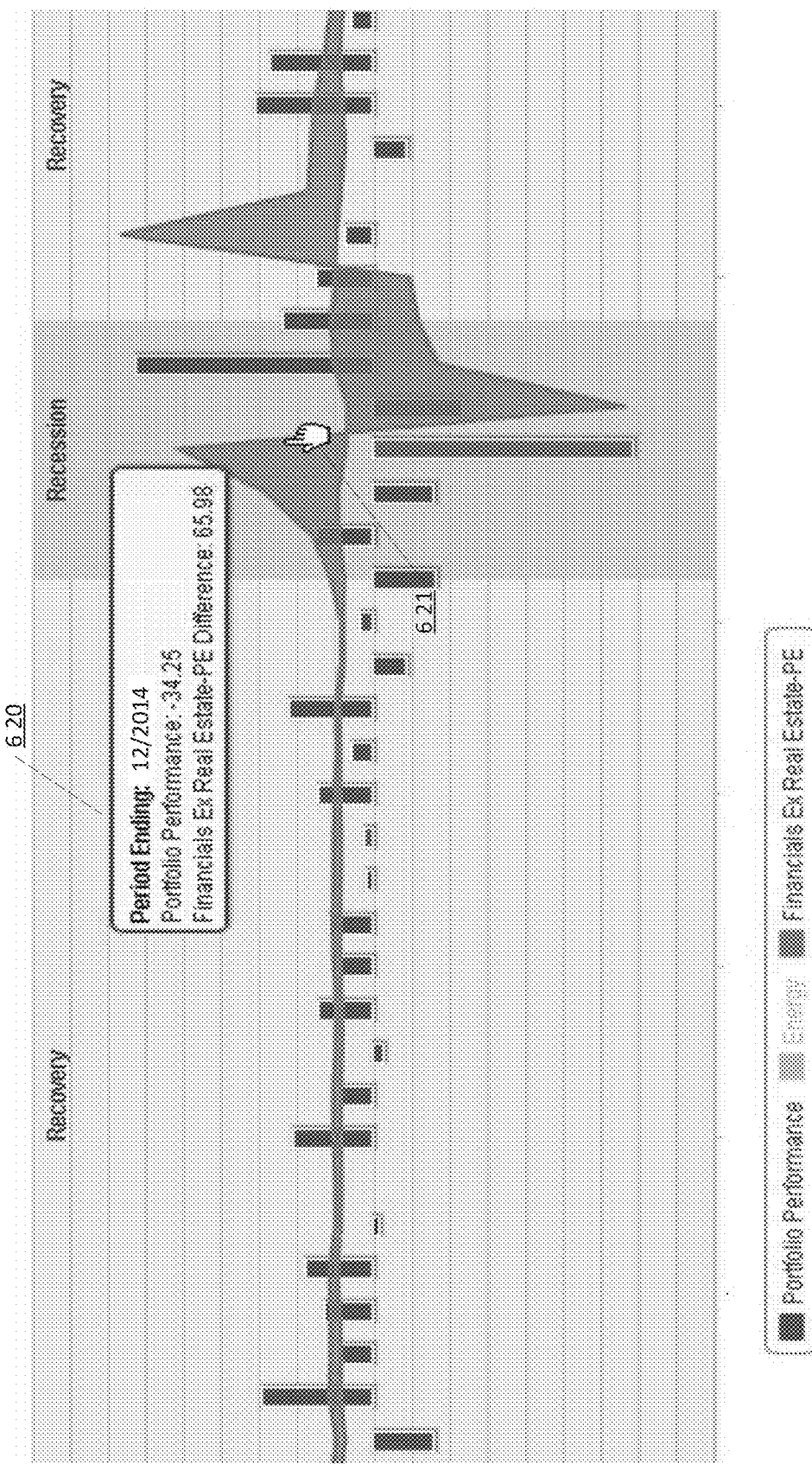
Figure 6F:
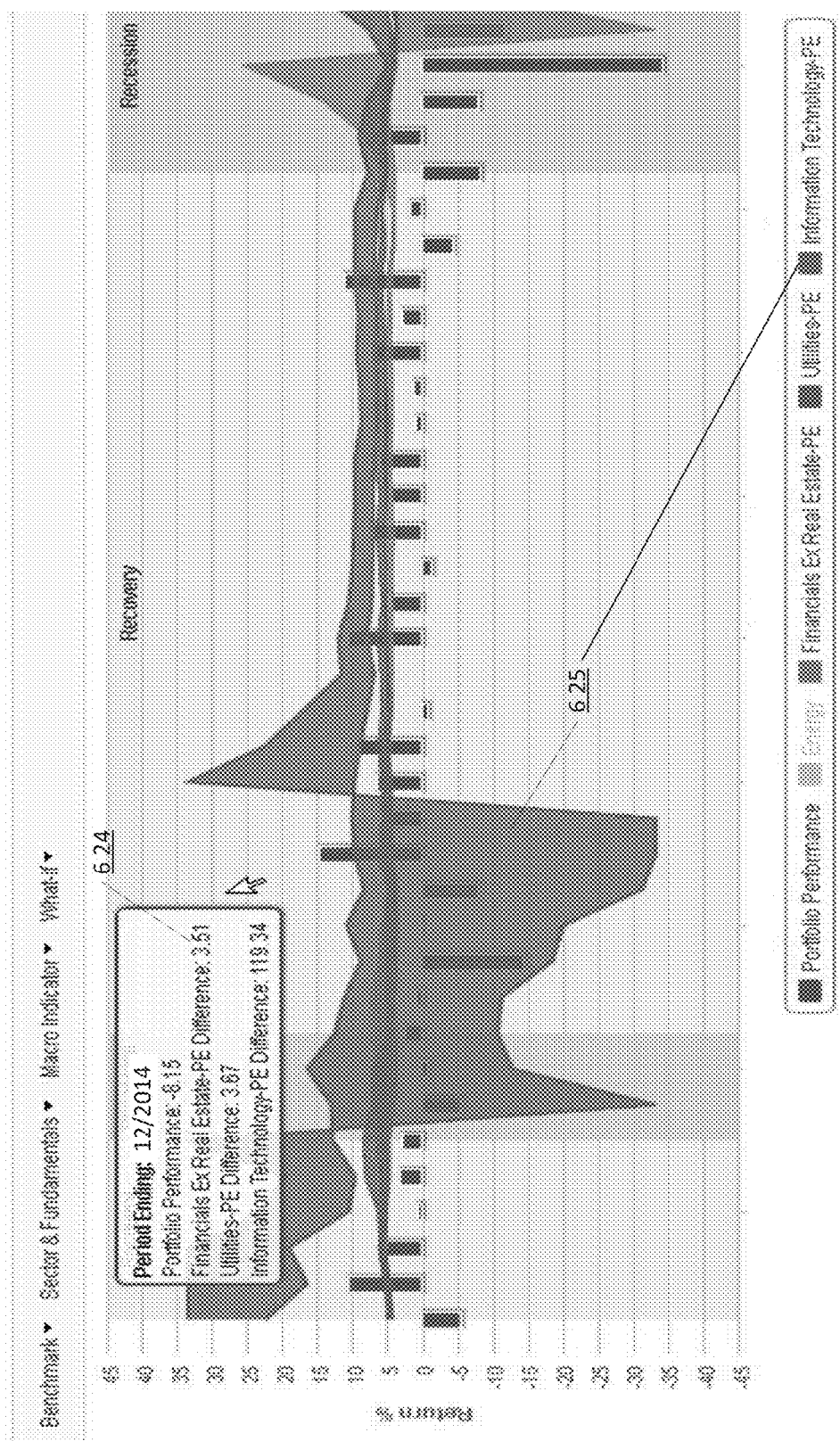

For another example, the user may perform a "what if" strategy to compare with the current actually implemented strategy 430e. As shown in FIG. 6I, a user may select a "what if" strategy, such as an equal allocation across different sectors 635; and may then view a comparison of the return of the actual strategy and the equal allocation strategy as shown in FIG. 6J, e.g., the blue bar shows the portfolio return, and the purple bar 637 shows the return under the "what if" equal allocation strategy. The user may place a mouse over a timestamp and view a pop-up box showing detailed figures of the comparison 638.

For another example, the user may view historical economic data 430d, and/or historical sector fundamentals. As shown in FIG. 6D, the user may elect to generate a comparative view of the actual return and the price-earning ratio 618 of a particular sector. For example, FIG. 6E illustrates the comparison of the actual portfolio return and the financial real estate sector price-earning ratio 621, with detailed figures presented in a pop-up box 620; and FIG. 6F illustrates a comparison of the actual portfolio return of several sector price-earning ratios, e.g., adding the information technology price-earning ratio 625 to the comparison, with detailed figures presented in a pop-up box 624.

Figure 6G:
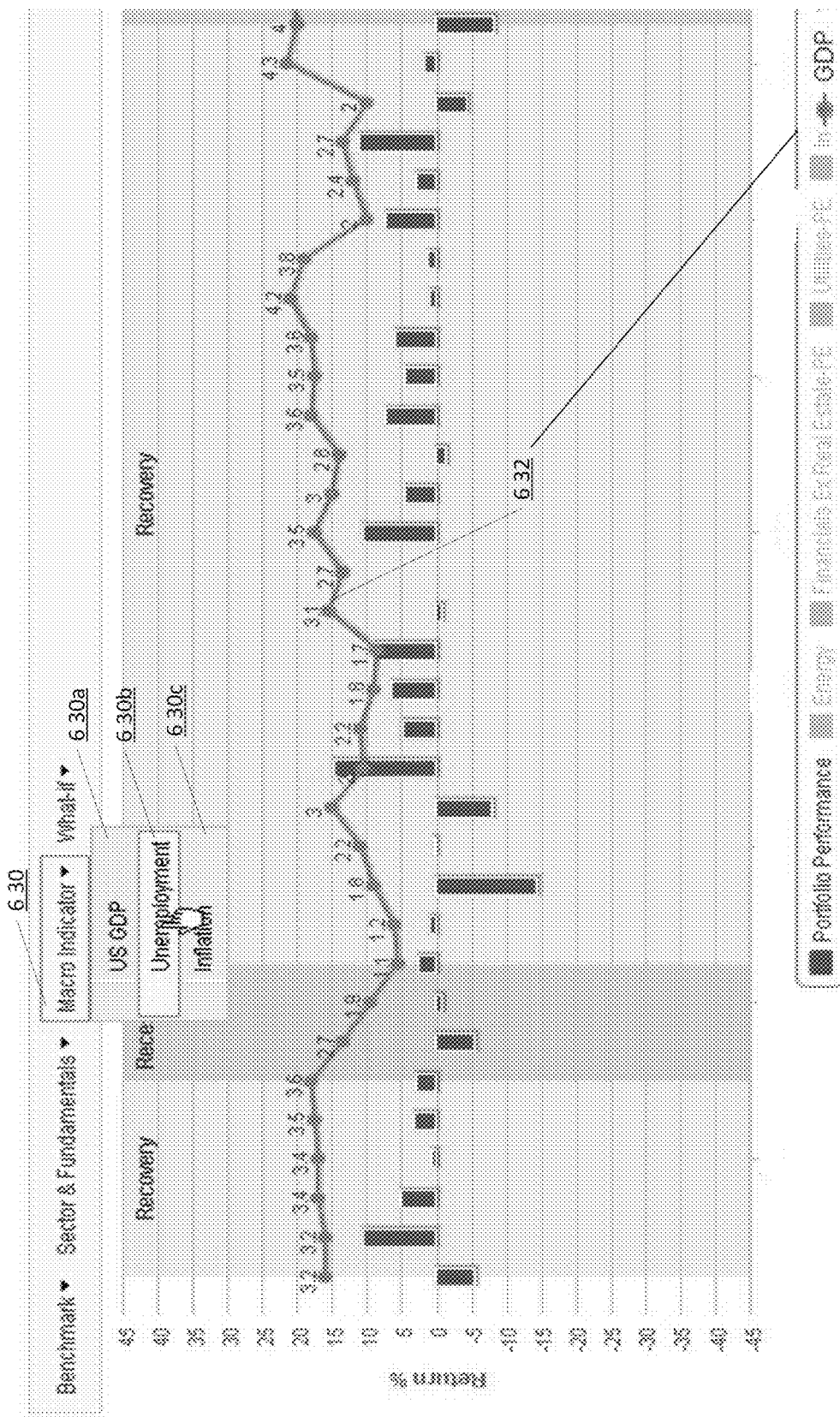
Figure 6H:
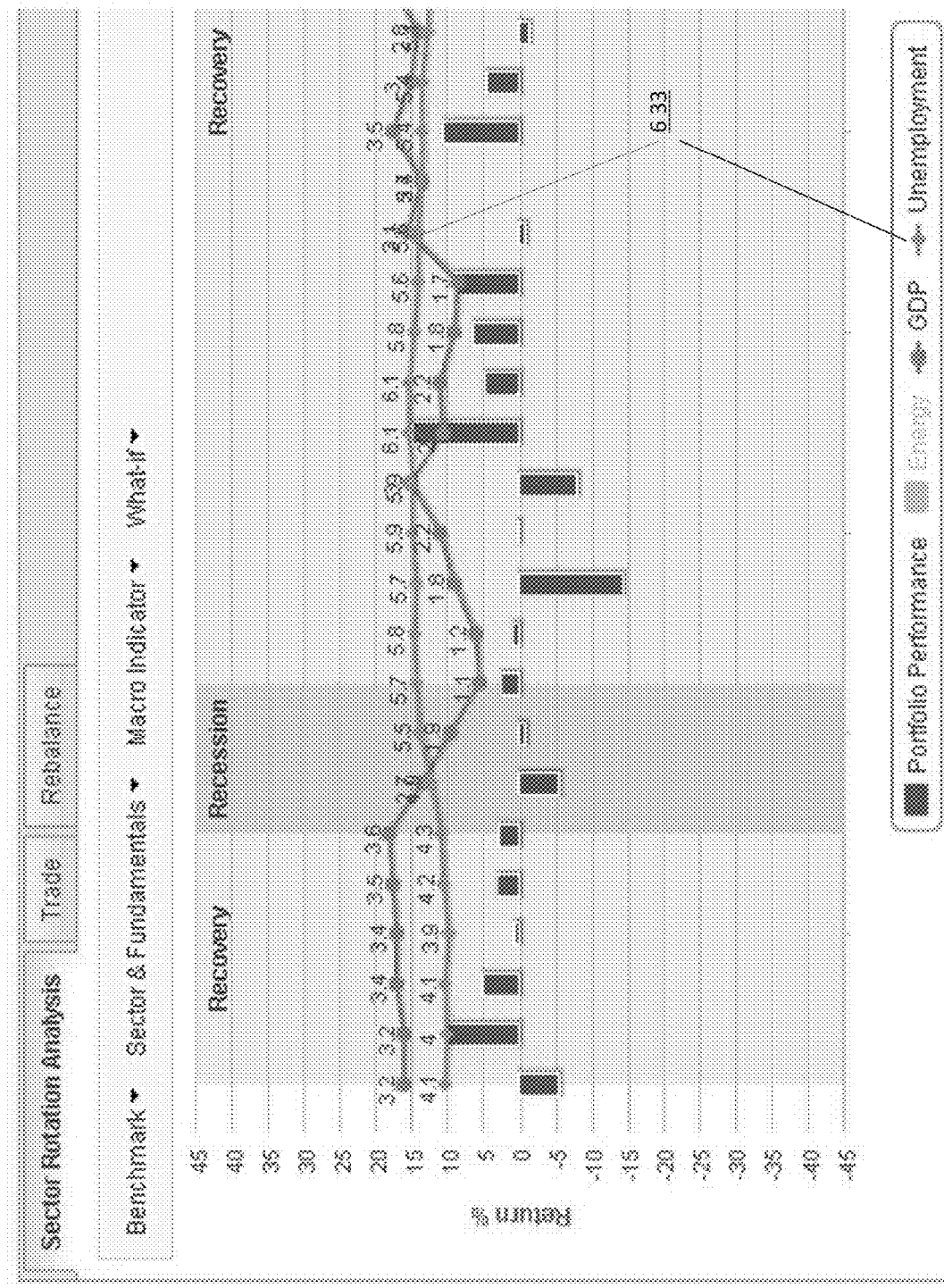
Figure 6I:
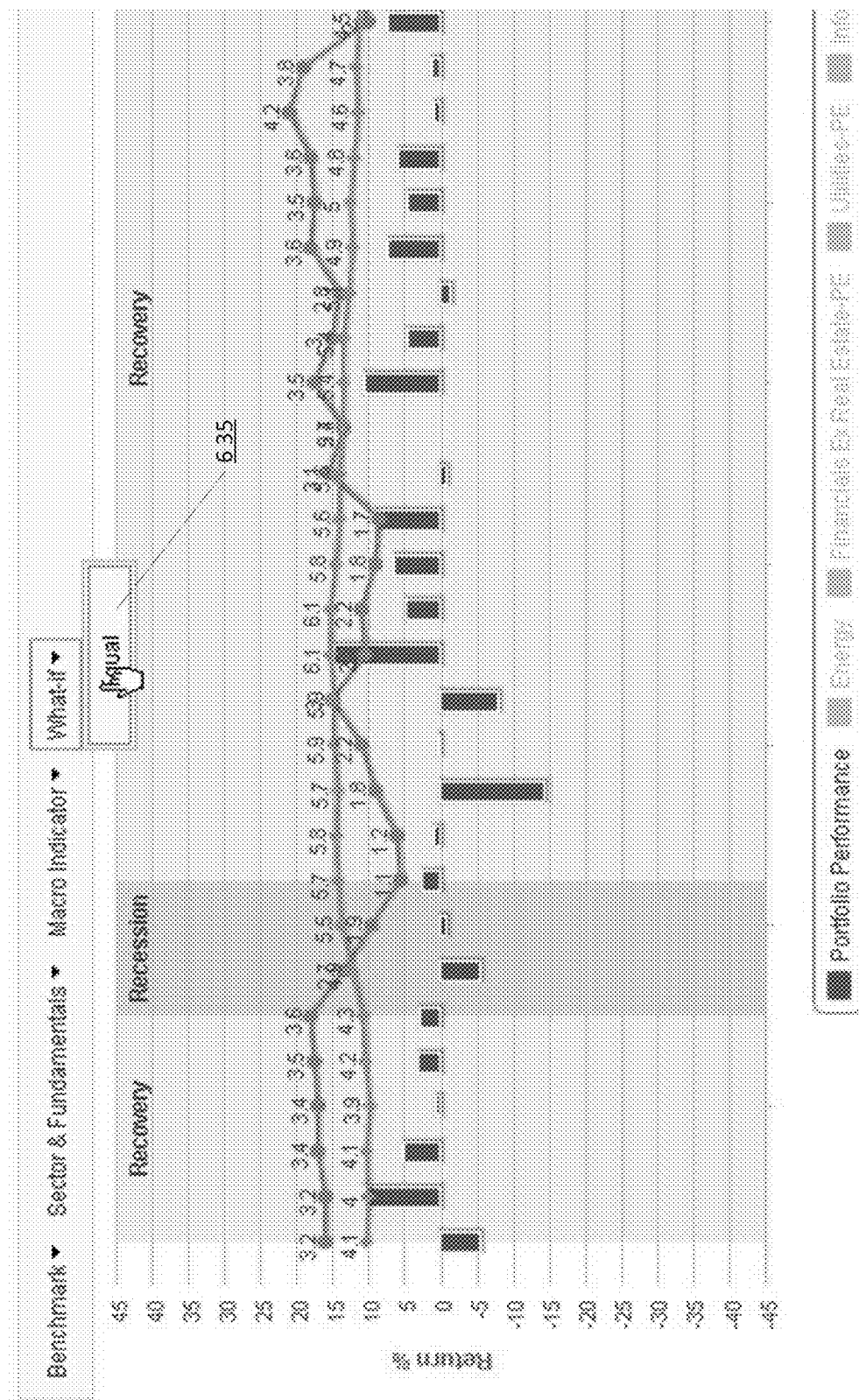
Figure 6J:
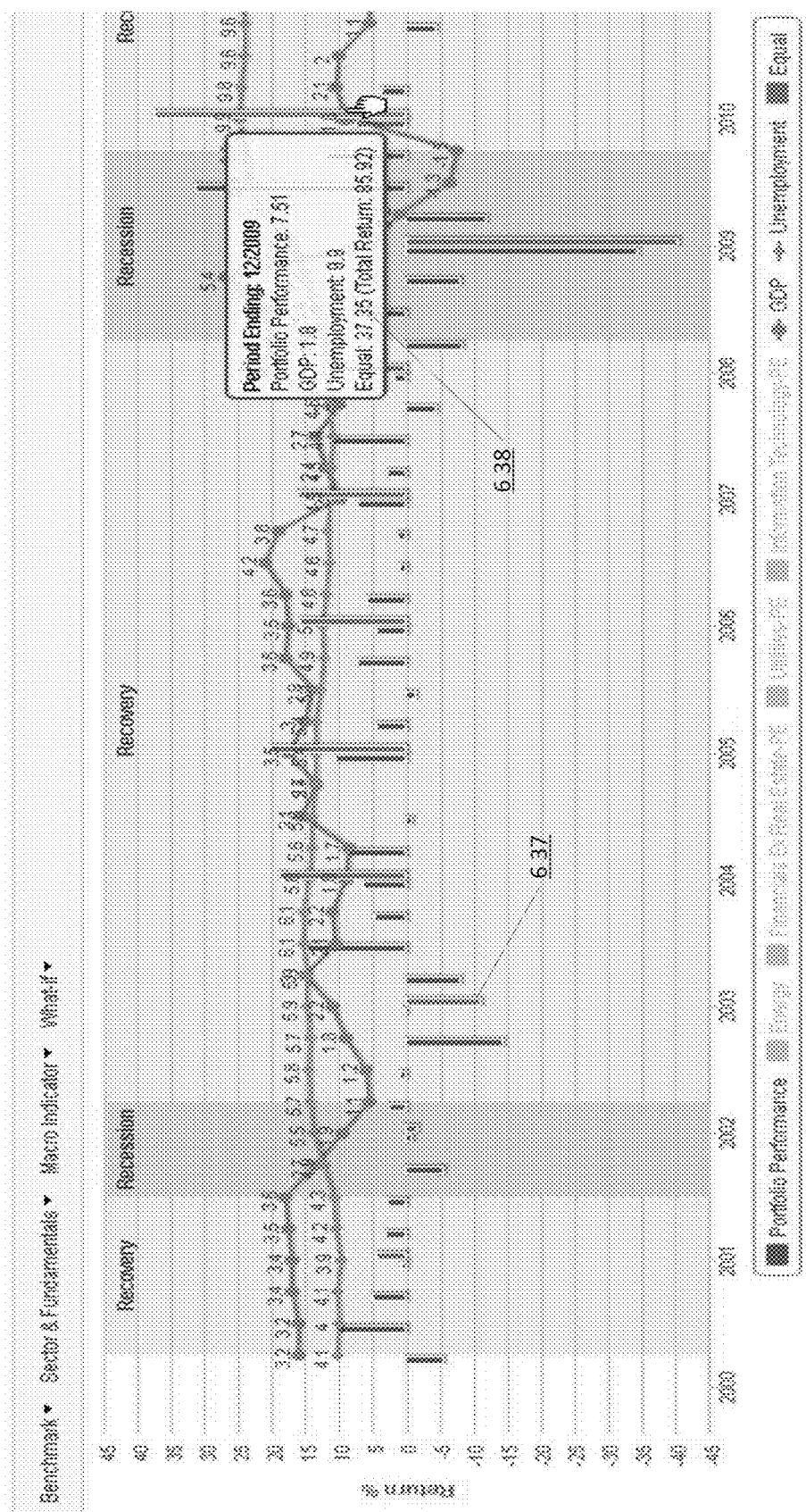

For another example, as shown in FIGS. 6G-6H, the user may select historical economic data 430d, such as macro indicators 630, including GDP 630a, unemployment rate 630b, inflation 630c, and/or the like. For example, the SPC may compare the actual return with a GDP curve 632, an unemployment rate curve 633, etc.

Within embodiments, the SPC may provide back-test linked strategies 431, e.g., by showing the user the portfolio allocation, in a UI similar to FIGS. 5B-5C.

Figure 4D:
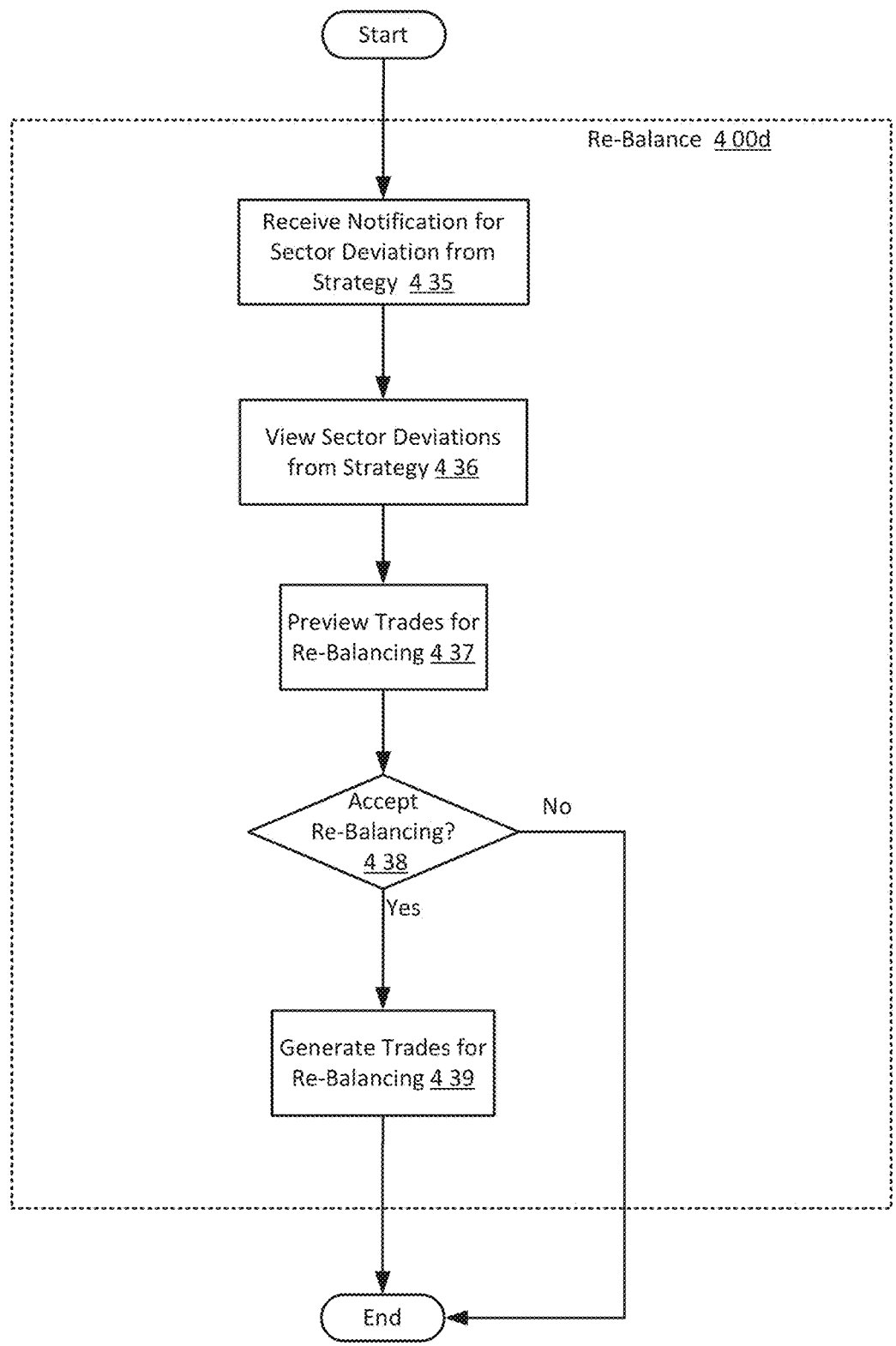
FIG. 4D provide an example logic flow diagram illustrating component 400d for rebalancing a portfolio within embodiments of the SPC.
Figure 5D:
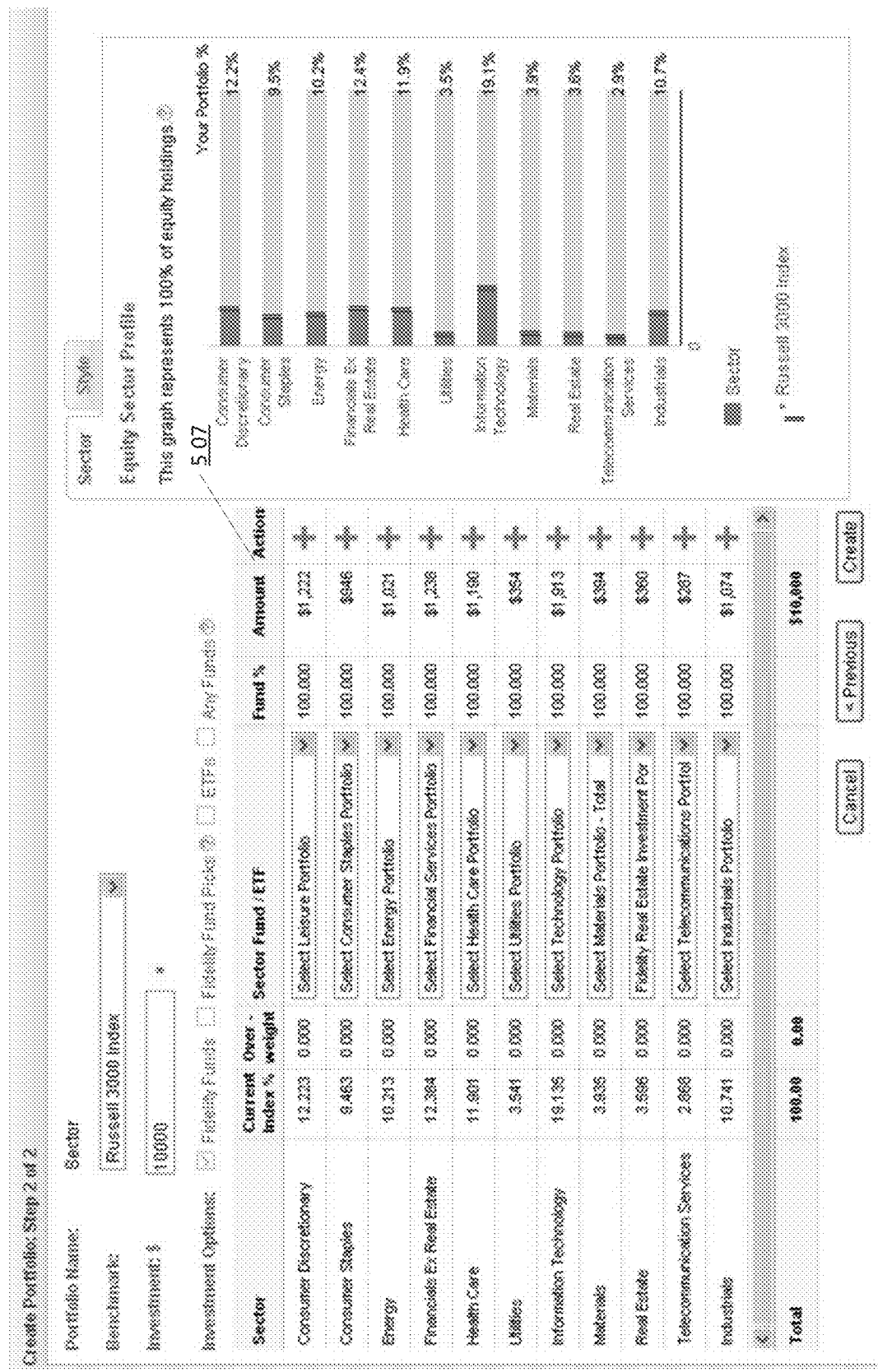
Figure 7A:
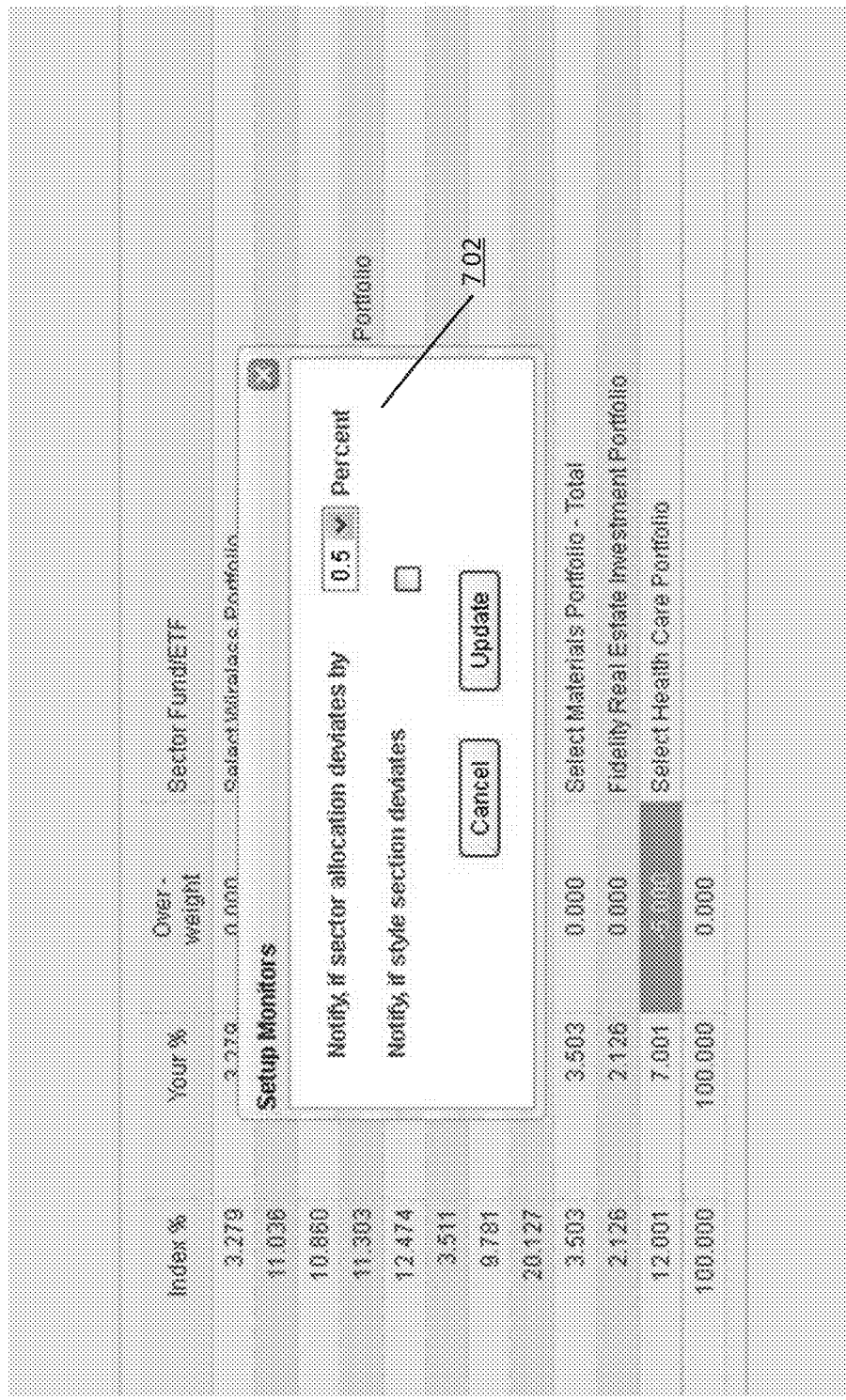
FIGS. 7A-7F provide example UI diagrams illustrating aspects of portfolio performance monitoring within embodiments of the SPC.
Figure 7B:
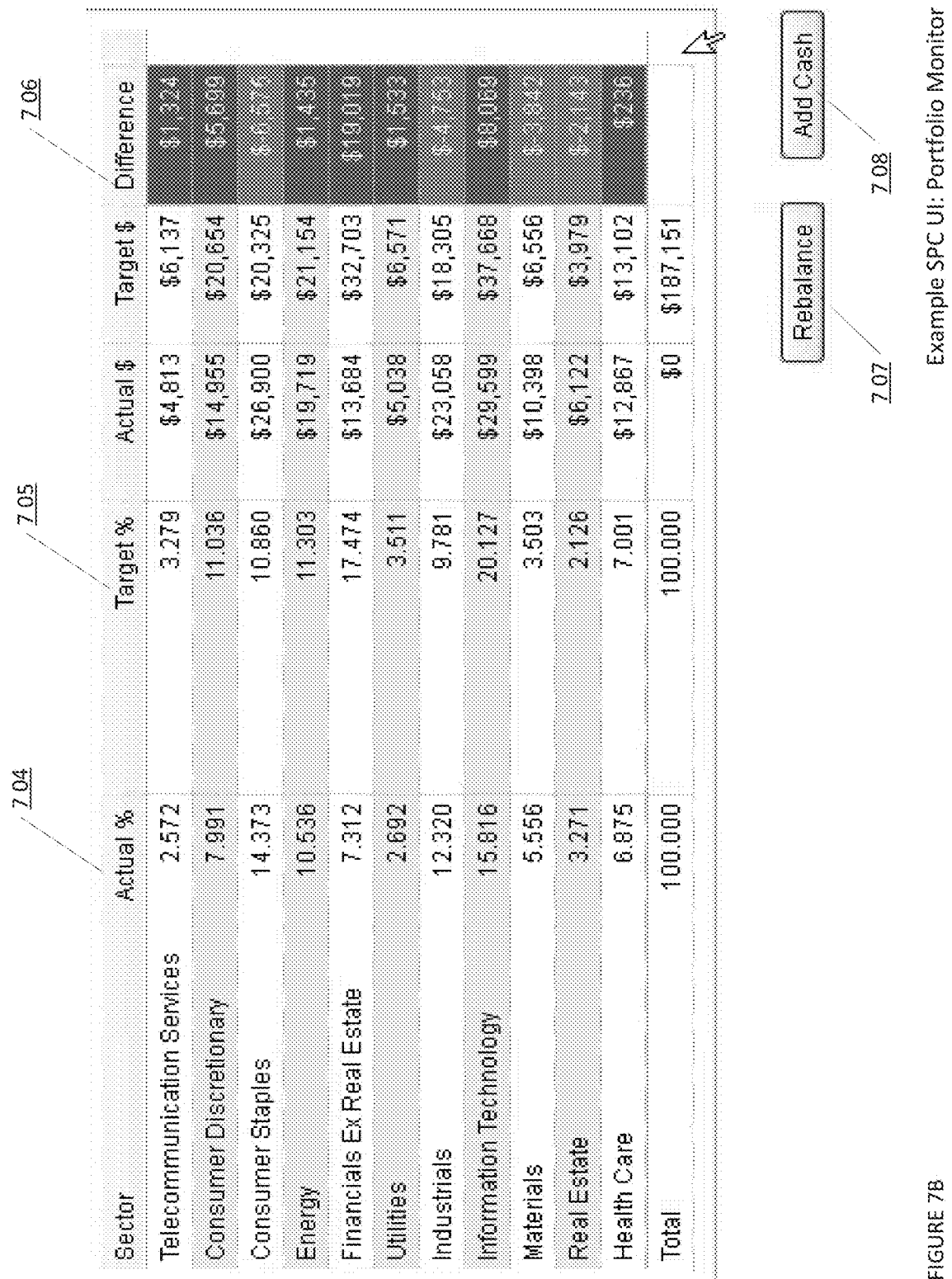

FIG. 4D provide an example logic flow diagram illustrating component 400d for rebalancing a portfolio within embodiments of the SPC; and FIGS. 7A-7B provide example UI diagrams illustrating aspects of portfolio performance monitoring within embodiments of the SPC. In one implementation, as shown in FIG. 7A, a user may specify the condition to receive an alert for rebalance, e.g., when the sector allocation deviates by 3 percentage of the target allocation. When a user receives the notification for sector deviation from strategy (e.g., the target allocation 435, etc.), the user may view a UI showing sector deviations from the target 436. For example, as shown in FIG. 7B, the SPC may show the actual allocation 704 versus the target allocation 705, and the difference 706. In one implementation, the user may elect to rebalance the portfolio 707 and add cash 708 via one click.

In one implementation, the user may preview trades for the re-balancing 437. Once the user accepts the re-balancing 438, the SPC may generate automatic trades for the rebalancing 439, e.g., by sending orders to a third party/exchange/brokerage, etc.

Figure 7C:
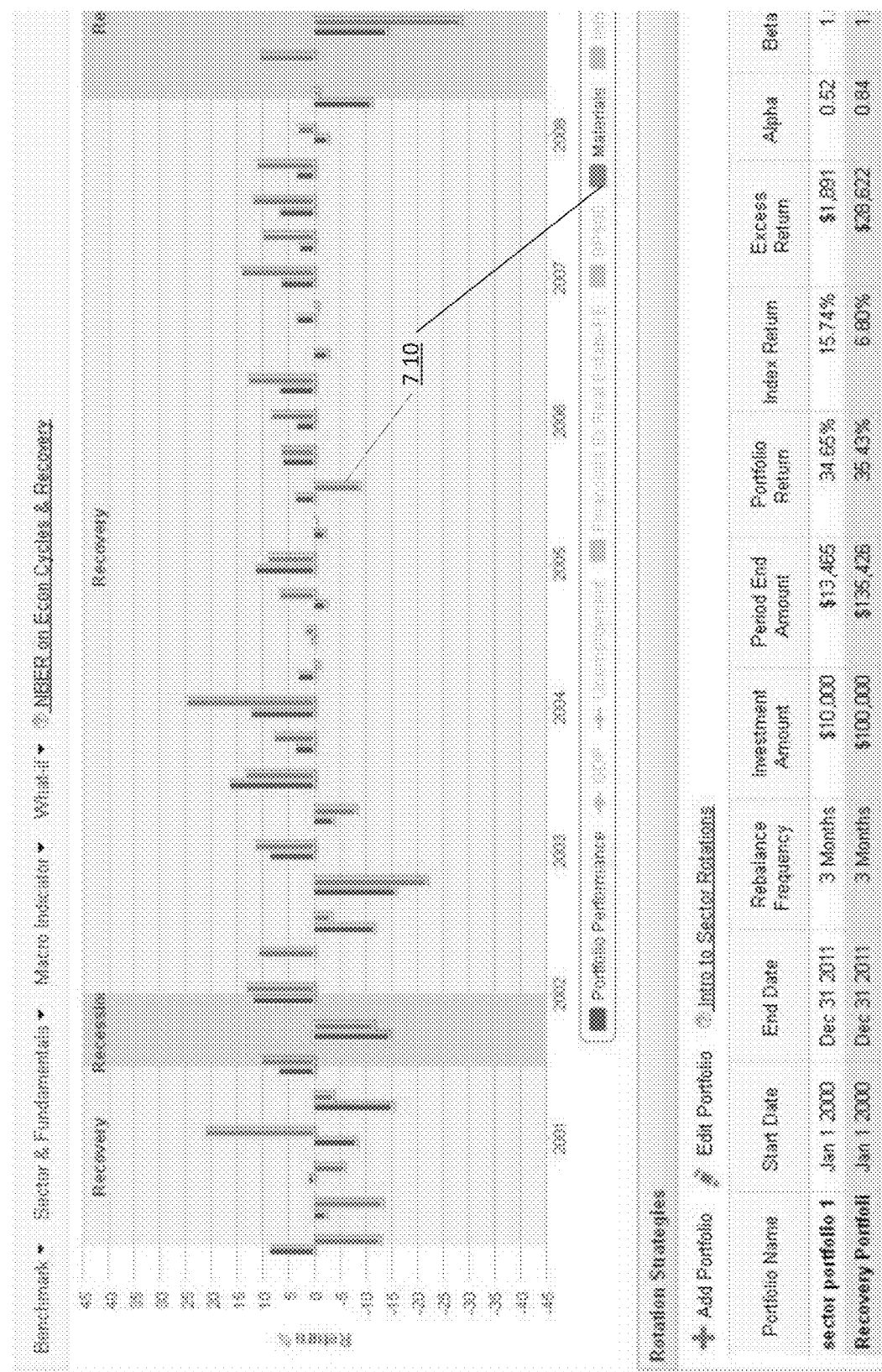
Figure 7D:
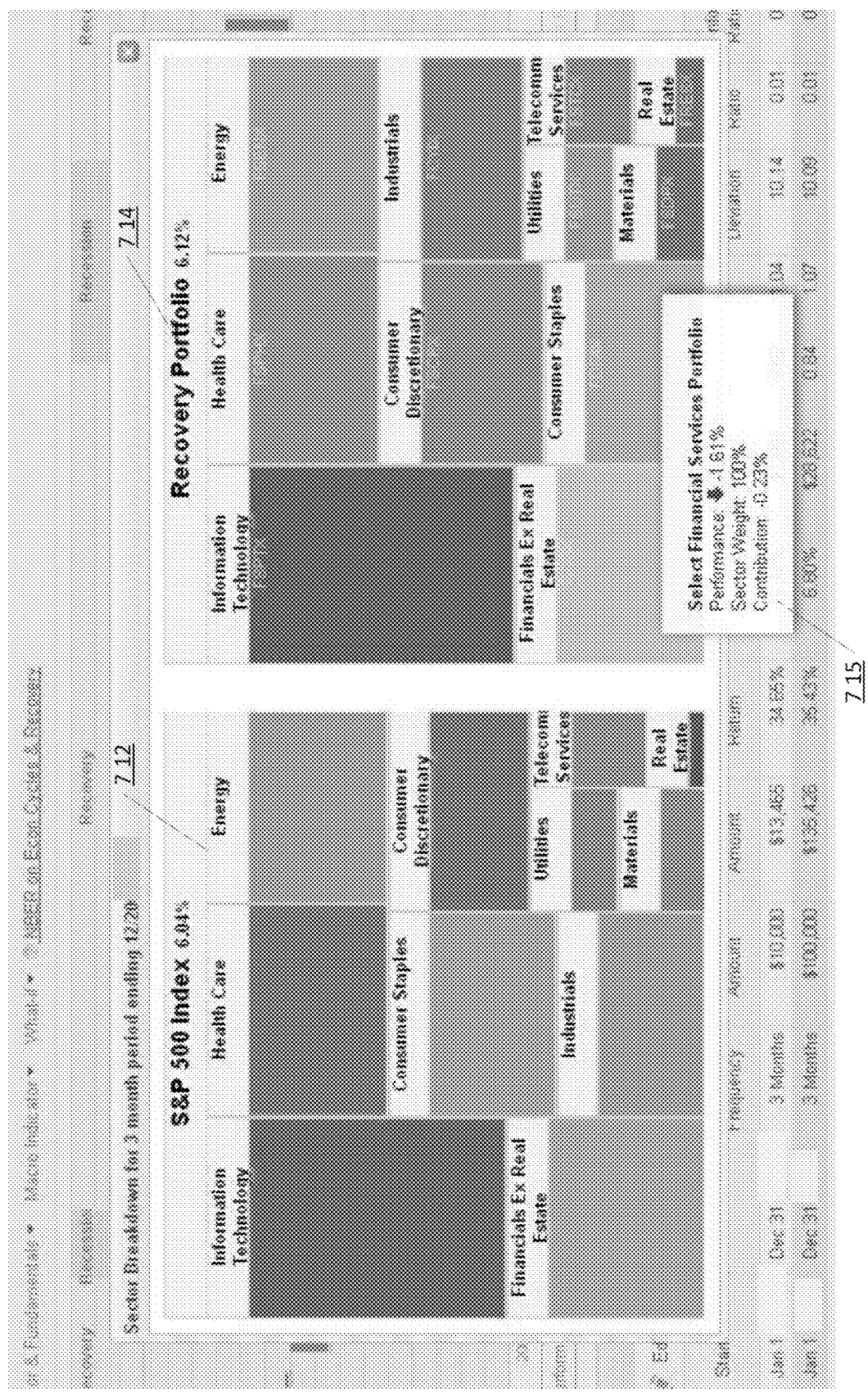
Figure 7E:
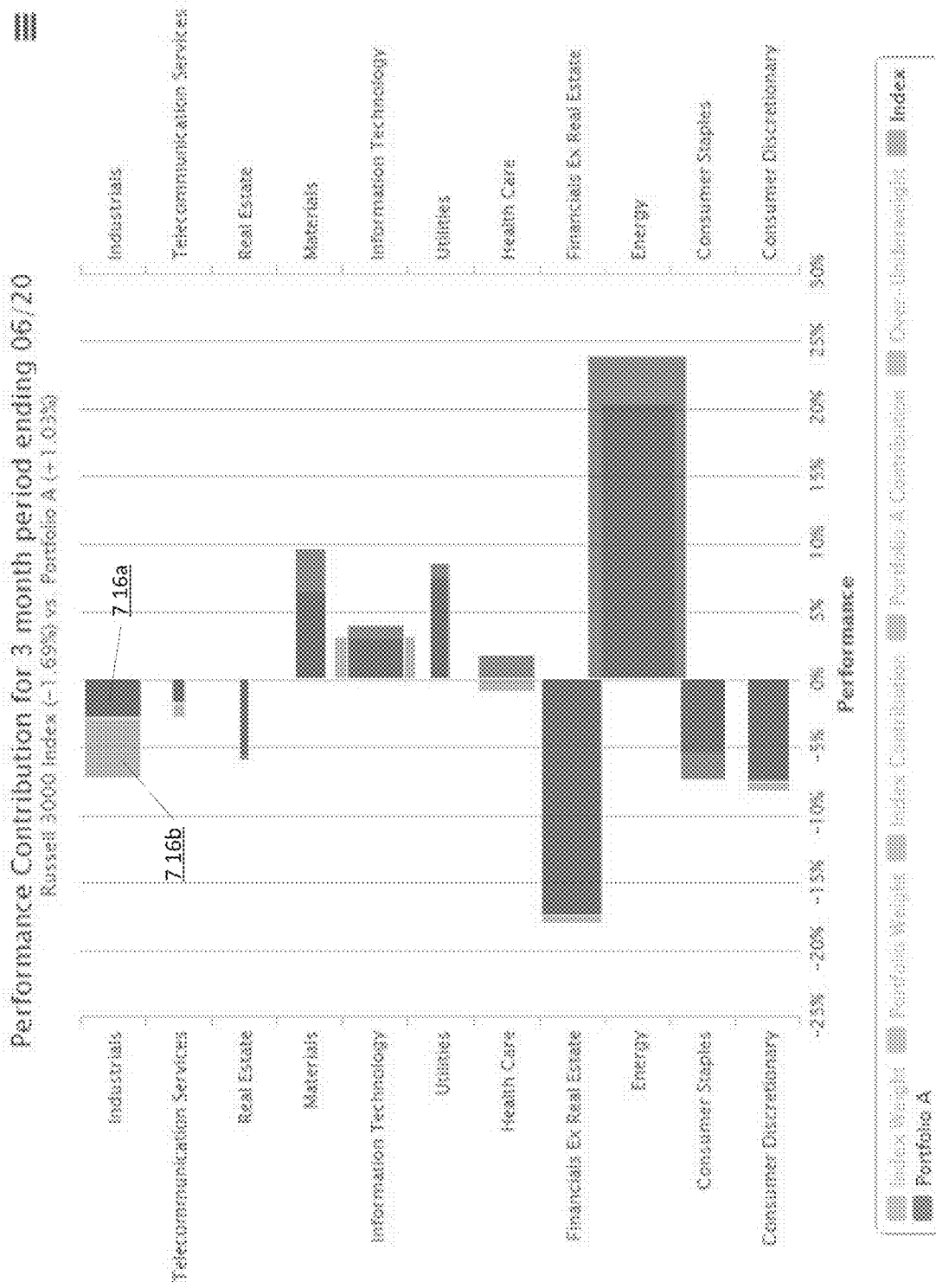
Figure 7F:
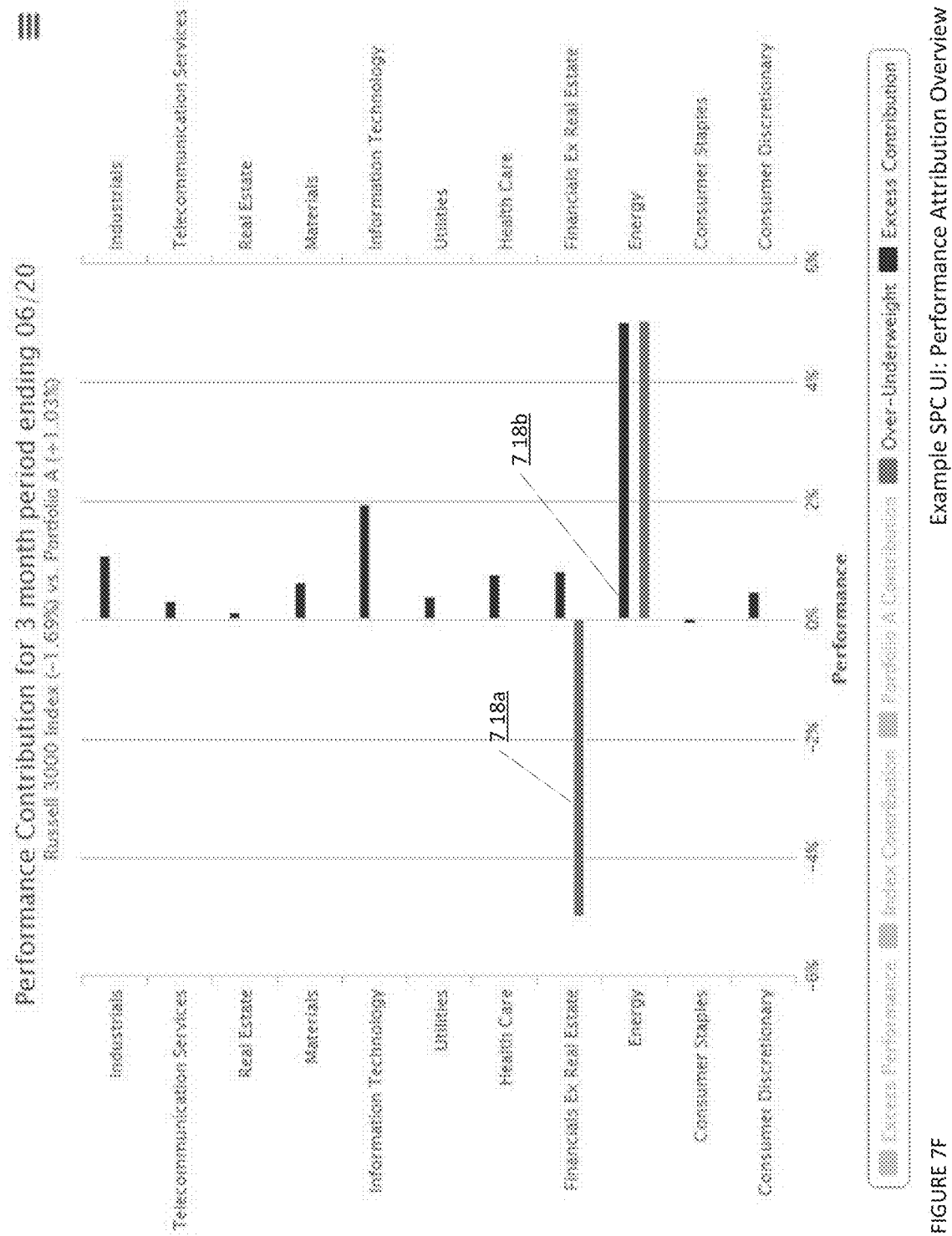

FIGS. 7C-7F provide additional example UI diagrams illustrating aspects of SPC portfolio performance analysis within embodiments of the SPC. As shown in FIG. 7C, the PSC may allow the user to view a comparison of the portfolio performance and a sector performance (e.g., "materials" 710). As shown in FIG. 7D, the SPC may provide a performance attribution "heatmap" view, wherein the portfolio performance 714 and the S&P 500 Index 712 are illustrated in square blocks, wherein the size of each square block represents the weight of each sector. In one implementation, the user may place the mouse over a square block to view the detailed figures of the sector 715. As shown in FIGS. 7E-7F, the SPC provide comparative views showing the index performance vs. the portfolio performance broken out in each sector, e.g., 716a vs. 716b, and 718a vs. 718b, etc.

Figure 8A:
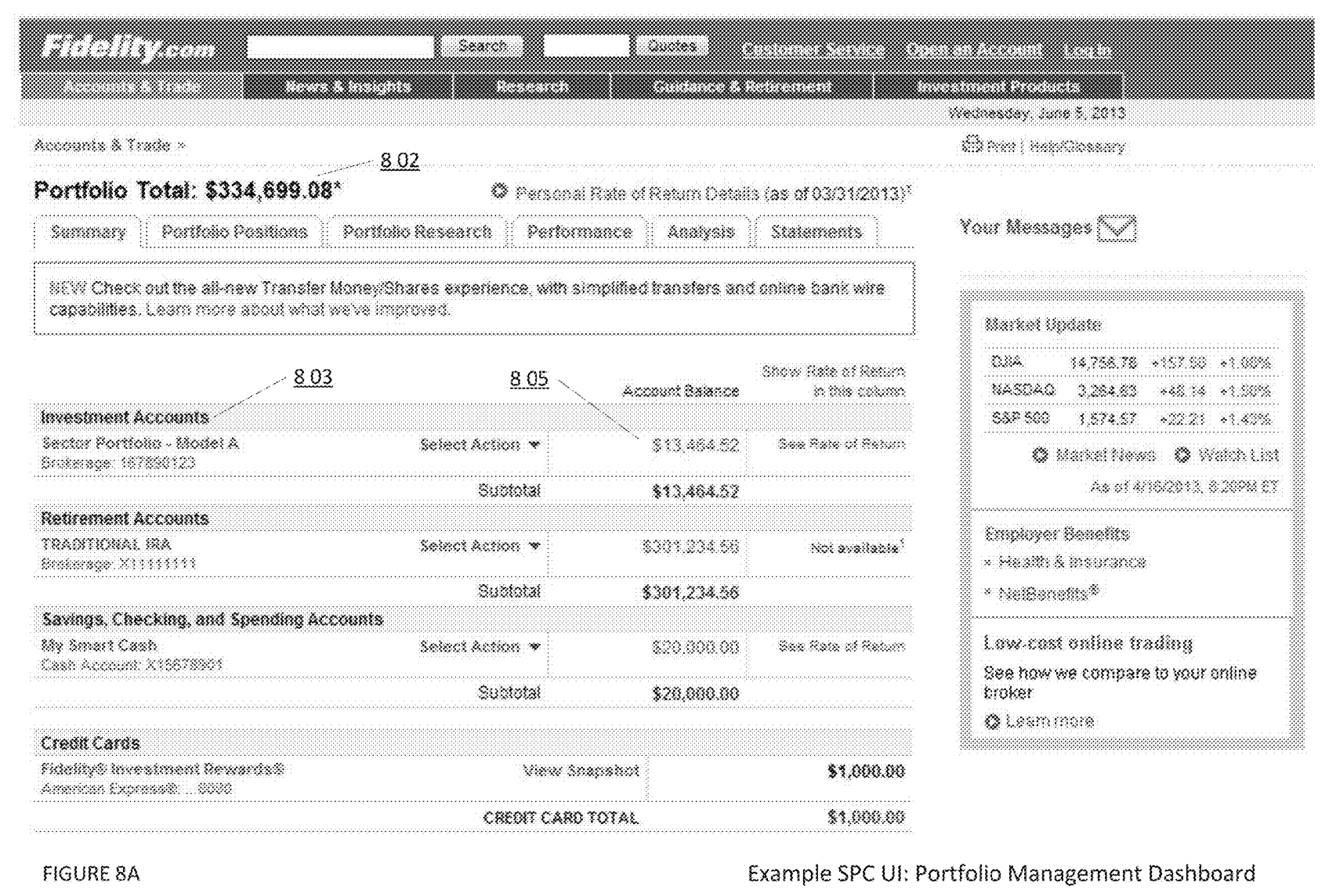

FIGS. 8A-8B provide example UI diagrams illustrating aspects of brokerage portfolio management within embodiments of the SPC. As shown in FIG. 8A, a user may access a brokerage management platform UI, which may provide the portfolio total 802, and an overview of the investment account 803 and its account balance 805. With reference to FIG. 8B, the SPC may show each sector portfolio with the representing symbol 812 and sector name 814, and allow a user to set up actions 810, e.g., to rebalance a sector portfolio, to add cash, to withdraw cash, to setup monitors, and/or the like.

FIGS. 9A-9G provide example data plots illustrating aspects of market data analytics within embodiments of the SPC. For example, equity allocations within portfolios have been determined using conventional parameters such as capitalization (small, mid, large), style (value, blend, growth), and regional orientation (domestic vs. foreign exposure). Such frameworks may deemphasize the largest non-company-specific determinant of equity volatility and returns: the sector and industry in which a company operates. The market data analytics illustrated in FIGS. 9A-9G provide example data performance demonstrating that a sector based framework equity provides effective portfolio construction, helping investors to achieve a variety of objectives and greater control over underlying exposures. Within implementations, individual investors and advisors may build equity portfolios that have primarily utilized one of two frameworks the style box approach or sector and industry classification. For example, $4.4 trillion is deployed in U.S. equity/style box-classified funds, which represents about 90% of the entire U.S. dedicated equity fund market. As another example, the other roughly 10% of the market ($514 billion) is composed of U.S. sector-based equity mutual funds.

Within alternative implementations, investors may adopt sector-based strategies. For example, more than $26 billion net new capital flowed into U.S. sector-based funds/ETFs, and sector-based funds/ETFs have continued to gain market share, attracting 41% of total net flows to equity funds. The sector-based strategies may provide the attributes of sectors, which make them ideal portfolio building blocks for those looking to generate alpha and have greater control in managing risk.

In one implementation, sector exposure may be a significant driver of equity performance and diversification may be an element of any equity allocation approach. According to modern portfolio theory, combining assets that are imperfectly correlated with one another-meaning their performance does not move in lockstep-lowers the risk (volatility) of a portfolio and may open the door to potentially higher risk-adjusted returns.

To construct a diversified equity portfolio, it may be helpful to understand the historical determinant of performance for the asset class. An example way to determine the influential factors that have driven the performance of the equity markets is to perform analysis of variance, which utilizes statistical methods to attribute the variance of a variable (in this case, stock returns to an index) to certain factors, such as sector, style, and market cap, and/or the like. After accounting for those factors, the residual or remaining value may be attributed to other company-specific factors, such as company investment strategies, corporate structure, and/or the like.

Figure 9A:
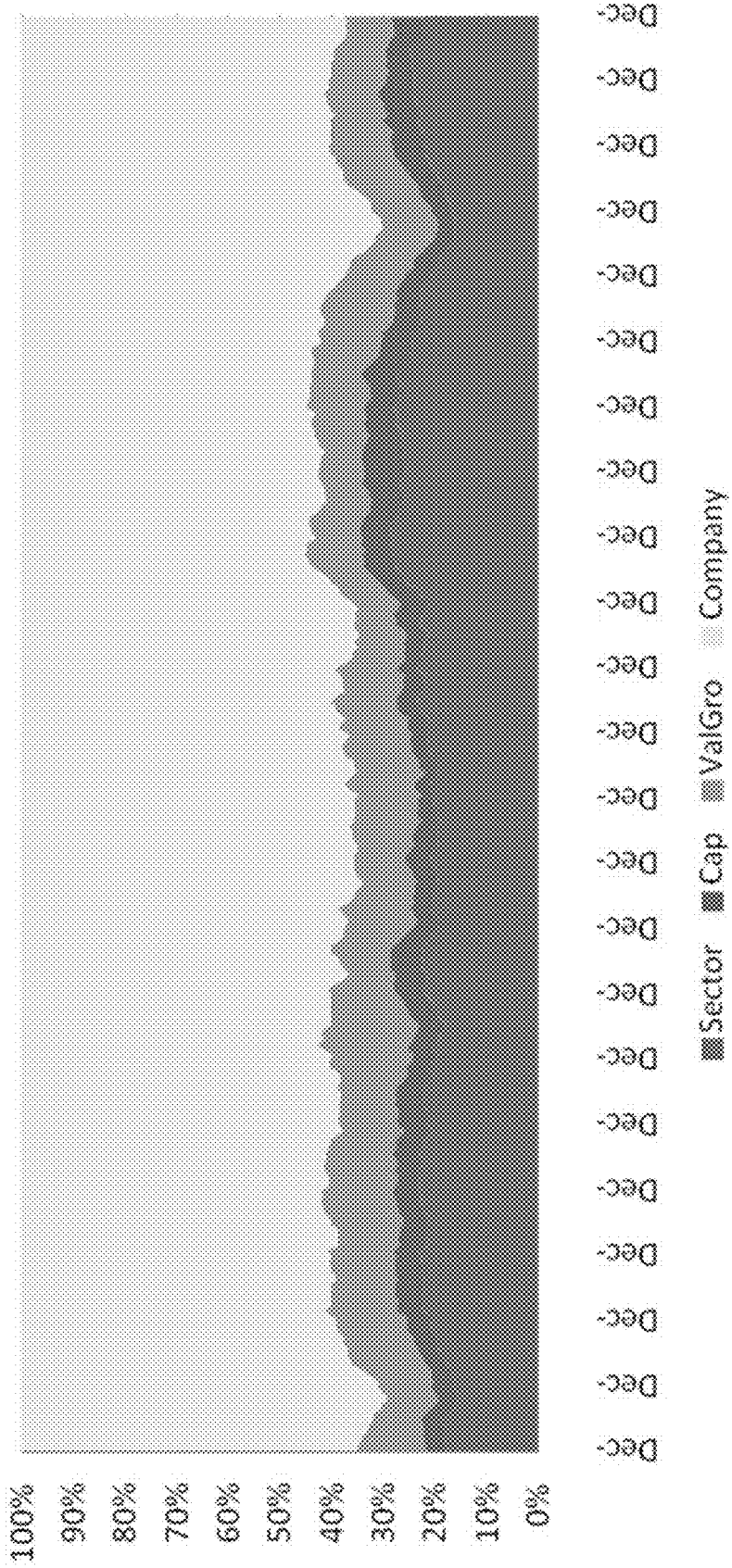

For example, FIG. 9A shows rolling 12-month ANOVA (Analysis of Variance) analysis using statistical models to attribute the variance of a variable (stock returns in the Russell 3000) to certain factors (sector, style, market cap).

The residual is attributed to other company specific factors. As shown in FIG. 9A, factors tied to a specific company have been an important explanatory variable for the returns of stock (e.g., the company-specific factors), which may explain roughly two-thirds of historical returns for the U S equity market over the past decade. Due to the large influence of company-specific factors, individual stock investments may tend to be highly volatile, leading many investors to diversify their exposures to equities.

In another implementation, company-specific factors do not fully account for the performance of the US equity market during the past 20 years; sector exposure may be another influential factor. For example, the earn-ings of various companies within a given sector or industry may be influenced similarly by a specific economic, regulatory, tax, and/or geopolitical factor, yet that same factor may have little influence on earnings in other sectors. For example, the Federal Reserve's monetary policies may significantly influence earnings for many different banks, but have far less impact on earnings for chemical manufacturers. Style and cap factors may also have been important, albeit less powerful determinants of equity returns. Even when combined, both style and cap factors may be less influential on stock returns over time than sector exposure.

In one implementation, the SPC may employ various equity classification systems for the sector-based portfolio construction. Investment classification systems may attempt to group securities according to similar attributes and/or factors. Within the equity universe, two major classification systems may include the "style box" classification and sector/industry classification. The style classification may on a combination of various quantitative financial statistics and third-party consensus earnings-growth estimates to determine whether the stock of a company is classified as a "value" stock (e.g., undervalued based on the underlying financial health of the company, etc.) or a "growth" stock (e.g., high earnings growth prospects). In one implementation, a company's stock may be categorized as having both value and growth characteristics, and part of its market capitalization is apportioned to both "styles" (e.g., blended category). Market capitalization may then further divide the equity market based on the total value of outstanding shares of a company, and divides the universe into three buckets: small, mid, and large. This classification system may result in a good made up of nine individual boxes based on style and on market capitalization.

As an alternative implementation, sectors and industry classifications may rely on a hierarchical approach that, first, groups each company into one of 10 sectors based on the nature of its business, e.g., consumer discretionary, consumer staples, energy, financials, health care, Industrials, information technology, material, telecommunication services, and utilities. Beneath each sector lies another layer, typically referred to as industry groups, which consist of multiple industries, and which may subsequently include multiple sub-industries. For example, the Global Industry Classification Standard methodology assigns the stock of each company to a sub-industry based on its principal business activity, identified by analyzing the relative importance of the sources of revenues and earnings. Then, the stock is categorized according to industry, industry group, and sector. Each grouping below the highest sector level becomes more specific than the classification level above it.

Figure 9B:
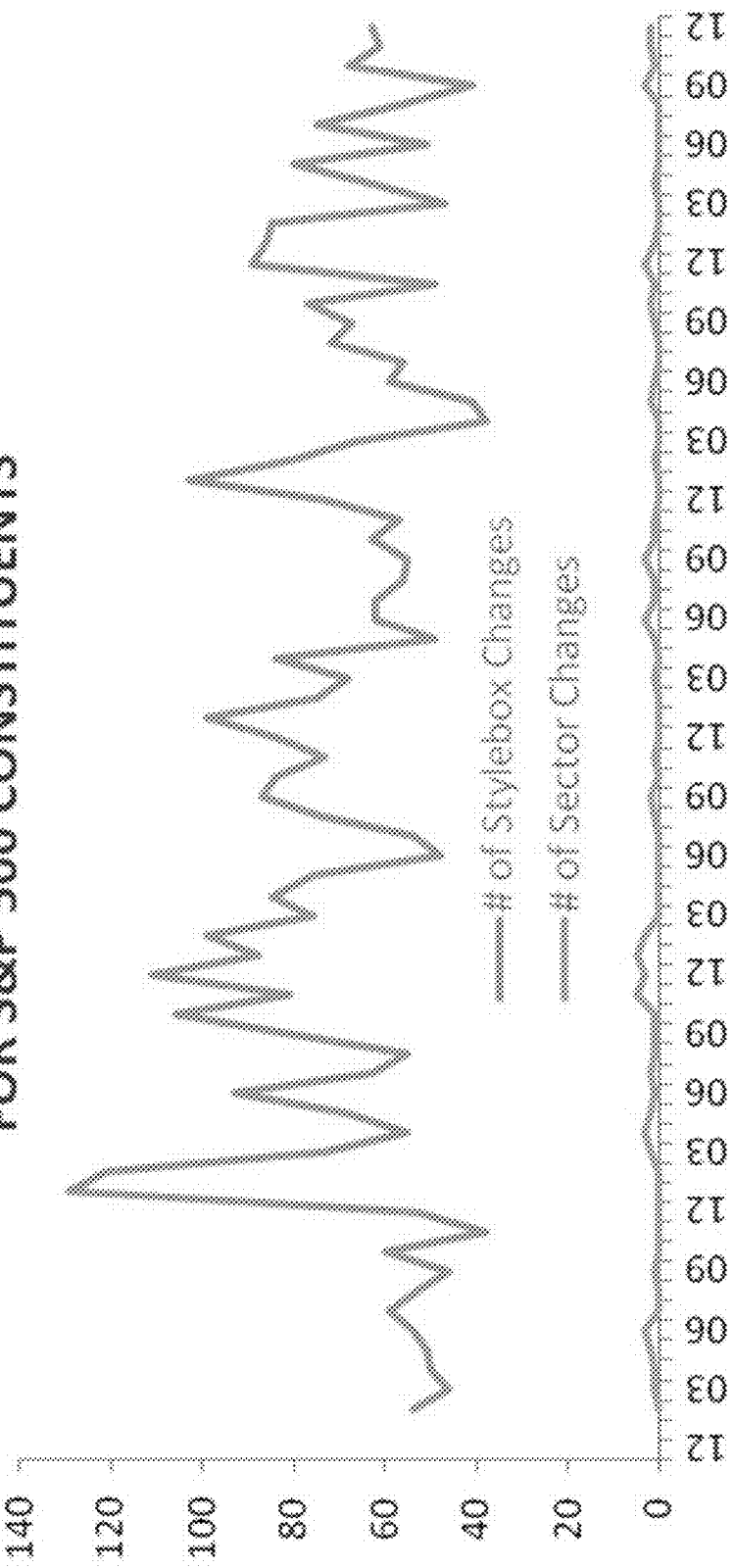

In one implementation, sector exposure has been a significant driver of equity performance over time because of the distinct risk and performance characteristics of the 10 major sectors, which also make sectors compelling building blocks for creating an equity portfolio to generate alpha and manage a portfolio's risk exposure. Sector classifications tend to be fairly intuitive, as most investors are able to identify an energy or health care company based on the nature of its business operations. For instance, companies that manufacture products and services that meet basic human needs, such as food or detergent producers, electric utilities and hospitals are identifiable as being in the consumer staples, utilities, and healthcare sectors, respectively. In cases when businesses evolve over time, and diversified companies may have business operations in multiple sectors/industries, a majority of them may stick to their core expertise and focus on a particular industry (e.g., banking) or perhaps a few related industries (e.g., banking, trading, and investment management) within a given sector. Diversified companies thus may be classified according to the largest and highest revenue producing underlying business. For example, FIG. 9B shows month-to-month classification changes for S&P 500 constituents, showing the sector components are stable. As shown in FIG. 9B, over a five year period, one company in the S&P 500 was reclassified per month on a sector basis, and 70 companies per month were reclassified on a style box basis.

In one implementation, portfolio compositions within style box investment frameworks may change frequently based on ever-changing financial characteristics, such as market values, book and price values, forecast earning growth, and historical sales per share, among other variables. Investors therefore may find it challeng-ing to know whether a company falls into a "value," "blend," or "growth" category without prior research. In addition, the financial characteristics that determine style box classification may not provide investors with the most accurate picture of the corporate composition or economic sensitivity of a group of stocks, which may lead investors into assuming undesirable risk exposures.

For example, when an investor sought the relative performance stability of large-cap value stocks after expecting losses in growth-oriented stocks when the tech bubble burst in, this investor may have been surprised during financial crisis by the significant price declines of banks, which are often seen as "cheap" value exposure and are a significant component of the large-cap value category. In one implementation, such equity classification of sectors may allow investors to understand what they own, which may give them more confidence in building equity portfolios suitable to their objectives. Meanwhile, the relative stability of a sector classification framework may provide allocators with very precise—and potentially effective—exposures when constructing equity portfolios. Although company-specific factors may lead to stock performance differentiation, companies within each sector also can be influenced by similar macro drivers of revenue and profit growth; hence, the stocks often react similarly to changes in the economic cycle. For example, consumer staples companies tend to have consistent demand for their products, which typically leads to stable revenues, earnings, and stock performance relative to other sectors. For example, a toothpaste producer may typically not see major swings in its earnings or stock price regardless of the trajectory of the economy, because few people are likely to cut back on a basic need such as toothpaste, even during tough times.

For another example, although some style box classifications tend to have higher exposures to certain sectors, there are companies in all 10 sectors that are represented in each style category. This diverse style box composition may make the earnings and stock prices of style box components somewhat less uniformly influenced by certain factors, such as shifts in the economy. Roughly one-third of companies within the Russell 3000 Index are classified as both value and growth companies, with portions of their market capitalization assigned to each category. As a result of the diverse makeup of the style box components, there may be fewer consistent patterns of earnings results and stock performance amid fluctuations in an economy.

FIG. 9C shows dispersion between best- and worst-performing components of U.S. equity sector and style box classifications. Equity sectors may tend to have significant performance dispersion relative to each other, which is an attribute for any alpha-seeking equity allocation strategy. Historical analysis shows that the dispersion of returns between the best- and worst-performing sectors (average=43%) has been nearly double that of style box categories (average=24%), as shown in FIG. 3C. By the nature of their composition, style box-oriented strategies are diversified across multiple sectors, leading to relatively lower performance dispersion. The wider dispersion of individual sectors relative to style box components suggests that sectors tend to be more volatile, but this dispersion also allows an investor the opportunity to have greater control in managing a portfolio's risk exposure and greater opportunity to generate alpha. As with any strategy that deviates from a market-cap-weighted benchmark, it's also important for an investor to recognize that active sector allocations may potentially lead to increased return variance over short-term periods. For this reason, making effective equity sector allocations to achieve an investment objective may be best suited to investors who have the appropriate experience, investment tools, and research capabilities.

FIG. 9D shows equity sectors and the annual standard deviation of returns (S&P 500 index). The deviations of equity sector performance are often Illustrated by the periodic table of returns, as shown in FIG. 9D. This table illustrates the lack of a pattern of sector returns, which speaks to the rationale for why diversification across sectors is important. An additional periodic table in FIG. 9D shows the volatility (e.g., standard deviations) of sectors. FIG. 9D illustrates that although the volatility of sectors can change from year to year, there are some patterns of relative volatility between sectors that can help enhance their predictability. In general, more economically sensitive sectors, such as energy, materials, and information technology, tend to show more volatility than the average level of volatility for the broader US equity market in any given year, while defensive-oriented sectors, such as consumer staples and utilities, tend to show less volatility than the market average. Information technology was the most volatile sector in each year, and has also been more volatile than most sectors in other years. Consumer staples, which has been the least volatile sector in 10 of the past 12 years, tends to be on the opposite end of the spectrum, showing persistently lower volatility than most other sectors (see FIG. 9D).

FIG. 9E shows the U.S. equity sector correlations. To achieve adequate diversification, equity allocators may evaluate not only the dispersion of returns, but also the correlation of those returns. Equity sectors have exhibited low return correlations over extended time periods in each of the 10 sectors showed performance correlations below 0.5 versus at least one other sector, and seven of 10 sectors had correlations against the broader market of 0.8 or lower (see FIG. 9E). Examples of low correlations among individual sectors tend to be between the most and least economically sensitive sectors. For example, the utilities sector historically has been one of the least economically sensitive sectors (e.g., a consumer tends to be more willing to curtail spending on discretionary items before failing to pay the electricity bill). Thus, during the 2000s, utilities had a very low correlation to information technology, which is an economically sensitive sector. Further, sectors have shown generally lower return correlations compared with style box categories. During the 2000s, the aver-age correlation of sector s versus one another was 0.52, while the average correlation among style box benchmarks over the same period was 0.76.

Figure 9F:
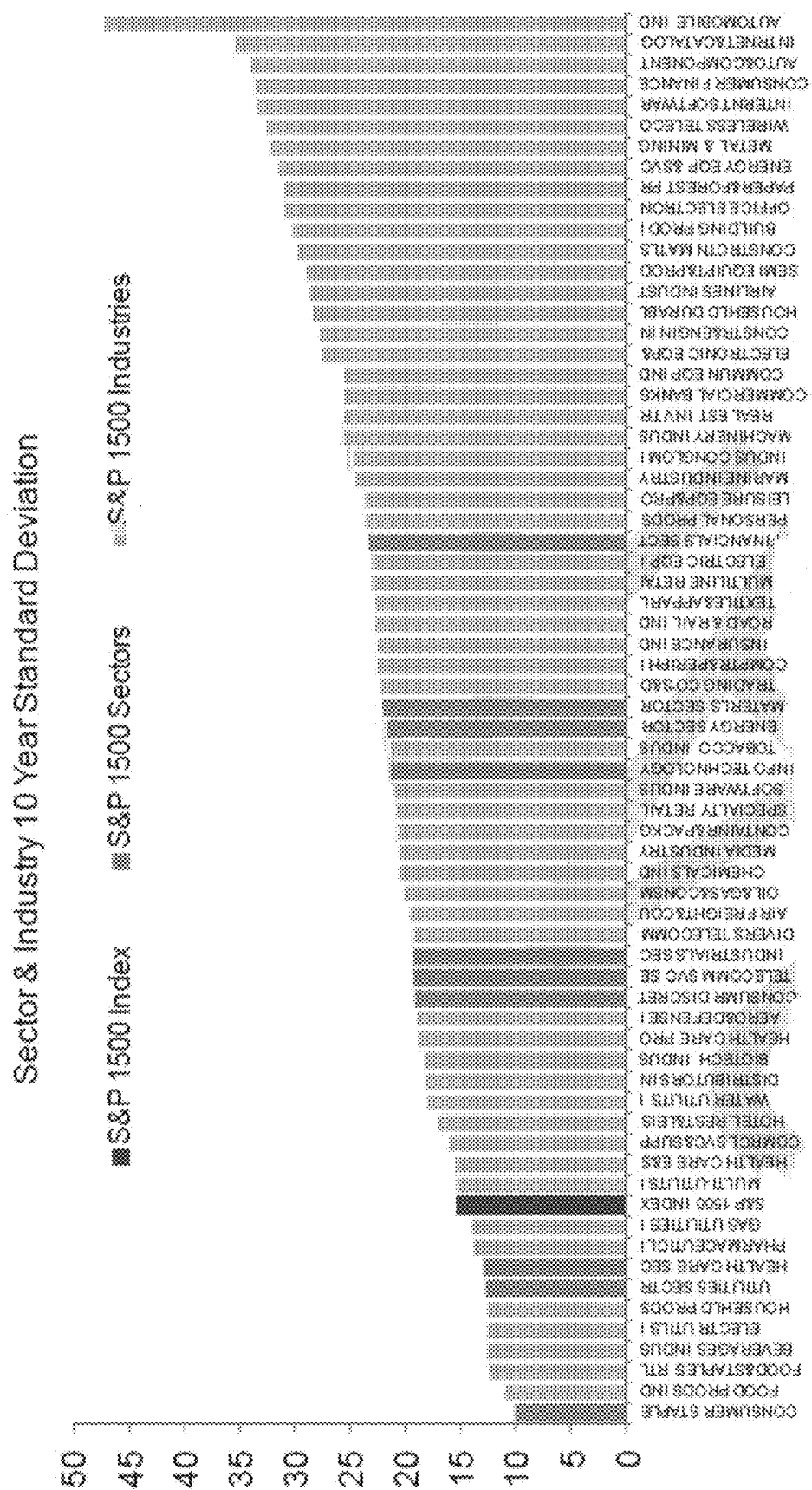

FIG. 9F shows U.S. equity sector & industry 10-year standard deviation. Consistent performance volatility patterns and low correlations are attractive features in portfolio construction that can enhance the ability to manage portfolio risk and reap diversification benefits. While an investment in any single sector may not be an appropriate level of diversification for an equity portfolio, a diversified exposure across sectors may allow an investor to achieve a desired level of portfolio diversification and volatility. For example, an investor looking to maintain some exposure to equities and at the same time lower the equity risk profile may be more confident in tilting allocations toward sectors with historically lower volatility. Several equity sectors and industries have had lower volatilities than the very broadly diversified US equity market. During a 10 year period of the 10 GICS sectors, as shown in FIG. 9F, the 10 GICS sectors (e.g., consumer staples, utilities, telecommunications, and health care) and 10 of the 68 industries displayed lower volatility than the broadly diversified S&P 500 index.

Figure 9G:
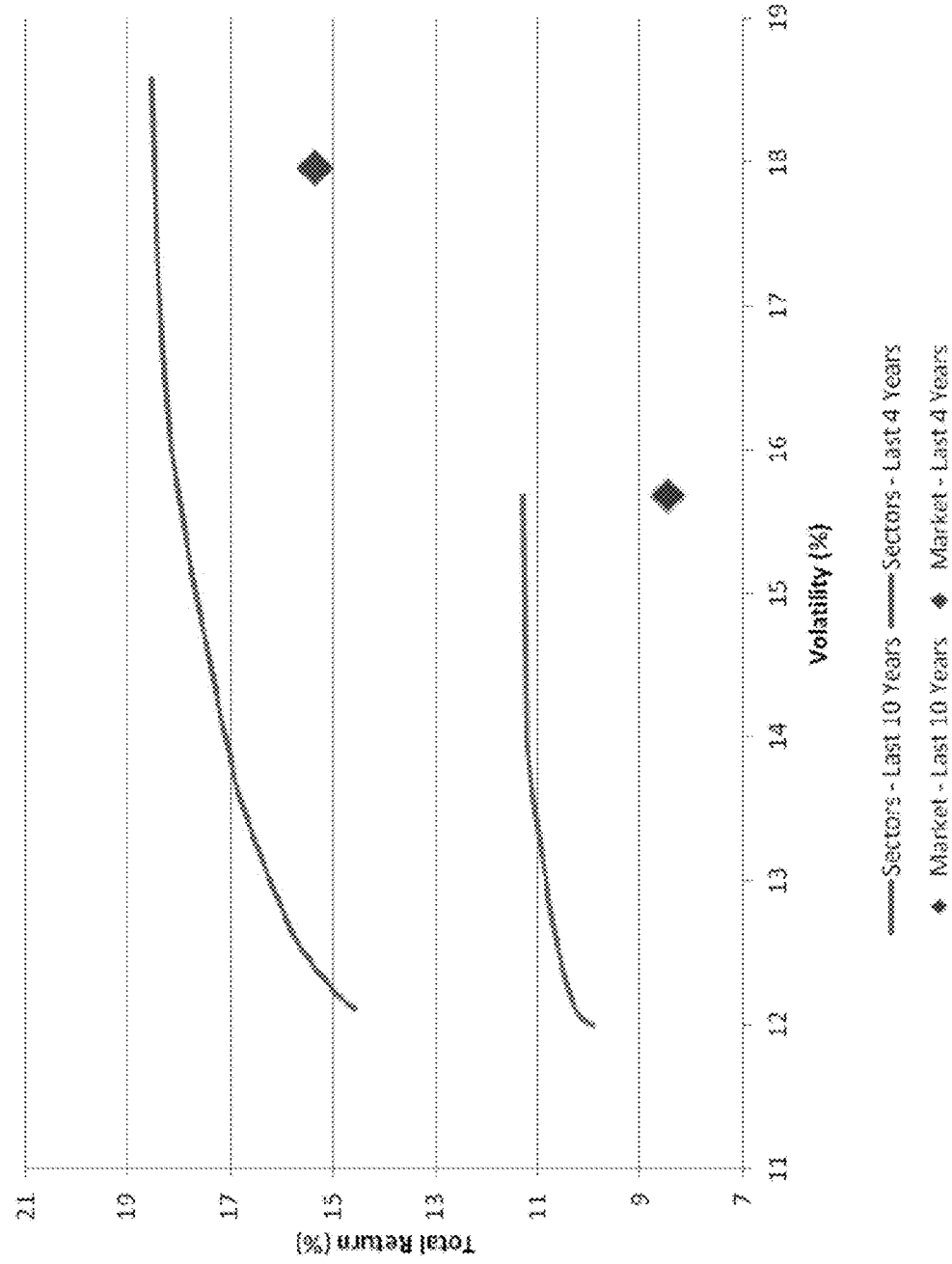

FIG. 9G shows that portfolios created with equity sectors as their building blocks were consistently more efficient—providing a higher return and lower risk—than the broader U.S. equity market over multiple time periods. The attributes of equity sectors make them effective building blocks for investors looking to create efficient equity portfolios—those that maximize risk-adjusted returns for any given level of risk. The efficient frontier, a hallmark of mean-variance optimization, depicts optimal portfolios that maximize investor return for a given level of volatility (or minimize volatility for a given level of returns). Efficient frontiers created using U.S. equity sectors as portfolio building blocks provided potential asset mixes that offer significantly different volatility exposure than those created using style box components, and superior return potential at similar levels of volatility (see FIG. 9G). Alternatively, style box frontiers are short, reflecting the lack of differentiation among style box components.

As shown in FIG. 9G, an optimal portfolio mixes have the benefit of 20/20 hindsight, as an investor would need to pick the right mix of sectors to achieve a portfolio on the efficient frontier. But the opportunity to create more efficient portfolios using a sector frame—work has held consistent over the post-crisis period the past 10 years, and other time periods analyzed (FIG. 9G).

Within implementations, attributes of equity sectors, and the risk/return characteristics, provide an investor with the opportunity to create an equity portfolio with favorable risk-adjusted performance. In one implementation, style box portfolio construction may provide an investor with a framework to create an equity portfolio, and continues to remain a viable way to achieve a level of diversification, putting greater emphasis on sector exposure, along with style and market cap—can enhance an investor's ability to evaluate and manage risk. The potential to generate alpha and have greater control in managing a portfolio's risk exposure may motivate more Investors to give increased consideration to sectors when constructing an allocation to equities.

In one implementation, the SPC may use sectors to construct equity portfolios. Market data analysis in FIGS. 9A-9G show that equity sectors have certain attributes that can be exploited by investors looking to achieve a variety of objectives with an equity allocation. The SPC may then determine a strategy that takes advantage of these attributes in a way that best serves an investment objective. Involve shifting sector allocations within a diversified equity portfolio based on certain analytical criteria, including business cycle rotations, and technical, fundamental, and quantitative factors. For example, a business cycle approach to sector investing may use probabilistic analysis based on historical data of certain factors, such as corporate earnings, interest rates, and inflation, to identify sectors that are likely to either outperform or under perform in the current phase of the economic cycle In one implementation, allocation strategies based on technical analysis may examine the historical price changes of sectors as a basis for determining future opportunities. These strategies look for the relative strength of each sector's price movements by analyzing trends, moving averages, and other technical characteristics.

In one implementation, fundamental analysis evaluates each sector's underlying companies to determine which industry groups, industries, or sub-industries have the best valuation characteristics, earnings growth, and return potential relative to their peers.

In one implementation, quantitative strategies may leverage sophisticated mathematical models to evaluate a large number of factors, which could include a range of economic, fundamental, and technical factors. Quantitative strategies may test the historical predictive success of these many factors to determine the appropriate positioning.

In one implementation, blended analysis may incorporate any combination of the business cycle approach, technical, fundamental, and quantitative analysis.

In one implementation, the adoption of an overlay—a screen or view based on a certain factor—to determine which sectors may be positively or negatively influenced by such a factor. For example, an inflation overlay may be used to allocate capital toward sectors that are influenced by rising or falling input prices, which may affect corporate profits.

In one implementation, in a portfolio completion strategy, the aggregated sector exposure of a diversified portfolio may not align with an investor's risk tolerance or objectives. In such a scenario, an investor may choose to add a focused sector or industry allocation to tilt the overall equity portfolio sector weights to create a more diversified or desired sector composition. For example, an investor with holdings across three diversified portfolio managers may find he or she has a higher-than-desired exposure to pro-cyclical sectors. In such case, the investor may want to compensate for those holdings with allocations to more defensive sector vehicles, thus completing his or her equity exposure to serve an objective.

In one implementation, the sector based investing strategies may also provide an asset allocator with an effective tool to diversify his or her investment portfolio away from the exposures associated with human capital (e.g., the economic value of one's work capabilities, etc.). Human capital may carry with additional risk exposures, such as an overexposure to an individual's total wealth given the economic sector in which he or she works, or the cyclicality of one's earnings. For example, many investors may have nearly all of their human capital concentrated in a single economic sector—the sector of their career—but they naturally diversify their financial capital across many sectors in investment accounts. As such, these individuals, particularly those who receive profit sharing and stock options, and who participate in employer-sponsored stock plans—may be unwilling to expose their total wealth to significant single-sector risk, which may carry with greater sensitivity to financial market fluctuations and trends beyond their control within that sector. For example, a stock trader may have high exposure to the financials sector, and his or her compensation might vary depending on market conditions. Because non-financial assets such as human capital, real estate holdings, and small-business ownership are generally liquid and more difficult or impossible to transfer, diversifying investments across financial assets with different sector exposures or market and volatility profiles may be an appropriate approach.

In one implementation, sector roll down strategies may be adopted. During and after a global financial crisis, some investors may desire certain target-date strategies to be appropriately exposed to risk assets, as many experienced significant losses despite substantial portfolio diversification. As equity sectors have certain consistent characteristics, they may be used as a tool to roll down a portfolio's risk exposure as an investor approaches a specific target date. Sectors with stable end markets—such as consumer staples, utilities, and health care—have rarely experienced significant price "bubbles" and the subsequent losses that can create stress for investor s and their portfolios in retirement. Historically, these sectors have generated attractive risk-adjusted returns that could support an investor's retirement objective.

In further implementations, the SPC provides a tool to enable retail investors to research, build, and maintain an investment strategy using sector funds or sector ETFs. The SPC tool may allow investors to build and test a customized portfolio based on sector rotation concepts. For example, once the investor decides on the portfolio, it may allow them to execute on the strategy by trading in a brokerage account. The tool may enforce investment discipline and ease of execution by allowing the management of the portfolio as a single unit. The SPC may offer robust capabilities to help with sector rotation strategies based on historical performance of sector funds and benchmarks with a backdrop of economic cycles and sector fundamentals. In one implementation, the SPC may build portfolios created using sector funds or ETFs as building blocks, and allow creation of custom portfolios using sector funds or ETFs. In one implementation, portfolio sector allocations may be modeled after market indices or sector investment strategies to provide customization of allocation to fit individual needs, and advanced analysis to help with sector rotation strategies. In one implementation, the SPC may enable sector allocation and sector rotation using historical analysis and back testing; provide model strategies to facilitate sector allocation and rotation; provide insight into how the sector bets paid off using historical sector contribution to returns; manage sector allocation portfolios created as a single unit; allow additional buys and sells from the Portfolio as a whole, while maintaining the portfolio allocation; allow notifications when allocations go out of balance and allow re-balancing with a single click to get the Portfolio back in balance; rebalancing supports additional investments, withdrawals or flat. In one implementation, the SPC may be used by retail customers to create, test and manage their portfolios; by representatives in branches in their conversations with customers in selling Fidelity sector funds and ETFs; by RIAs on the Fidelity platform to create investment strategies for their clients, and/or the like.

In further implementations, the SPC may allow users to define subsectors under a sector. In another implementation, the SPC may comprise social gamification, e.g., by allowing different users to form a "social group" and view the performance of each other's portfolio. In one implementation, the SPC may allow a user to follow another user (e.g., as an investment success, etc.) so that the user may see the investment activities of another.

SPC Controller

Figure 10:
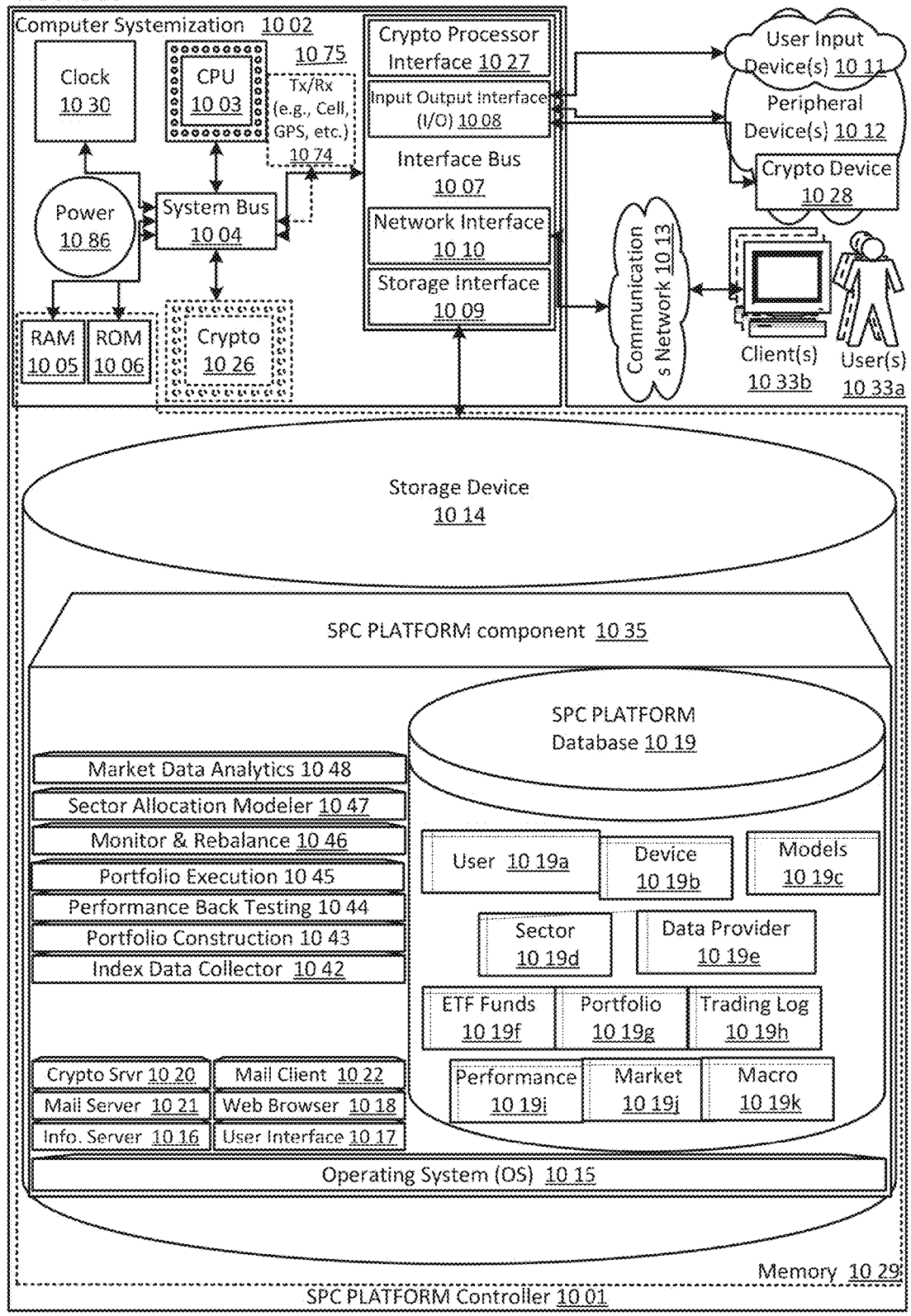
FIG. 10 shows a block diagram illustrating example aspects of a SPC controller.

FIG. 10 shows a block diagram illustrating example aspects of a SPC controller 1001. In this embodiment, the SPC controller 1001 may serve to aggregate, process, store, search, serve, identify, instruct, generate, match, and/or facilitate interactions with a computer through various technologies, and/or other related data.

Users, e.g., 1033a, which may be people and/or other systems, may engage information technology systems (e.g., computers) to facilitate information processing. In turn, computers employ processors to process information; such processors 1003 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1029 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SPC controller 1001 may be connected to and/or communicate with entities such as, but not limited to: one or more users from user input devices 1011; peripheral devices 1012; an optional cryptographic processor device 1028; and/or a communications network 1013. For example, the SPC controller 1001 may be connected to and/or communicate with users, e.g., 1033a, operating client device(s), e.g., 1033b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SPC controller 1001 may be based on computer systems that may comprise, but are not limited to, components such as: a computer systemization 1002 connected to memory 1029.

Computer Systemization

A computer systemization 1002 may comprise a clock 1030, central processing unit ("CPU(s)" and/or "processor(s)" (these terms are used interchangeably throughout the disclosure unless noted to the contrary)) 1003, a memory 1029 (e.g., a read only memory (ROM) 1006, a random access memory (RAM) 1005, etc.), and/or an interface bus 1007, and most frequently, although not necessarily, are all interconnected and/or communicating through a system bus 1004 on one or more (mother)board(s) 1002 having conductive and/or otherwise transportive circuit pathways through which instructions (e.g., binary encoded signals) may travel to effectuate communications, operations, storage, etc. The computer systemization may be connected to a power source 1086; e.g., optionally the power source may be internal. Optionally, a cryptographic processor 1026 and/or transceivers (e.g., ICs) 1074 may be connected to the system bus. In another embodiment, the cryptographic processor and/or transceivers may be connected as either internal and/or external peripheral devices 1012 via the interface bus I/O. In turn, the transceivers may be connected to antenna(s) 1075, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing SPC controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 1029 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the SPC controller and beyond through various interfaces. Should processing requirements dictate a greater amount speed and/or capacity, distributed processors (e.g., Distributed SPC), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the SPC may be achieved by implementing a microcontroller such as CAST's R8051XC2 microcontroller; Intel's MCS 51 (i.e., 8051 microcontroller); and/or the like. Also, to implement certain features of the SPC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SPC component collection (distributed or otherwise) and/or features may be implemented via the microprocessor and/or via embedded components; e.g., via ASIC, coprocessor, DSP, FPGA, and/or the like. Alternately, some implementations of the SPC may be implemented with embedded components that are configured and used to achieve a variety of features or signal processing.

Depending on the particular implementation, the embedded components may include software solutions, hardware solutions, and/or some combination of both hardware/software solutions. For example, SPC features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the SPC features. A hierarchy of programmable interconnects allow logic blocks to be interconnected as needed by the SPC system designer/administrator, somewhat like a one-chip programmable breadboard. An FPGA's logic blocks may be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the SPC may be developed on regular FPGAs and then migrated into a fixed version that more resembles ASIC implementations. Alternate or coordinating implementations may migrate SPC controller features to a final ASIC instead of or in addition to FPGAs. Depending on the implementation all of the aforementioned embedded components and microprocessors may be considered the "CPU" and/or "processor" for the SPC.

Power Source

The power source 1086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1086 is connected to at least one of the interconnected subsequent components of the SPC thereby providing an electric current to all the interconnected components. In one example, the power source 1086 is connected to the system bus component 1004. In an alternative embodiment, an outside power source 1086 is provided through a connection across the I/O 1008 interface. For example, a USB and/or IEEE 1394 connection carries both data and power across the connection and is therefore a suitable source of power.

Interface Adapters

Interface bus(ses) 1007 may accept, connect, and/or communicate to a number of interface adapters, frequently, although not necessarily in the form of adapter cards, such as but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 1009 may accept, communicate, and/or connect to a number of storage devices such as, but not limited to: storage devices 1014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 1010 may accept, communicate, and/or connect to a communications network 1013. Through a communications network 1013, the SPC controller is accessible through remote clients 1033b (e.g., computers with web browsers) by users 1033a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SPC), architectures may similarly be employed to pool, load balance, and/or otherwise increase the communicative bandwidth required by the SPC controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1010 may be used to engage with various communications network types 1013. For example, multiple network interfaces may be employed to allow for the communication over broadcast, multicast, and/or unicast networks.

Input Output interfaces (I/O) 1008 may accept, communicate, and/or connect to user input devices 1011, peripheral devices 1012, cryptographic processor devices 1028, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 1011 often are a type of peripheral device 1012 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1012 may be connected and/or communicate to I/O and/or other facilities of the like such as network interfaces, storage interfaces, directly to the interface bus, system bus, the CPU, and/or the like. Peripheral devices may be external, internal and/or part of the SPC controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1028), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the SPC controller may be embodied as an embedded, dedicated, and/or monitor-less (i.e., headless) device, wherein access may be provided over a network interface connection.

Cryptographic units such as, but not limited to, microcontrollers, processors 1026, interfaces 1027, and/or devices 1028 may be attached, and/or communicate with the SPC controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1029. However, memory is a fungible technology and resource, thus, any number of memory embodiments may be employed in lieu of or in concert with one another. It is to be understood that the SPC controller and/or a computer systemization may employ various forms of memory 1029. For example, a computer systemization may be configured wherein the operation of on-chip CPU memory (e.g., registers), RAM, ROM, and any other storage devices are provided by a paper punch tape or paper punch card mechanism; however, such an embodiment may result in an extremely slow rate of operation. In one configuration, memory 1029 may include ROM 1006, RAM 1005, and a storage device 1014. A storage device 1014 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1029 may contain a collection of program and/or database components and/or data such as, but not limited to: operating system component(s) 1015 (operating system); information server component(s) 1016 (information server); user interface component(s) 1017 (user interface); Web browser component(s) 1018 (Web browser); database(s) 1019; mail server component(s) 1021; mail client component(s) 1022; cryptographic server component(s) 1020 (cryptographic server); the SPC component(s) 1035; and/or the like (i.e., collectively a component collection). These components may be stored and accessed from the storage devices and/or from storage devices accessible through an interface bus. Although non-conventional program components such as those in the component collection may be stored in a local storage device 1014, they may also be loaded and/or stored in memory such as: peripheral devices, RAM, remote storage facilities through a communications network, ROM, various forms of memory, and/or the like.

Operating System

The operating system component 1015 is an executable program component facilitating the operation of the SPC controller. The operating system may facilitate access of I/O, network interfaces, peripheral devices, storage devices, and/or the like. The operating system may be a highly fault tolerant, scalable, and secure system such as: Apple Macintosh OS X (Server); AT&T PLan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SPC controller to communicate with other entities through a communications network 1013. Various communication protocols may be used by the SPC controller as a subcarrier transport mechanism for interaction, such as, but not limited to: multicast, TCP/IP, UDP, unicast, and/or the like.

Information Server

An information server component 1016 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SPC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SPC database 1019, operating systems, other program components, user interfaces, Web browsers, and/or the like.

Access to the SPC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SPC. In one embodiment, the information server may provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SPC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 1017 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1018 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application may similarly effect the obtaining and the provision of information to users, user agents, and/or the like from the SPC equipped nodes. The combined application may be nugatory on systems employing standard Web browsers.

Mail Server

A mail server component 1021 is a stored program component that is executed by a CPU 1003. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server may route, forward, and process incoming and outgoing mail messages that have been sent, relayed and/or otherwise traversing through and/or to the SPC.

Access to the SPC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1022 is a stored program component that is executed by a CPU 1003. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1020 is a stored program component that is executed by a CPU 1003, cryptographic processor 1026, cryptographic processor interface 1027, cryptographic processor device 1028, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SPC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SPC component to engage in secure transactions if so desired. The cryptographic component facilitates the secure accessing of resources on the SPC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SPC Database

The SPC database component 1019 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SPC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases may include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SPC database is implemented as a data-structure, the use of the SPC database

1019 may be integrated into another component such as the SPC component 1035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1019 includes several tables 1019*a-k*. A Users table 1019*a* may include fields such as, but not limited to: user_id, user device_id, username, password, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a SPC. A Devices table 1019*b* may include fields such as, but not limited to: device_ID, device_name, device_IP, device_GPS, device_MAC, device_serial, device_ECID, device_UDID, device_browser, device_type, device_model, device_version, device_OS, device_apps_list, device_securekey, wallet_app_installed_flag, and/or the like. A Models table 1019*c* may include fields such as, but not limited to: model_ID, model_name, model_type, model_objective, model_input, model_output, model_structure, model_parameters, model_index, model_sector_id, and/or the like. A Sector table 1019*d* may include fields such as, but not limited to: sector_id, sector_name, sector_funds, sector_GDP, sector_unemployment, sector_benchmark, sector_target_weight, sector_etf, sector_inflation, sector_pe, and/or the like. A Data Provider table 1019*e* may include fields such as, but not limited to: provide_id, provider_name, provider_type, provider_data_type, provider_index_type, provider_server_ip, provider_server_id, provider_url, and/or the like. A Funds table 1019*f* may include fields such as, but not limited to: fund_id, fund_name, fund_etf, fund_type, fund_sector, fund_history, fund_performance, fund_min_investment, fund_return, fund_objective, and/or the like. A Portfolio table 1019*g* may include fields such as, but not limited to portfolio_id, portfolio_name, portfolio_user_id, portfolio_sector, portfolio_benchmark, portfolio_start_date, portfolio_end_date, portfolio_alert, portfolio_rebalance, portfolio_allocation, portfolio_return, and/or the like. A Trading Log table 1019*h* may include fields such as, but not limited to: log_id, log_timestamp, log_instrument_id, log_portfolio_id, log_amount, log_exchange_id, log_quantity, and/or the like. A Performance table 1019*i* may include fields such as, but not limited to: start_date, end_date, portfolio_id, return, sector_return, GDP, unemployment, inflation, what_if_return, index_return, and/or the like. A market data table 1019*j* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi. A Macro table 1019*k* may include fields such as, but not limited to: Macro_id, macro_type, macro_name, macro_timestamp, macro_value, macro_unit, and/or the like.

In one embodiment, the SPC database may interact with other database systems. For example, employing a distributed database system, queries and data access by search SPC component may treat the combination of the SPC database, an integrated data security layer database as a single database entity.

In one embodiment, user programs may contain various user interface primitives, which may serve to update the SPC. Also, various accounts may require custom database tables depending upon the environments and the types of clients the SPC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1019*a-k*. The SPC may be configured to keep track of various settings, inputs, and parameters via database controllers.

The SPC database may communicate to and/or with other components in a component collection, including itself, and/or facilities of the like. Most frequently, the SPC database communicates with the SPC component, other program components, and/or the like. The database may contain, retain, and provide information regarding other nodes and data.

The SPCs

The Sector-based Portfolio Construction (SPC) component 1035 is a stored program component that is executed by a CPU. In one embodiment, the SPC component incorporates any and/or all combinations of the aspects of the SPC discussed in the previous figures. As such, the SPC affects accessing, obtaining and the provision of information, services, transactions, and/or the like across various communications networks. The features and embodiments of the SPC discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SPC's features and facilities, and in many cases reduce the costs, energy consumption/requirements, and extend the life of SPC's underlying infrastructure; this has the added benefit of making the SPC more reliable. Similarly, many of the features and mechanisms are designed to be easier for users to use and access, thereby broadening the audience that may enjoy/employ and exploit the feature sets of the SPC; such ease of use also helps to increase the reliability of the SPC. In addition, the feature sets include heightened security as noted via the Cryptographic components 1020, 1026, 1028 and throughout, making access to the features and data more reliable and secure.

The SPC component may transform user data request (e.g., see 201, 216 in FIG. 2A, etc.) via SPC components, such as but not limited to Index Data Collector 1042 (e.g., see 302*a-d* in FIG. 3A, etc.), Portfolio Construction 1043 (e.g., see 400*a* in FIG. 4A, etc.), Performance Back Testing 1044 (e.g., see 400*c* in FIG. 4C, etc.), Portfolio Execution 1045 (e.g., see 325 in FIG. 3B, etc.), Monitor & Rebalance 1046 (e.g., see 400*d* in FIG. 4D, etc.), Section Allocation Modeler 1047, Market Data Analysis 1048, and/or the like into sector-based portfolio investment transaction records (e.g., see 235 in FIG. 2B, etc.), and/or the like and use of the SPC.

The SPC component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); Representational State Transfer (REST); SWFObject; Yahoo! User Interface; and/or the like), WebObjects, and/or the like. In one embodiment, the SPC server employs a cryptographic server to encrypt and decrypt communications. The SPC component may communicate to and/or with other components in a component collection, including itself, and/or facilities of the like. Most frequently, the SPC component communicates with the SPC database, operating systems, other program components, and/or the like. The SPC may contain, communicate, generate, obtain, and/or provide program component, system, user, and/or data communications, requests, and/or responses.

Distributed SPCs

The structure and/or operation of any of the SPC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SPC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SPC controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header ('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die ('Could not bind to address');
socket_listen ($sock);
$client = socket_accept ($sock);
// read input data from client device in 1024 byte blocks until end of
message
do {
   $input = "";
   $input = socket_read ($client, 1024);
   $data .= $input;
} while($input != "");
// parse data to extract variables
$obj = json_decode($data, true);
// store input data in a database
mysql_connect ("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT
database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/Infocenter/tivihelp/v2r1/Index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference herein. Additional embodiments of the SPC may include:

In a further embodiment, the SPC discusses a sector-based portfolio management apparatus, comprising: a computing processor; and a memory disposed in communication with the computing processor, and storing computing processor-executable instructions, said processor-executable instructions executable by the computing processor to: obtain index data updates from a data provider; determine a type of the obtained index data updates; determine target sector investment allocation weights associated with a plurality of sectors; provide the determined target sector investment allocation weights to a user via a user interface; receive user configured sector-based portfolio construction parameters including a target-actual allocation weight deviation tolerance level; generate back testing performance data based on the user configured sector-based portfolio construction parameters; construct a sector-based portfolio based on the user configured sector-based portfolio construction parameters upon user approving the generated back testing performance data; establish a portfolio performance monitor based on the user configured sector-based portfolio construction parameters; provide portfolio performance data to the user via the user interface; receive a rebalancing request via the user interface; and rebalance the sector-based portfolio based on the target sector investment allocation weights.

In further embodiments, the type of the obtained index data updates comprises any of: Russell 3000 index, Russell 2000 index, Dow ones US Total Stock Market, S&P 500 Index, Russell 300 Value Index, Russell 3000 Growth Index, and S&P GICS.

In one embodiment, the user configured sector-based portfolio construction parameters comprise a sector fund selected by the user.

In one embodiment, the user configured sector-based portfolio construction parameters comprise setting an alert to the user when an actual sector allocation weight deviates from the target sector investment allocation weight for more than the target-actual allocation weight deviation tolerance level.

In one embodiment, the user configured sector-based portfolio construction parameters comprise a rebalancing frequency.

In one embodiment, the user configured sector-based portfolio construction parameters comprise a period start date and a period end date.

In one embodiment, the portfolio performance data comprises a comparison of actual portfolio performance and sector performance.

In one embodiment, the portfolio performance data comprises a comparison of actual portfolio performance and macro indicators.

In one embodiment, the macro indicators comprise any of the GDP, unemployment, and inflation.

In one embodiment, the target sector investment allocation weights comprise benchmarks from the obtained index data updates.

In one embodiment, the target sector investment allocation weights are generated from a pre-defined model.

In one embodiment, the pre-defined model are developed based on economic cycles including any of a late economic cycle, mid economic cycle, inflation and recession.

In one embodiment, the pre-defined model are developed based on different objectives including any of low volatility and S&P 500.

In one embodiment, the back testing performance data generation further comprises: retrieving historical performance of instruments selected for the sector-based portfolio.

In one embodiment, the back testing performance data generation further comprises: distributing investment based on historical sector weights for benchmarks among sectors.

In one embodiment, the back testing performance data generation further comprises: calculating portfolio sector weights by applying an over or under weight to benchmark sector weight; distributing portfolio investment into sectors according to the calculated portfolio sector weights; determining when a first sector investment is negative; reducing positive sector investments proportionally based on the portfolio sector weights up to a total amount equivalent to the negative first sector investment; and setting the first sector investment to be zero.

In one embodiment, the back testing performance data generation further comprises: retrieving historical returns of instruments contained in the sector-based portfolio; calculating an instrument ending amount for investment in each instrument; and calculating a portfolio period ending amount by adding instrument ending amounts.

In one embodiment, the back testing performance data generation further comprises: retrieving benchmark returns; and calculating period ending amount for benchmark.

In one embodiment, the processor-executable instructions are further executable by the computing processor to: generate data structures to generate user interfaces including performance charts.

In one embodiment, the rebalancing further comprises: obtaining a set of current actual sector weights and a set of current target sector weights; comparing the set of current actual sector weights with the set of current target sector weights; determining at least one actual sector weight deviates from a corresponding current target sector for more than the target-actual allocation weight deviation tolerance level; and adjusting investment allocation among the sectors according to the current target sector weights.

In one embodiment, the processor further issues instructions by the processor to: obtain an indication of an investor-employed industry sector; and reduce an allocation weight associated with the investor-employed industry sector in the constructed sector-based portfolio.

In one embodiment, the portfolio performance monitor is configured to provide performance updates in one of the following manners: constantly, intermittently, periodically and on-demand per user requests.

In one embodiment, the portfolio performance monitor is configured to provide performance updates automatically following a triggering event.

In one embodiment, the processor further issues instructions by the processor to: send a rebalance alert to a user when at least one actual sector weight deviates from a corresponding current target sector for more than the target-actual allocation weight deviation tolerance level; providing a rebalance option to the user via a user interface; and receiving a user election of rebalance including user selected benchmarks for rebalancing.

In one embodiment, the SPC discusses a sector-based portfolio management processor-readable storage non-transitory medium storing processor-executable instructions issuable by a processor to: obtain index data updates from a data provider; determine a type of the obtained index data updates; generate target sector investment allocation weights associated with a plurality of sectors; provide the generated target sector investment allocation weights to a user via a user interface; receive user configured sector-based portfolio construction parameters including a target-actual allocation weight deviation tolerance level; generate back testing performance data based on the user configured sector-based portfolio construction parameters; construct a sector-based portfolio based on the user configured sector-based portfolio construction parameters upon user approving the generated back testing performance data; establish a portfolio performance monitor based on the user configured sector-based portfolio construction parameters; provide portfolio performance data to the user via the user interface; receive a rebalancing request via the user interface; and rebalance the sector-based portfolio based on the target sector investment allocation weights.

In one embodiment, the SPC discusses a sector-based portfolio management system, comprising: means for obtaining index data updates from a data provider; means for determining a type of the obtained index data updates; means for generating target sector investment allocation weights associated with a plurality of sectors; means for providing the generated target sector investment allocation weights to a user via a user interface; means for receiving user configured sector-based portfolio construction parameters including a target-actual allocation weight deviation tolerance level; means for generating back testing performance data based on the user configured sector-based portfolio construction parameters; means for constructing a sector-based portfolio based on the user configured sector-based portfolio construction parameters upon user approving the generated back testing performance data; means for establishing a portfolio performance monitor based on the user configured sector-based portfolio construction parameters; means for providing portfolio performance data to the user via the user interface; means for receiving a rebalancing request via the user interface; and means for rebalancing the sector-based portfolio based on the target sector investment allocation weights.

In one embodiment, the SPC discusses a sector-based portfolio management processor-implemented method, comprising: obtaining index data updates from a data provider; determining a type of the obtained index data updates; generating target sector investment allocation weights associated with a plurality of sectors; providing the generated target sector investment allocation weights to a user via a user interface; receiving user configured sector-based portfolio construction parameters including a target-actual allocation weight deviation tolerance level; generating back testing performance data based on the user configured sector-based portfolio construction parameters; constructing a sector-based portfolio based on the user configured sector-based portfolio construction parameters upon user approving the generated back testing performance data; establishing a portfolio performance monitor based on the user configured sector-based portfolio construction parameters; providing portfolio performance data to the user via the user interface; receiving a rebalancing request via the user interface; and rebalancing the sector-based portfolio based on the target sector investment allocation weights.

In one embodiment, the SPC discusses a sector-based portfolio management and alert apparatus, comprising: a computing processor; and a memory disposed in communication with the computing processor, and storing computing processor-executable instructions, said processor-executable instructions executable by the computing processor to: obtain user selected sector-based portfolio construction parameters including a set of target sector allocation weights and a target-actual allocation weight deviation tolerance level; construct a sector-based portfolio based on the user selected sector-based portfolio construction parameters; establish a portfolio performance monitor based on the user configured sector-based portfolio construction parameters; determine that at least one actual sector weight deviates from a corresponding current target sector for more than the target-actual allocation weight deviation tolerance level; provide a rebalancing alert including a rebalance option to a user via a user interface; receive a user selection of the rebalance option and user selected benchmarks for rebalancing; and rebalance the sector-based portfolio based on the user selected benchmarks for rebalancing.

In one embodiment, the user selected benchmarks include any of: Russell 3000 index, Russell 2000 index, Dow ones US Total Stock Market, S&P 500 Index, Russell 300 Value Index, Russell 3000 Growth Index, and S&P GICS.

In one embodiment, the user configured sector-based portfolio construction parameters comprise a rebalancing frequency.

In one embodiment, the user configured sector-based portfolio construction parameters comprise a period start date and a period end date.

In one embodiment, the portfolio performance monitor is configured to provide performance updates in one of the following manners: constantly, intermittently, periodically and on-demand per user requests.

In one embodiment, the portfolio performance monitor is configured to provide performance updates automatically following a triggering event.

In one embodiment, the processor-executable instructions are further executable by the computing processor to: retrieve historical performance of instruments selected for the sector-based portfolio.

In one embodiment, the processor-executable instructions are further executable by the computing processor to: distribute investment based on historical sector weights for benchmarks among sectors.

In one embodiment, the processor-executable instructions are further executable by the computing processor to: calculate portfolio sector weights by applying an over or under weight to benchmark sector weight; distribute portfolio investment into sectors according to the calculated portfolio sector weights; determine when a first sector investment is negative; reduce positive sector investments proportionally based on the portfolio sector weights up to a total amount equivalent to the negative first sector investment; and set the first sector investment to be zero.

In one embodiment, the processor-executable instructions are further executable by the computing processor to: retrieve historical returns of instruments contained in the sector-based portfolio; calculate an instrument ending amount for investment in each instrument; and calculate a portfolio period ending amount by adding instrument ending amounts.

In one embodiment, the processor-executable instructions are further executable by the computing processor to: retrieve benchmark returns; and calculate period ending amount for benchmark.

In one embodiment, the SPC discusses a sector-based portfolio management and alert processor-readable storage non-transitory medium storing processor-executable instructions issuable by a processor to: obtain user selected sector-based portfolio construction parameters including a set of target sector allocation weights and a target-actual allocation weight deviation tolerance level; construct a sector-based portfolio based on the user selected sector-based portfolio construction parameters; establish a portfolio performance monitor based on the user configured sector-based portfolio construction parameters; determine that at least one actual sector weight deviates from a corresponding current target sector for more than the target-actual allocation weight deviation tolerance level; provide a rebalancing alert including a rebalance option to a user via a user interface; receive a user selection of the rebalance option and user selected benchmarks for rebalancing; and rebalance the sector-based portfolio based on the user selected benchmarks for rebalancing.

In one embodiment, the SPC discusses a sector-based portfolio management and alert system, comprising: means to obtain user selected sector-based portfolio construction parameters including a set of target sector allocation weights and a target-actual allocation weight deviation tolerance level; means to construct a sector-based portfolio based on the user selected sector-based portfolio construction parameters; means to establish a portfolio performance monitor based on the user configured sector-based portfolio construction parameters; means to determine that at least one actual sector weight deviates from a corresponding current target sector for more than the target-actual allocation weight deviation tolerance level; means to provide a rebalancing alert including a rebalance option to a user via a user interface; means to receive a user selection of the rebalance option and user selected benchmarks for rebalancing; and means to rebalance the sector-based portfolio based on the user selected benchmarks for rebalancing.

In one embodiment, the SPC discusses a sector-based portfolio management and alert processor-implemented method, comprising: obtaining user selected sector-based portfolio construction parameters including a set of target sector allocation weights and a target-actual allocation weight deviation tolerance level; constructing a sector-based portfolio based on the user selected sector-based portfolio construction parameters; establishing a portfolio performance monitor based on the user configured sector-based portfolio construction parameters; determining that at least one actual sector weight deviates from a corresponding current target sector for more than the target-actual allocation weight deviation tolerance level; providing a rebalancing alert including a rebalance option to a user via a user interface; receiving a user selection of the rebalance option and user selected benchmarks for rebalancing; and rebalancing the sector-based portfolio based on the user selected benchmarks for rebalancing.

In order to address various issues and advance the art, the entirety of this application for SECTOR-BASED PORTFOLIO CONSTRUCTION PLATFORM APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SPC individual and/or enterprise user, database configuration and/or relational model, data type, data transmission and/or network framework, syntax structure, and/or the like, various embodiments of the SPC may be implemented that allow a great deal of flexibility and customization. For example, aspects of the SPC may be adapted for operation management. While various embodiments and discussions of the SPC have been directed to investment portfolio management, however, it is to be understood that the embodiments described herein may be readily configured and/or customized for a wide variety of other applications and/or implementations.

What is claimed is:

1. A sector-based portfolio management user interface compositing apparatus, comprising:
 a computing processor; and
 a memory disposed in communication with the computing processor, and storing computing processor-executable instructions, said processor-executable instructions executable by the computing processor to:
  obtain index data updates from a data provider;
  determine a type of the obtained index data updates;
  determine target sector investment allocation weights associated with a plurality of sectors based on the obtained index data updates;
  provide the determined target sector investment allocation weights to a user via a user interface;
  receive user configured sector-based portfolio construction parameters including a target-actual allocation weight deviation tolerance level;
  generate backtesting performance data based on the user configured sector-based portfolio construction parameters;
  composite the generated backtesting performance data into a backtesting user interface, the composited backtesting user interface incorporating the generated backtesting performance data and including event overlays with backtesting and historical data, and wherein the event overlays include any of: benchmarks, sectors, fundamentals, what if, macro indicators; and wherein the macro indicators include any of: US GDP, unemployment, inflation, recovery, and recession;
  provide the backtesting user interface to a user;
  obtain backtesting augmentation inputs from the backtesting user interface;
  construct a sector-based portfolio based on the user configured sector-based portfolio construction parameters upon user approving the generated backtesting augmentation inputs from the generated backtesting performance data;
  establish a portfolio performance monitor based on the user configured sector-based portfolio construction parameters;
  provide portfolio performance data for display to the user via a user interface;
  receive a 1-click rebalancing request via a rebalancing user interface; and
  rebalance the sector-based portfolio based on the 1-click rebalancing request and the target sector investment allocation weights.

2. The apparatus of claim 1, wherein the type of the obtained index data updates comprises any of: Russell 3000 index, Russell 2000 index, Dow Jones US Total Stock Market, S&P 500 Index, Russell 300 Value Index, Russell 3000 Growth Index, and S&P GICS.

3. The apparatus of claim 1, wherein the user configured sector-based portfolio construction parameters comprise a sector fund selected by the user.

4. The apparatus of claim 1, wherein the user configured sector-based portfolio construction parameters comprise setting an alert to the user when an actual sector allocation weight deviates from the target sector investment allocation weight for more than the target-actual allocation weight deviation tolerance level.

5. The apparatus of claim 1, wherein the user configured sector-based portfolio construction parameters comprise a rebalancing frequency.

6. The apparatus of claim 1, wherein the user configured sector-based portfolio construction parameters comprise a period start date and a period end date.

7. The apparatus of claim 1, wherein the portfolio performance data comprises a comparison of actual portfolio performance and sector performance.

8. The apparatus of claim 1, wherein the portfolio performance data comprises a comparison of actual portfolio performance and macro indicators.

9. The apparatus of claim 6, wherein the macro indicators comprise any of the GDP, unemployment, and inflation.

10. The apparatus of claim 1, wherein the target sector investment allocation weights comprise benchmarks from the obtained index data updates.

11. The apparatus of claim 1, wherein the target sector investment allocation weights are generated from a pre-defined model.

12. The apparatus of claim 11, wherein the pre-defined model is developed based on economic cycles including any of a late economic cycle, mid economic cycle, inflation and recession.

13. The apparatus of claim 11, wherein the pre-defined model is developed based on different objectives including any of low volatility and S&P 500.

14. The apparatus of claim 1, wherein the backtesting performance data generation further comprises:
 retrieving historical performance of instruments selected for the sector-based portfolio.

15. The apparatus of claim 1, wherein the backtesting performance data generation further comprises:
 distributing investment based on historical sector weights for benchmarks among sectors.

16. The apparatus of claim 1, wherein the backtesting performance data generation further comprises:
 calculating portfolio sector weights by applying an over or under weight to benchmark sector weight;
 distributing portfolio investment into sectors according to the calculated portfolio sector weights;
 determining when a first sector investment is negative;
 reducing positive sector investments proportionally based on the portfolio sector weights up to a total amount equivalent to the negative first sector investment; and
 setting the first sector investment to be zero.

17. The apparatus of claim 1, wherein the backtesting performance data generation further comprises:
retrieving historical returns of instruments contained in the sector-based portfolio;
calculating an instrument ending amount for investment in each instrument; and
calculating a portfolio period ending amount by adding instrument ending amounts.

18. The apparatus of claim 1, wherein the backtesting performance data generation further comprises:
retrieving benchmark returns; and
calculating period ending amount for benchmark.

19. A sector-based portfolio management user interface compositing processor-readable storage non-transitory medium storing processor-executable instructions issuable by a processor to:
obtain index data updates from a data provider;
determine a type of the obtained index data updates;
generate target sector investment allocation weights associated with a plurality of sectors based on the obtained index data updates;
provide the generated target sector investment allocation weights to a user via a user interface;
receive user configured sector-based portfolio construction parameters including a target-actual allocation weight deviation tolerance level;
generate backtesting performance data based on the user configured sector-based portfolio construction parameters;
composite the generated backtesting performance data into a backtesting user interface, the composited backtesting user interface incorporating the generated backtesting performance data and including event overlays with backtesting and historical data, and wherein the event overlays include any of: benchmarks, sectors, fundamentals, what if, macro indicators; and wherein the macro indicators include any of: US GDP, unemployment, inflation, recovery, and recession;
provide the backtesting user interface to a user;
obtain backtesting augmentation inputs from the backtesting user interface;
construct a sector-based portfolio based on the user configured sector-based portfolio construction parameters upon user approving the generated backtesting augmentation inputs from the generated backtesting performance data;
establish a portfolio performance monitor based on the user configured sector-based portfolio construction parameters;
provide portfolio performance data for display to the user via a user interface;
receive a 1-click rebalancing request via a rebalancing user interface; and
rebalance the sector-based portfolio based on the 1-click rebalancing request and the target sector investment allocation weights.

20. A sector-based portfolio management user interface compositing apparatus, comprising:
a memory;
a component collection in the memory, including:
an SPC component, the SPC component comprising:
an index data collector component;
a portfolio construction component;
a performance backtesting component;
a portfolio execution component;
a monitor and rebalance component;
a section allocation modeler component; and
a market data analysis component;
a processor disposed in communication with the memory, and configured to issue a plurality of processing instructions from the component collection stored in the memory,
wherein the processor issues instructions from the component collection, stored in the memory, to:
obtain index data updates from a data provider;
determine a type of the obtained index data updates;
determine target sector investment allocation weights associated with a plurality of sectors based on the obtained index data updates;
provide the determined target sector investment allocation weights to a user via a user interface;
receive user configured sector-based portfolio construction parameters including a target-actual allocation weight deviation tolerance level;
generate backtesting performance data based on the user configured sector-based portfolio construction parameters;
composite the generated backtesting performance data into a backtesting user interface, the composited backtesting user interface incorporating the generated backtesting performance data and including event overlays with backtesting and historical data, and wherein the event overlays include any of: benchmarks, sectors, fundamentals, what if, macro indicators; and wherein the macro indicators include any of: US GDP, unemployment, inflation, recovery, and recession;
provide the backtesting user interface to a user;
obtain backtesting augmentation inputs from the backtesting user interface;
construct a sector-based portfolio based on the user configured sector-based portfolio construction parameters upon user approving the generated backtesting augmentation inputs from the generated backtesting performance data;
establish a portfolio performance monitor based on the user configured sector-based portfolio construction parameters;
provide portfolio performance data for display to the user via a user interface;
receive a 1-click rebalancing request via a rebalancing user interface;
rebalance the sector-based portfolio based on the 1-click rebalancing request and the target sector investment allocation weights; and
update and instantiate the rebalanced sector-based portfolio in a sector-balancing account database configured for periodic system rebalance and assessment.

21. The apparatus of claim 20, wherein the type of the obtained index data updates comprises any of: Russell 3000 index, Russell 2000 index, Dow ones US Total Stock Market, S&P 500 Index, Russell 300 Value Index, Russell 3000 Growth Index, and S&P GICS.

22. The apparatus of claim 20, wherein the user configured sector-based portfolio construction parameters comprise a sector fund selected by the user.

23. The apparatus of claim 20, wherein the processor issues instructions from the component collection, stored in the memory, such the user configured sector-based portfolio construction parameters comprise setting an alert to the user when an actual sector allocation weight deviates from the target sector investment allocation weight for more than the target-actual allocation weight deviation tolerance level.

24. The apparatus of claim 20, wherein the user configured sector-based portfolio construction parameters comprise a rebalancing frequency.

25. The apparatus of claim 20, wherein the user configured sector-based portfolio construction parameters comprise a period start date and a period end date.

26. The apparatus of claim 20, wherein the portfolio performance data comprises a comparison of actual portfolio performance and sector performance.

27. The apparatus of claim 20, wherein the portfolio performance data comprises a comparison of actual portfolio performance and macro indicators.

28. The apparatus of claim 27, wherein the macro indicators comprise any of the GDP, unemployment, and inflation.

29. The apparatus of claim 20, wherein the target sector investment allocation weights comprise benchmarks from the obtained index data updates.

30. The apparatus of claim 20, wherein the target sector investment allocation weights are generated from a pre-defined model.

31. The apparatus of claim 30, wherein the pre-defined model is developed based on economic cycles including any of a late economic cycle, mid economic cycle, inflation and recession.

32. The apparatus of claim 30, wherein the pre-defined model is developed based on different objectives including any of low volatility and S&P 500.

33. The apparatus of claim 20, wherein the processor issues instructions from the component collection, stored in the memory, and wherein the backtesting performance data generation further comprises:
retrieving historical performance of instruments selected for the sector-based portfolio.

34. The apparatus of claim 20, wherein the processor issues instructions from the component collection, stored in the memory, and wherein the backtesting performance data generation further comprises:
distributing investment based on historical sector weights for benchmarks among sectors.

35. The apparatus of claim 20, wherein the processor issues instructions from the component collection, stored in the memory, and wherein the backtesting performance data generation further comprises:
calculating portfolio sector weights by applying an over or under weight to benchmark sector weight;
distributing portfolio investment into sectors according to the calculated portfolio sector weights;
determining when a first sector investment is negative;
reducing positive sector investments proportionally based on the portfolio sector weights up to a total amount equivalent to the negative first sector investment; and
setting the first sector investment to be zero.

36. The apparatus of claim 20, wherein the processor issues instructions from the component collection, stored in the memory, and wherein the backtesting performance data generation further comprises:
retrieving historical returns of instruments contained in the sector-based portfolio;
calculating an instrument ending amount for investment in each instrument; and
calculating a portfolio period ending amount by adding instrument ending amounts.

37. The apparatus of claim 20, wherein the processor issues instructions from the component collection, stored in the memory, and wherein the backtesting performance data generation further comprises:
retrieving benchmark returns; and
calculating period ending amount for benchmark.

* * * * *